United States Patent
Keane et al.

(10) Patent No.: US 8,634,089 B2
(45) Date of Patent: *Jan. 21, 2014

(54) BROWSER-BASED PRODUCT DESIGN

(75) Inventors: Robert S. Keane, Arlington, MA (US);
Eric Robertson, Paris (FR); Sebastian Coursol, Montauroux (FR)

(73) Assignee: VistaPrint USA, Inc., Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/391,019

(22) Filed: Feb. 23, 2009

(65) Prior Publication Data

US 2009/0207447 A1 Aug. 20, 2009

Related U.S. Application Data

(62) Division of application No. 09/557,571, filed on Apr. 25, 2000, now Pat. No. 6,650,433.

(30) Foreign Application Priority Data

Jan. 25, 2000 (FR) ...................................... 00 00931

(51) Int. Cl.
*G06F 3/12* (2006.01)
*G06F 15/00* (2006.01)

(52) U.S. Cl.
USPC ........................................ 358/1.15; 358/1.1

(58) Field of Classification Search
USPC ................ 358/1.1, 1.9, 1.13, 448, 474, 1.15; 715/209, 776, 234, 247; 709/203; 345/619, 629

See application file for complete search history.

(56) References Cited

U.S. PATENT DOCUMENTS

| | | |
|---|---|---|
| 4,852,485 A | 8/1989 | Brunner |
| 4,918,588 A | 4/1990 | Barrett .................................. 1/1 |
| 4,932,320 A | 6/1990 | Brunetti et al. |
| 5,140,676 A | 8/1992 | Langelaan |
| 5,210,824 A | 5/1993 | Putz et al. |
| 5,239,625 A | 8/1993 | Bogart et al. |
| 5,257,097 A | 10/1993 | Pineau et al. |
| 5,272,549 A | 12/1993 | McDonald .................... 358/527 |
| 5,287,194 A | 2/1994 | Lobiondo |
| 5,327,265 A | 7/1994 | McDonald .................... 359/527 |

(Continued)

FOREIGN PATENT DOCUMENTS

| | | |
|---|---|---|
| CA | 2194106 | 12/1996 |
| DE | 4121564 | 6/1990 |

(Continued)

OTHER PUBLICATIONS

French Search Report, Oct. 19, 2000, Vistaprint USA.

(Continued)

*Primary Examiner* — Gabriel Garcia
(74) *Attorney, Agent, or Firm* — Jessica Costa

(57) ABSTRACT

Methods for creating a customized document using a downloadable product design tolls executing in the user's browser. A template for a partially completed product design is selected by the user and downloaded to the user's computer for editing by the user at the user's computer using the downloadable design tools. While viewing the product design template, the user can enter text or other content into the template elements. The completed product design can be uploaded to the server for production of the corresponding printed product.

22 Claims, 33 Drawing Sheets

(56) References Cited

U.S. PATENT DOCUMENTS

| | | |
|---|---|---|
| 5,483,653 A | 1/1996 | Furman |
| 5,508,718 A | 4/1996 | Haikin |
| 5,535,320 A | 7/1996 | Gay et al. |
| 5,539,865 A | 7/1996 | Gentile ............... 358/1.16 |
| 5,550,928 A | 8/1996 | Lu et al. ............. 382/116 |
| 5,552,994 A | 9/1996 | Cannon et al. |
| 5,555,496 A | 9/1996 | Tackbary et al. |
| 5,600,563 A | 2/1997 | Cannon et al. |
| 5,617,528 A | 4/1997 | Stechmann et al. |
| 5,634,064 A | 5/1997 | Warnock et al. |
| 5,649,216 A | 7/1997 | Sieber |
| 5,748,484 A | 5/1998 | Cannon et al. |
| 5,748,963 A | 5/1998 | Orr ..................... 395/704 |
| 5,751,590 A | 5/1998 | Cannon et al. |
| 5,752,053 A | 5/1998 | Takakura et al. |
| 5,790,790 A | 8/1998 | Smith et al. |
| 5,793,966 A | 8/1998 | Amstein et al. |
| 5,796,952 A | 8/1998 | Davis et al. |
| 5,819,014 A | 10/1998 | Cyr et al. |
| 5,819,271 A | 10/1998 | Mahoney et al. |
| 5,822,587 A | 10/1998 | McDonald et al. ....... 395/702 |
| 5,825,986 A | 10/1998 | Ferguson |
| 5,838,883 A | 11/1998 | Pekelman |
| 5,838,906 A | 11/1998 | Doyle et al. ........... 395/200.32 |
| 5,845,299 A | 12/1998 | Arora et al. |
| 5,845,302 A | 12/1998 | Cyman, Jr. et al. |
| 5,848,413 A | 12/1998 | Wolff |
| 5,870,089 A | 2/1999 | Fabbio et al. |
| 5,870,552 A | 2/1999 | Dozier et al. |
| 5,877,766 A | 3/1999 | Bates et al. |
| 5,880,740 A * | 3/1999 | Halliday et al. ............ 345/629 |
| 5,884,014 A | 3/1999 | Huttenlocker et al. |
| 5,892,909 A | 4/1999 | Grasso et al. |
| 5,895,476 A | 4/1999 | Orr et al. ............... 707/517 |
| 5,895,477 A | 4/1999 | Orr et al. ............... 707/517 |
| 5,903,902 A | 5/1999 | Orr et al. ............... 707/517 |
| 5,918,988 A | 7/1999 | Van Oijen |
| 5,930,810 A | 7/1999 | Farros et al. |
| 5,930,811 A * | 7/1999 | Nojima et al. ............ 715/247 |
| 5,956,737 A | 9/1999 | King et al. ............. 707/517 |
| 5,960,164 A | 9/1999 | Dorfman et al. |
| 5,960,168 A | 9/1999 | Shaw et al. |
| 5,963,641 A | 10/1999 | Crandall et al. |
| 5,964,156 A | 10/1999 | Smith et al. |
| 5,974,234 A | 10/1999 | Levine et al. |
| 5,974,441 A | 10/1999 | Rogers et al. |
| 5,984,446 A | 11/1999 | Silverbrook |
| 5,995,723 A | 11/1999 | Sperry et al. |
| 6,012,035 A | 1/2000 | Freeman, Jr. et al. |
| 6,012,070 A * | 1/2000 | Cheng et al. ............. 715/234 |
| 6,018,338 A | 1/2000 | Greulich et al. |
| 6,018,774 A | 1/2000 | Mayle et al. |
| 6,020,894 A | 2/2000 | Silverbrook |
| 6,026,433 A | 2/2000 | D'Arlach et al. |
| 6,028,603 A * | 2/2000 | Wang et al. ............. 715/776 |
| 6,049,390 A | 4/2000 | Notredame et al. |
| 6,057,858 A | 5/2000 | Desrosiers |
| 6,088,120 A | 7/2000 | Shibusawa et al. |
| 6,094,454 A | 7/2000 | Mitchell et al. |
| 6,117,061 A | 9/2000 | Popat et al. |
| 6,145,031 A | 11/2000 | Mastie et al. |
| 6,161,114 A | 12/2000 | King et al. ............. 707/517 |
| 6,167,382 A * | 12/2000 | Sparks et al. ........... 705/26 |
| 6,173,274 B1 | 1/2001 | Ryan, Jr. |
| 6,173,295 B1 | 1/2001 | Goertz et al. |
| 6,182,092 B1 | 1/2001 | Francis et al. |
| 6,188,490 B1 | 2/2001 | Miyake |
| 6,189,020 B1 | 2/2001 | Shimizu |
| 6,201,611 B1 | 3/2001 | Carter et al. |
| 6,222,884 B1 | 4/2001 | Mitchell et al. |
| 6,247,011 B1 | 6/2001 | Jecha et al. |
| 6,249,821 B1 | 6/2001 | Agatone et al. |
| 6,259,446 B1 | 7/2001 | Matheny et al. |
| 6,271,937 B1 | 8/2001 | Zuber |
| 6,278,462 B1 * | 8/2001 | Weil et al. ............. 345/619 |
| 6,306,072 B1 | 10/2001 | Honegger |
| 6,343,302 B1 | 1/2002 | Graham |
| 6,344,853 B1 * | 2/2002 | Knight ..................... 345/629 |
| 6,353,483 B1 | 3/2002 | Laverty et al. |
| 6,362,895 B1 | 3/2002 | Laverty et al. |
| 6,381,032 B1 | 4/2002 | Laverty et al. |
| 6,397,197 B1 | 5/2002 | Gindlesperger |
| 6,411,742 B1 | 6/2002 | Peterson |
| 6,415,277 B1 | 7/2002 | Klatt |
| 6,424,752 B1 | 7/2002 | Katayama et al. |
| 6,434,747 B1 | 8/2002 | Khoo et al. |
| 6,453,127 B2 | 9/2002 | Wood et al. |
| 6,460,040 B1 * | 10/2002 | Burns ..................... 707/10 |
| 6,469,796 B1 | 10/2002 | Leiman et al. |
| 6,484,149 B1 | 11/2002 | Jammes et al. |
| 6,498,656 B1 | 12/2002 | Mastie et al. |
| 6,509,974 B1 | 1/2003 | Hansen |
| 6,535,294 B1 | 3/2003 | Arledge |
| 6,591,076 B2 | 7/2003 | Connors |
| 6,631,008 B2 | 10/2003 | Aoki |
| 6,631,375 B2 | 10/2003 | Jecha et al. |
| 6,636,326 B1 | 10/2003 | Zuber et al. |
| 6,650,433 B1 | 11/2003 | Keane et al. ............. 358/1.15 |
| 6,684,369 B1 | 1/2004 | Bernardo et al. |
| 6,707,563 B1 | 3/2004 | Barry et al. |
| 6,708,309 B1 * | 3/2004 | Blumberg ................. 715/209 |
| 6,738,155 B1 | 5/2004 | Rosenlund |
| 6,738,509 B2 | 5/2004 | Yeo et al. |
| 6,839,149 B2 | 1/2005 | Herr |
| 6,850,335 B1 | 2/2005 | Barry et al. |
| 6,882,441 B1 | 4/2005 | Faust et al. ............. 358/1.18 |
| 6,891,642 B1 | 5/2005 | Shigehiro |
| 6,965,912 B2 * | 11/2005 | Friedman et al. ........... 709/203 |
| 6,976,798 B2 | 12/2005 | Keane et al. ............. 400/76 |
| 6,992,794 B2 | 1/2006 | Keane et al. ............. 358/1.5 |
| 7,016,865 B1 | 3/2006 | Weber et al. |
| 7,120,634 B2 | 10/2006 | Jecha et al. |
| 7,124,302 B2 | 10/2006 | Ginter et al. |
| 7,133,149 B2 | 11/2006 | Keane et al. ............. 358/1.15 |
| 7,145,670 B2 | 12/2006 | Keane et al. ............. 358/1.13 |
| 7,187,465 B2 | 3/2007 | Keane et al. ............. 358/1.15 |
| 7,216,092 B1 | 5/2007 | Weber et al. |
| 7,236,647 B2 | 6/2007 | Lunetta et al. |
| 7,298,516 B2 | 11/2007 | Herr |
| 7,495,796 B2 | 2/2009 | Keane et al. ............. 358/1.18 |
| 2002/0025085 A1 | 2/2002 | Gustafson et al. |
| 2003/0140315 A1 | 7/2003 | Blumberg et al. |
| 2003/0140316 A1 | 7/2003 | Lakritz |
| 2004/0006522 A1 | 1/2004 | Keane et al. ............. 705/35 |
| 2004/0070788 A1 | 4/2004 | Barry et al. |
| 2004/0125391 A1 | 7/2004 | Zuber |
| 2006/0253345 A1 | 11/2006 | Heber |
| 2007/0035746 A1 | 2/2007 | Jecha et al. |
| 2008/0133500 A1 | 6/2008 | Edwards et al. |
| 2009/0207447 A1 | 8/2009 | Keane et al. ............. 358/1.15 |

FOREIGN PATENT DOCUMENTS

| | | |
|---|---|---|
| EP | 144138 | 6/1985 |
| EP | 0384986 | 12/1989 |
| EP | 0384986 | 9/1990 |
| EP | 0475734 A2 | 3/1991 |
| EP | 0453802 | 10/1991 |
| EP | 0537391 A1 | 10/1991 |
| EP | 0470266 | 2/1992 |
| EP | 0475601 A2 | 3/1992 |
| EP | 0475734 A2 | 3/1992 |
| EP | 04756001 | 3/1992 |
| EP | 0509333 | 10/1992 |
| EP | 0547622 A2 | 12/1992 |
| EP | 0674277 A2 | 9/1995 |
| EP | 0585332 B1 | 12/1995 |
| EP | 0689157 A2 | 12/1995 |
| EP | 0814425 A2 | 12/1997 |
| EP | 0852359 | 7/1998 |
| EP | 1496448 | 12/1998 |
| EP | 0814225 A3 | 8/1999 |
| EP | 0814425 A3 | 8/1999 |
| EP | 0982650 | 3/2000 |

(56) References Cited

FOREIGN PATENT DOCUMENTS

| EP | 0982650 B1 | 10/2004 |
|---|---|---|
| EP | 1040428 | 11/2004 |
| EP | 1040428 B1 | 11/2004 |
| FR | 2458834 | 1/1981 |
| JP | 03-172925 | 7/1991 |
| JP | 06-289584 | 10/1994 |
| JP | 08-063310 | 3/1996 |
| JP | 08-249375 | 9/1996 |
| JP | 09-123094 | 5/1997 |
| JP | 9-134261 | 5/1997 |
| JP | 09-150495 | 6/1997 |
| JP | 10-031785 | 2/1998 |
| JP | 10-058763 | 3/1998 |
| JP | 10-213944 | 8/1998 |
| JP | 10-214166 | 8/1998 |
| JP | 10-260799 | 9/1998 |
| JP | 11-096150 | 4/1999 |
| JP | 11-212741 | 8/1999 |
| JP | 11-327863 | 11/1999 |
| WO | 95/07507 | 3/1995 |
| WO | 96/19352 A1 | 6/1996 |
| WO | WO96/19352 | 6/1996 |
| WO | 98/04988 A1 | 2/1998 |
| WO | 98/08176 A1 | 2/1998 |
| WO | WO98/04988 | 2/1998 |
| WO | WO98/04988 A1 | 2/1998 |
| WO | WO98/08176 | 2/1998 |
| WO | 99/15955 A1 | 4/1999 |
| WO | 99/17934 A1 | 4/1999 |
| WO | WO99/15955 | 4/1999 |
| WO | WO99/17934 | 4/1999 |
| WO | 00/48079 A1 | 8/2000 |
| WO | WO00/48079 | 8/2000 |
| WO | 00/70436 A1 | 11/2000 |
| WO | WO00/70436 | 11/2000 |
| WO | 01/11491 A1 | 2/2001 |
| WO | 01/16801 A1 | 3/2001 |
| WO | WO01/16801 | 3/2001 |
| WO | 01/36198 A1 | 5/2001 |
| WO | WO01/36198 | 5/2001 |
| WO | 01/42956 A1 | 6/2001 |
| WO | WO01/42956 | 6/2001 |
| WO | 01/66349 A1 | 9/2001 |
| WO | WO01/66349 | 9/2001 |

OTHER PUBLICATIONS

PCT Search Report, Apr. 25, 2001, Vistaprint USA.
Amended Joint Claim Construction Statement, *Vistaprint Technologies Ltd.* v. *123Print Inc.*, Drawing Board (US) Inc. (d/b/a Stationery House Inc.), and Taylor Strategic Accounts, Inc., CA 07-02298 (JNE/JJK) (D. Minn), dated Jul. 1, 2008.
Autodesk internet release #11, published Oct. 1990.
Back, "Heisser Kaffee," C't magazine, No. 2, pp. 138-142 (1996).
Collection of articles on desk top publishing, C't magazine, pp. 218-245 (1996).
Collection of articles published in "Digital Design" magazine, pp. 86-91 (Mar. 25, 1986).
*Colorquick LLC* v. *Vistaprint Ltd.*, Case No. 6:09-cv-323-LED (E.D. Tex.), Expert Report of David L. Zwang regarding the invalidity of U.S. Patent No. 6,839,149.
*Colorquick LLC* v. *Vistaprint Ltd.*, Case No. 6:09-cv-323-LED (E.D. Tex.), Expert Report of Ping Wah Wong rebutting Dr. David L. Zwang's report regarding the invalidity of U.S. Patent No. 6,839,149.
*Colorquick LLC* v. *Vistaprint Ltd.*, Case No. 6:09-cv-323-LED (E.D. Tex.), Technology Tutorial of Defendants Vistaprint Ltd. and Officemax Inc.
Huskes, "Netz der Mythen," C't magazine, No. 12, pp. 250-256 (1996).
Microstation CAD software manual, version 5, published Mar. 1994.
Nullity suit writ dated Jun. 7, 2007 against EP 0852359 (English translation provided).
OPI, Open Prepress Interface Specification 1.3, Aldus Corp., Sep. 22, 1993.
Patent Owner's response to appeal of nullity suit EP 0852359 determination dated Jul. 9, 2007 (English translation).
"Pira/PPITB Developments in Printing Technology 1982 Update of Ten Years Forecast," pp. xii-xv (1982).
"Reif fur die Insel," Chip magazine, No. 3, pp. 221-214 (Mar. 1996).
Request dated Jul. 21, 2009 to dismiss appeal of decision of Second Division of German Federal Patent Court dated Nov. 13, 2009 relating to EP 0852359.
Schreiber et al., "Image processing in the cognitive information processing group research laboratory of electronics," MIT (Oct. 1979).
Sehon, "There's still a lot of ink and water in electronic publishing," published in Print on Demand Business, pp. 46-49 (Dec. 1996).
Supplement dated Nov. 5, 2007 to Nullity suit brought against EP 0852359 (English translation).
U.S. Appl. No. 10/608,981.
Sorgaard, Pal and Sandahl Tone Irene, "Problems with Styles in Word Processing: A Weak Foundation for Electronic Publishing with SGML", 1997.
U.S. Appl. No. 11/543,372.
ReExamination Control No. 90/009,295.
ReExamination Control No. 90/009,296.
ReExamination Control No, 90/009,287.
Appeal of Nullity Suit brought against European Patent EP 0 852 359 B1 (Jan. 21, 2009).
'Corel Office for Java (Pre-Beta)' dated Jan. 12, 1997 ABC0037880.
'Corel Office for Java (Corel Office for Java White Paper)' dated Jan. 13, 1997 ABC0037890.
'Corel Office for Java (Frequently Asked Questions)' dated Jan. 13, 1997 ABC0038805.
Nov. 14, 2007 VistaPrint's Responses to Defendants' First Set of Requests for Admissions to Plaintiff-Nos. 1-18, USDC D. Minn. C.A. No. 07-cv-2298-JNE-JJK *VistaPrint Technologies Limited* v. *123Print, Inc., et al.*
Jun. 30, 2008 VistaPrint's Responses to Defendants' Second Set of Requests for Admissions to Plaintiff-Nos. 19-55, USDC D. Minn. C.A. No. 07-cv-2298-JNE-JJK *VistaPrint Technologies* v. *123Print, Inc., et al.*
CONF-AEO Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*
Exhibit 4: Website printout, Seybold Publications, "What has WYSIWYG done to us?" VP0007355-7372 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].
Exhibit 5: A White Paper Prepared by CAP Ventures, SJ000001-0028 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].
Exhibit 6: Article, "Who's the Boss" Oct. 1998, SJ000048-0055 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].
Exhibit 7: Article, "Online for success" Feb. 1999, SJ000030 to 0033 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].
Exhibit 8: Article reprint, "iPrint Discount Printing Shop Awarded Twice During Internet Grand Opening," Jan. 17, 1997, ABC0011639-1640 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].
Exhibit 9: Article reprint, "Self-Service Stationery," May 20, 1997, ABC0011706-1708 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].
Exhibit 11: Article reprint, "It Takes a Cyber-Village, Tech Companies Find a Haven in St Paul's Lowertown," Nov. 24, 1997, ABC0017589-7593 [to Deposition transcript of Steven T. Jecha dated Jan. 10, 2008, USDC D. Minn. C.A. No. 07-cv-2298-JNE-JJK *VistaPrint Technologies Limited* v. *123 Print, Inc., et al.*].

(56) References Cited

OTHER PUBLICATIONS

Exhibit 12: Article reprint, "St Paul, Minn 119 Software Firm Aims for Error-Free Internet Printing Jobs." Jan. 3, 1998, ABC0017594-7595 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 13: Article reprint, iPrint Raises 1st Round Funding to Innovate $20 Billion Commercial Printing Market; Online Print Shop Environment to Revolutionize Commercial Printing, Nov. 10, 1997, ABC0011674 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 14: Article reprint, "Deluxe Launches World's Easiest Business Cards Limited Edition New Free Software Download Lets Computer Users Try Before They Buy," Nov. 14, 1996, ABC0011594 to 1595 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 15: Article, "Proposing a Standard Web API," Feb. 1996, ABC0011748 to 1754 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 16: Website printout, iPrint.com, Sep. 15, 2000, ABC0011976 to 1984 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 17: Website printout, Insty-Prints BizCards Online, Sep. 14, 2000, ABC0011985 to 1990 [to Deposition transcript of Steven T. Jecha dated Jan. 10, 2008, USDC D. Minn. C.A. No. 07- cv-2298-JNE-JJK *VistaPrint Technologies Limited* v. *123Print, Inc., et al.*].

Exhibit 18: Website printout, Insty-Prints, Sep. 14, 2000, ABC0011991 to 1999 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 20: Steve Jecha/Winfield Mitchell Privileged Document Log, 1 pg. [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 21: Steve Jecha Privileged Document Log, 1 pg. [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 33: Article, "Essential Gear for Prepress Success '98," May 1998, SJ000044 to 0045 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 34: Website printout, Minnesota Secretary of State, Digital-Net, Inc., VP0013393 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 35: Group exhibit, JM000001 to 0116 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 36: Group exhibit, folder labeled "Completed Biz-Cards," SJ000809 to 0833 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 37: Group exhibit, folder labeled "BANC—General Info," SJ000834 to 0920 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 38: Group exhibit, folder labeled "Bizcards Online," SJ000921 to 1003 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 39: e-mail string, Jecha to Arledge, Dec. 18, 1997, w/ attachment, SJ000589, 0599 to 0600, 0603 to 0604, 0601 to 0602 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 49: Publication, "The Future of Digital Printing is Powered by Virtual Pre-Press," SJ000162 to 0178 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 50: Group exhibit, "VPP In-a-Box Prospect Letters," SJ000243 to 0259 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

Exhibit 51: Business Plan, Digital-Net, Inc., SJ000185 to 0214 [to Deposition transcript of Steven Jecha dated Jan. 10, 2008, USDC D. Minn. C.A. No. 07-cv-2298-JNE-JJK *VistaPrint Technologies Limited* v. *123Print, Inc., et al.*].

Exhibit 55: File Wrapper and Contents, European Patent Office File Wrapper, ABC0012610 to 13431 [to Deposition transcript of Steven T. Jecha dated Jan. 10, 2008, USDC D. Minn. C.A. No. 07-cv-2298-JNE-JJK *VistaPrint Technologies Limited* v. *123Print, Inc., et al.*].

CONF-AEO Deposition transcript of Winfield A. Mitchell dated Jan. 11, 2008, USDC D. Minn. C.A. No. 07.-cv-2298-JNE-JJK *VistaPrint Technologies Limited* v. *123Print, Inc., et al.*

Exhibit 58: European Patent Specification, EP 1 040 428 B1, ABC0012577 to 2609 [to Deposition transcript of Winfield A. Mitchell dated Jan. 11, 2008 USDC D. Minn. C.A. No. 07-cv-2298-JNE-JJK *VistaPrint Technologies Limited* v. *123Print, Inc., et al.*].

Exhibit 59: Article "Print Image" Red Herring, Spring, 1997, 5 pgs. [to Deposition transcript of Winfield A. Mitchell dated Jan. 11, 2008 USDC D. Minn. C.A. No. 07-cv-JNE-JJK *VistaPrint Technologies Limited* v. *123Print, Inc., et al.*].

Exhibit 75: Subpeona in a Civil Case, Dan Gribsby, with attachments, 8 pgs. [to Deposition transcript of Daniel C. Gribsby dated Mar. 11, 2008 USDC D. Minn. C.A. No. 07-cv-JNE-JJK *VistaPrint Technologies Limited* v. *123Print, Inc., et al.*].

Deposition transcript of Neil Mix dated Apr. 24, 2008, USDC D. Minn. C.A. No. 07-cv-JNE-JJK *VistaPrint Technologies Limited* v. *123Print, Inc., et al.*

Exhibit 102: Defendants' Notice of taking Deposition of Neil Mix [to Deposition transcript of Neil Mix dated Apr. 24, 2008, USDC D. Minn. C.A. No. 07-cv-2298-JNE-JJK *VistaPrint Technologies Limited* v. *123Print, Inc., et al.*].

Feb. 4, 2001 DI59 Deendants' Memorandum in Support of Their Motion to Amend Their Answer to Allege Inequitable Conduct and Unclean Hands, USDC D. Minn. C.A. No. 07-cv-JNE-JJK *VistaPrint Technologies Limited* v. *123Print, Inc., et al.*

Mar. 12, 2008 DI70 First Amended Answer and Counterclaims of 123Print, Inc.; Drawing Board (US), Inc. (d/b/a Stationary House, Inc.); and Taylor Strategic Accounts, Inc. to Plaintiff's Second Amended Complaint, USDC D. Minn. C.A. No. 07-cv-JNE-JJK *VistaPrint Technologies Limited* v. *123Print, Inc., et al.*

Jun. 30, 2008 Defendants' Answers to Plaintiff's Third Set of Interrogatories (Nos. 10-17), USDC D. Minn. C.A. No. 07-cv-JNE-JJK *VistaPrint Technologies Limited* v. *123Print, Inc., et al.*

Defendants' Amended Prior Art Statement dated Jun. 16, 2008, USDC D. Minn. C.A. No. 07-cv-JNE-JJK *VistaPrint Technologies Limited* v. *123Print, Inc., et al.*

Preliminary Invalidity Claim Chart for U.S. Patent No. 6,247,011—Amaya Editor/Browser dated Jun. 16, 2008.

Welcome to Amaya. W3C, 2007 [retrieved 2007] Amaya Editor/Browser retrieved from the Internet: <URL: www.w3.org> ABC0016203 to ABC0016424.

Prelimary Invalidity Claim Chart for U.S. Pat. No. 6,247,011—BizCards dated Jun. 16, 2008.

CONF-About Digital-Net, Inc., undated VP0000163 to 165.

Insty-Prints BizCards Online [online]. [Retrieved on Sep. 14, 2000]. Retrieved from the internet: <URL: https://www.banc.com/instyprints/>. [Bates Nos. ABC0011985-11999.

Preliminary Invalidity Claim Chart for U.S. Pat. No. 6,247,011 & One or More of the Design Intelligence, Inc. Patents (ABC0017059-17490) dated Jun. 16, 2008.

(56) References Cited

OTHER PUBLICATIONS

Preliminary Invalidity Claim Chart for U.S. Pat. No. 6,247,011 & Doyle 2/96 Article Entitled "Proposing a Standard Web API" (ABC1745-784) dated Jun. 13, 2008.
Doyle, M., Ang, C. and Martin D. *Proposing a Standard Web API*, Dr. Dobb's Journal (Feb. 1996) pp. 18-26 ABC11748-11754.
Preliminary Invalidity Claim Chart for U.S. Pat. No. 6,247,011 & Doyle's U.S. Patent 5,838,906 (ABC 11320-339) dated Jun. 13, 2008.
Preliminary Invalidity Claim Chart for U.S. Pat. No. 6,247,011 U.S. Patent 5,930,810 issued to Farros et al. (Farros '810 Patent) (ABC0011474-494) dated Jun. 13, 2008.
Preliminary Invalidity Claim Chart for U.S. Pat. No. 6,247,011—iPRINT dated Jun. 13, 2008.
'iPrint Discount Printing Shop Awarded Twice During Internet Grand Opening' dated Jan. 17, 1997, pp. 11-12, PR Newswire Association, Inc. ABC0011639-11640.
'Talk City Welcomes eCommerce to its Internet Community; Launches New Online Shopping Area with FAO Schwarz, Amazon.com, CyberShop, eToys, iPrint, First Auction, ISN's Computer Superstore, Worldview Systems and Talk City's own Company Store' dated Dec. 9, 1997, pp. 4-6, PR Newswire Association, Inc. ABC0011666-11668.
'ecommerceNet Names iPrint Electronic Commerce Winner; VIP (very Innovative Practice) Award Given to Online Print Shop,' dated Nov. 12, 1997, p. 9, PR Newswire Association, Inc. ABC0011671.
'iPrint Announces Personalized Holiday Cards; Now You Can Design and Order Professionally Printed Holiday Cards Directly Online', dated Oct. 27, 1997, pp. 13-14, PR Newswire Association, Inc. ABC0011675-11676.
'Prodigy Partners with iPrint; Internet Discounty Stationary Leader iPrint to Provide Online Design and Printing Services for Prodigy Members' dated Sep. 30, 1997, pp. 15-16, PR Newswire Association, Inc. ABC0011677-11678.
'Internet Discount Stationary Leader iPrint to Offer Online Design and Printing Services via Apple Small Business Website,' dated Sep. 17, 1997, pp. 17-18, PR Newswire Association, Inc. ABC0011679-11680.
'EarthLink Network to Offer Electronic Shopping With Top Retail Brands,' dated Sep. 9, 1997, pp. 19-20, PR Newswire Assocation, Inc. ABC001168-11682.
'iPrint Qualifies for Excite Certified Merchant Program Internet Discount Stationary Leader iPrint Participates in Launch,' dated Sep. 4, 1997, pp. 21-22, PR Newswire Association, Inc. ABC0011683-11684.
'CSi CompuServe Partners with iPrint; Internet Discount Stationary Leader iPrint to Provide Online Design and Printing Services for CSi Members', dated Sep. 3, 2997, pp. 23-24, PR Newswire Association, Inc. ABC0011685-11686.
'TENERON.com and iPrint Inc. Announce Strategic Partnership Agreement' dated Aug. 15, 1997, pp. 25-26, PR Newswire Association, Inc. ABC0011687-11688.
'iPrint Honored for Business Excellence on te Web by IDG's WebMaster Magazine' dated Aug. 15, 1997, pp. 27-28, PR Newswire Association, Inc. ABC0011689-11690.
Post-Newsweek Business Information, Inc. Newsbytes. Online Printing Company Introduces Cyberstationary. Moffett Field, California, USA, Jul. 30, 1997 [online] [retrieved on Jul. 9, 1997]. ABC0011691-11692.
PR Newswire Association, Inc. Financial News. Internet Stationary Leader iPrint Helps San Francisco Bay Area Business Cope With the Costs of Area Code Changes. iPrint Discount Print Shop Provides Online Design and Printing Services. NASA Ames Research Center, Moffett Field, Calif. Jul. 30, 1997 [online] [retrieved on Jul. 31, 1997] ABC0011693.
'iPrint Introduces CyerStationary; iBizCards, iAnnounce, & iInvites Are First ONline Versions of Printed Stationary', dated Jul. 29, 1997, pp. 32-33, PR Newswire Association, Inc. ABC0011694-11695.
'Fee Me', dated Jul. 17, 1997, p. 34, PR Newswire Association, Inc. ABC0011696.

'iPrint, Internet Shopping Network Partner; iPrint to Provide Online Design and Printing for ISN,' dated Jul. 15, 1997, pp. 35-36, PR Newswire Association, Inc. ABC0011697-11698.
'iPrint Partners with ONVILLAGE; iPrint to Provide Online Design and Printing for ONVILLAGE Yellow Pages Customers,' dated Jul. 1, 1997, p. 37, PR Newswire Association, Inc. ABC0011699.
'iPrint Offers Online Discount Printing via Fourll; iPrint Extends Popular Online Design and Printing Service to fourll.com,' dated Jun. 23, 1997, p. 38, PR Newswire Association, Inc. ABC0011700.
'iPrint joins PointCast Connections Superchannel; iPrint Develops Premier Printing Channel on the Internet,' dated Jun. 17, 1997, pp. 39-40, PR Newswire Assocation, Inc. ABC0011701-11702.
'iPrint and onQ Announce Partnership; Internet Discount Stationery Leader iPrint to Provide Online Design and Printing for onQ Gay Forum Members,' dated Jun. 16, 1997, p. 41, PR Newswire Association, Inc. ABC0011703.
'InfoSpace Partners With iPrint; Internet Discount Stationery Leader iPrint to Provide Online Design and Printing for InfoSpace Customers,' dated Jun. 16, 1997, p. 42, PR Newswire Association, Inc. ABC0011704.
'iPrint Adds Labels, New Graphics to Internet Print Shop,' dated Jun. 12, 1997, p. 43, PR Newswire Association, Inc. ABC0011705.
'Self-Service Stationery,' dated May 20, 1997, pp. 44-46, PR Newswire Association, Inc. ABC0011706-11708.
'Internet Stationery Leader iPrint, Inc. Announces Rubber Stamps and Server Clustering,' dated May 13, 1997, p. 47, PR Newswire Association, Inc. ABC0011709.
'Printing to the 'Net; Offers printing services over the Internet,' dated May 1997, pp. 48-49, pp. 48-49, PR Newswire Association, Inc. ABC0011710-11711.
'Internet Stationery Leader iPring Helps Seattle Business Cope With the Costs of Area Code Changes; iPrint Discount Print Shop Provides Online Design and Printing Services at up to 70% Off of Traditional Commercial Print Costs,' dated Apr. 30, 1997, p. 50, PR Newswire Association, Inc. ABC0011712.
'Internet Stationery Leader iPrint Partners with Fourll's RocketMail; iPrint Internet Discount Print Shop to Provide Online Design and Printing Services for RocketMail Customers in a Co-label Agreement,' dated Apr. 24, 1997, pp. 51-52, PR Newswire Association, Inc. ABC0011713-11714.
'iPrint Lets You Design Your Own Money on the Internet and Save Big $'s,' dated Apr. 1, 1997, p. 53, PR Newswire Association, Inc. ABC0011715.
'Internet Business Card Leader iPrint, Inc. Announces Letterhead and Envelopes Extensions; Now You can Design and Order Discount Envelopes, Letterhead, Even Import Your Company's Logo,' dated Mar. 7, 1997, pp. 54-55, PR Newswire Association, Inc. ABC0011716-11717.
'Shop Lets Customers Be Designers, Via Browser,' dated Feb. 17, 1997, pp. 56-57, PR Newswire Association, Inc. ABC0077718-11719.
'iPrint, the Internet discount printing shop of the future provides commercial thermography using the BCT system,' dated Jan. 31, 1997, pp. 58-59, PR Newswire Association, Inc. ABC0011720-11721.
'BCT announces a strategic agreement with iPrint, the Internet discount printing shop,' dated Jan. 30, 1997, p. 60, PR Newswire Association, Inc. ABC0011722.
'iPrint Discount Printing Shop Awarded Twice During Internet Grand Opening,' dated Jan. 17, 1997, pp. 61-62, PR Newswire Association, Inc. ABC0011723-11724.
'Printer Utilities: Page Formatting Programs,' dated May 11, 1987, pp. 63-67, PR Newswire Association, Inc. ABC0011725-11729.
'Indigo Software Ltd. Has unveiled 1print, a forms and graphics generation program for laser printers. Lprint is said to allow the use of an IBM Personal Computer to draw forms and graphics interactively on the screen using a mouse or a cursor and function keys and to save the results as an electronic forml 1print supports printers from Hewlett-Packard Col, Canon, Inc., IBM and NCR Corp. It costs $259. Indigo Software, 1568 Carling Ave., Ottawa, Ont., Canada K1Z 7M5,' dated Mar. 3, 1986, p. 68, New Products; Microcomputers; Software utilities; p. 78 Computerworld, Inc. ABC0011730.

(56) References Cited

OTHER PUBLICATIONS

'SPA Names iPrint a Finalist for Prestigious SPA Codie Award; iPrint Professional Print Shop Sets New Standard for Interactive E-Commerce,' dated Dec. 16, 1997, p. 1, PR Newswire Association, Inc. ABC0011731.
'iPrint Announces Personalized Holiday Cards; Now You can Design and Order Professionally Printed Holiday Cards Directly Online,' dated Oct. 27, 1997, pp. 2-3, PR Newswire Association, Inc. ABC0011732-11733.
'Internet Stationery Leader iPrint Helps San Francisco Bay Area Business Cope With the Costs of Area Code Changes; iPrint Discount Print Shop Provides Online Design and Printing Services,' dated Jul. 30, 1997, p. 4, PR Newswire Association, Inc. ABC0011734.
'iPrint Introduces CyberStationery; iBizCards, iAnnounce, & iInvites Are First Online Versions of Printed Stationery,' dated Jul. 29, 1997, pp. 5-6, PR Newswire Association, Inc. ABC0011735-11736.
'Fee Me,' dated Jul. 17, 1997, p. 7, PR Newswire Association, Inc. ABC0011737.
'iPrint Offers Online Discount Printing via Fourll; iPrint Extends Popular Online Design and Printing Service to Fourll.com,' dated Jun. 23, 1997, p. 8, PR Newswire Association, Inc. ABC0011738.
'iPrint joins PointCast Connections Superchannel; iPrint Develops Premier Printing Channel on the Internet,' dated Jun. 17, 1997, pp. 9-10, PR Newswire Association, Inc. ABC0011739-11740.
'iPrint and onQ Announce Partnership; Internet Discount Stationery Leader iPrint to Provide Online Design and Printing for onQ Gay Forum Members,' dated Jun. 16, 1997, p. 11, PR Newswire Association, Inc. ABC0011741.
'Internet Stationery Leader iPrint Helps Seattle Business Cope With the Costs of Area Code Changes; iPrint Discount Print Shop Provides Online Design and Printing Services at up to 70% Off of Traditional Commercial Print Costs,' dated Apr. 30, 1997, p. 12, PR Newswire Association, Inc. ABC0011742.
'iPrint Lets You Design Your Own Money on the Internet and Save Big $'s,' dated Apr. 1, 1997, p. 13, PR Newswire Association, Inc. ABC0011743.
'Internet Business Card Leader iPrint, Inc. Announces Letterhead and Envelopes Extensions; Now You Can Design and Order Discount Envelopes, Letterhead, Even Import Your Company's Logo,' dated Mar. 7, 1997, pp. 14-15, PR Newswire Association, Inc. ABC0011744-11745.
'iPrint Discount Printing Shop Awarded Twice During Internet Grand Opening,' dated Jan. 17, 1997, pp. 16-17, PR Newswire Association, Inc. ABC0011746-11747.
File History for U.S. Patent 6,247,011 ABC0011755-11768.
Burke, Jonathan. 'Print Merge iPrint wants to become the front end for the entire business forms printing market'. *The Red Herring*, 1997 [online]. Retreived from http://www.redherring.com/hits/03/merge.html. ABC0011971-11984.
Edwards, S., Kingsley, L., Votsch, V., Walter, M. 'Roll over, Gutenberg: how the Web is changing printing,' Seybold Report on Internet Publishing, v2, n1, p. 5(16) Sep. 1997 VP0006144-6162.
CONF USPTO U.S. Appl. No. 08/982,438, Amendment and Examiner Interview Summary, dated Sep. 19, 2000 VP0010767-10785.
Preliminary Invalidity Claim Chart for U.S. Pat. No. 6,247,011— Java in a Nutshell dated Jun. 13, 2008 'Java in a Nutshell' is a book published before the priority date of the patents-in-suit. "Java in a Nutshell: A Desktop Quick Reference for Java Programmers" by David Flanagan (O'Reilly & Associates, Inc., 1996).
Preliminary Invalidity Claim Chart for U.S. Pat. No. 6,247,011— PRINTOVATION™ dated Jun.
'Printovation, Vision/Scope Document' dated Feb. 23, 1998 ABC0002175-2180.
'Printovation, Functional Requirements' dated Feb. 23, 1998 ABC0002181-2205.
'Printovation—Internet Bound Vision/Scope Document' dated Nov. 12, 1997 ABC0002223-2227.
Printovation Business Profile dated Feb. 1997 ABC0007434-7478.
Preliminary Invalidity Claim Chart for U.S. Pat. No. 6,247,011— WebEdit dated Jun. 13, 2008.

CD containing native file Nesbitt Software WebEdit ABC0016903.
Email from <Newshirt@best.com> to nesbitt.com dated Mar. 3, 1996 ABC0016184-16186.
Website <www.nesbitt.com> dated Feb. 17, 1997 ABC0017563-17580.
Preliminary Invalidity Claim Chart for U.S. Pat. No. 6,247,011 & Webwriter (ABC0016045-16077) dated Jun. 13, 2008.
Agenda May 7-9, 1996, Fifth International World Wide Web Conference May 6-10, 1996, Paris, France ABC0016045-16056.
Crespo, A. and Bier, E.A., 'WebWriter: A Browser-Based Editor for Constructing Web Applications,' Fifth International World Wide Web Conference May 6-10, 1996, Paris, France ABC0016057-16077.
Preliminary Invalidity Claim Chart for U.S. Pat. No. 6,247,011— World's Easiest dated Jun. 13, 2008.
'World's Easiest' information sheet ABC0001753.
'Print Now or Print Professionally' Technology Profile dated Feb. 1997 ABC0001757-1799.
Krishna, B.C. '1996, Gutenberg, And the Revenge of Movable Type' dated Oct. 18, 2007 <www.w3.org>ABC11576-11584.
'World's Easiest; Deluxe's World's Easiest Business Essentials DTP software; Software Review; Brief Article; Evaluation' dated May 1997, pp. 3-4, Copyright 1997 Information Access Company, a Thompson Corporation Company; ASAP Copyright 1997 Ziff-Davis Publishing Company PC/Computing ABC0011585-11586.
'Marketing Mix: The castaway client' dated Feb. 6, 1997, p. 5, Copyright 1997 Haymarket Publishing Services Ltd. Marketing ABC0011587.
'Risky business; Deluxe Corp's World's Easiest Business Essentials business printing software; Software Review; Brief Article; Evaluation' dated Feb. 1997, p. 6, Copyright 1997 Information Access Company, a Thompson Corporation Company; ASAP Copyright 1997 Ziff-Davis Publishing Company Windows Sources ABC0011588.
'Risky business; Deluxe Corp's World's Easiest Business Essentials business printing software; Software Review; Brief Article Evaluation' dated Feb. 1997, p. 7, Copyright 1997 Information Access Company, a Thompson Corporation Company; ASAP Copyright 1997 Ziff-Davis Publishing Company Windows Sources ABC0011589.
'World's Easiest Software for OS/2 Warp Ships Today As Part of Deluxe Corporation and IBM Joint Marketing Agreement' dated Dec. 6, 1996, pp. 8-9, Copyright 1996 PR Newswire Association, Inc. PR Newswire ABC0011590-11591.
'World's Easiest Offers Free Holiday Ink Stamp Software on the Internet; Custom Address Stamps Add a Festive Touch to Holiday Greetings' dated Nov. 27, 1996, pp. 10-11, Copyright 1996 PR Newswire Association, Inc. PR Newswire ABC0011592-11593.
'Deluxe Launches World's Easiest Business Cards Limited Edition New FREE Software Download Lets Computer Users Try Before They Buy,' dated Nov. 14, 1996, pp. 12-13, Copyright 1996 PR Newswire Association, Inc. PR Newswire ABC0011594-11595.
'Deluxe Launches Improved World's Easiest On-Line Printing Service; New Software and Services Provide the Easiest Way Yet to 'Print Now or Print Professionally" dated Sep. 25, 1996, pp. 14-15 Copyright 1996 PR Newswire Association, Inc. PR Newswire ABC0011596-11597.
'Deluxe Software Licensed' dated Jun. 13, 1996, p. 16 Copyright 1996 Saint Paul Pioneer Press All Rights Reserved Saint Paul Pioneer Press (Minnesota) ABC0011598.
'Deluxe Corporation Enters Licensing Agreement With IBM IBM Licenses World's Easiest Software for the Aptiva Personal Computer' dated Jun. 12, 1996, pp. 17-18 Copyright 1996 PR Newswire Association; Inc. PR Newswire ABC0011599-11600.
'Deluxe Corporation and IBM Announce World's Easiest Software for OS/2 Warp Environment' dated Apr. 17, 1996, p. 19, Copyright 1996 PR Newswire Association, Inc. PR Newswire ABC0011601.
'World's Easiest Announcements lives up to its name; T/Maker's World's Easiest Announcements announcement design software; Software Review; Evaluation; Brief Article' dated Apr. 1996, pp. 20-21, Copyright 1996 Information Access Company, a Thompson Corporation Company; ASAP Copyright 1996 Ziff Davis Publishing Company Computer Shopper ABC0011602-11603.

(56) References Cited

OTHER PUBLICATIONS

'High Tech Holiday Gifts' dated Dec. 2, 1995, pp. 22-23, Copyright 1995 Cable News Network, Inc. ABC0011604-11605.
'For the World's Easiest Personal Image Bundle, a cliché rings true; T/Maker Co; Software Review; Brief Article; Evaluation' dated Dec. 1995, pp. 24-25, Copyright 1995 Information Access Company, a Thompson Corporation Company; ASAP Copyright 1995 Ziff Davis Publishing Company Computer Shopper ABC0011606-11607.
'Business Image Bundle; T/Maker Co's World's Easiest Business Image Bundle Beginning business graphics software; Windows 95 Buyers Guide; Software Review; Brief Article; Evaluation' dated Dec., 1995, pp. 26-27, Copyright 1995 Information Access Company, a Thompson Corporation Company; ASAP Copyright 1995 Ziff Davis Publishing Company PC/Computing ABC0011608-609.
'Runners Rack Up Mileage' dated Sep. 15, 1995, pp. 28-29, Copyright 1995 The Roanoke Times (Virginia) ABC0011610-11611.
'T/Maker Introduces World's Easiest Software Line; Deluxe subsidiary's software makes creating customized products as easy to use as a push-button appliance' dated Aug. 28, 1995, pp. 30-31, Copyright 1995 PR Newswire Association, Inc. ABC0011612-11613.
'Apple Delivers Next Generation of Portable Performance With New Powerpc Processor-Based Macintosh Powerbook 5300; PowerBook 5300 Models Lead Industry in Price/Performance' dated Aug. 28, 1995 Copyright 1995 PR Newswire Association, Inc, ABC0011614-11617.
'T/Maker Introduces World's Easiest Software Line; a Brand New Line of Software that Makes Creating Customized Products as Easy as Using a Push-Button Appliance' dated Aug. 25, 1995, pp. 36-37 Copyright 1995 Business Wire, Inc. ABC0011618-11619.
'World's Easiest Software Offers Simple Graphics Design' dated Aug. 24, 1995, pp. 38-39 Copyright 1995 Post-Newsweek Business Information Inc. Newsbytes ABC0011620-11621.
'T/Maker Introduces World'S Easiest Software Line; A Brand New Line of Software That Makes Creating Customized Products As Easy to Use As a Push-Button Appliance' dated Aug. 18, 1995, pp. 40-42 Copyright 1995 PR Newswire Association, Inc. ABC0011622-11624.
'Activesystems Announces World's Easiest-To-Use Document Storage and Retrieval Product for Client/Server Environments' dated Mar. 24, 1994, pp. 43-44 Copyright 1994 Canada News Wire Ltd. ABC0011625-11626.
'Activesystems Announces World's Easiest-To-Use Document Storage and Retrieval Product for Client/Server Environments' dated Mar. 24, 1994, pp. 45-46 Copyright 1994 PR Newswire Association, Inc. ABC0011627-11628.
Preliminary Invalidity Claim Chart for U.S. Pat. No. 6,247,011—Applix Anywhere dated Jun. 13, 2008.
Sommergut, W., 'Competing Approaches, Office Solutions for the Slim Client' dated Nov. 1997, Heft 5, ABC0037761-37773.
Bericht, CW, Sommergut, W., 'Widerstreitende Ansätze Office-Lösungen für den schlanken Client' dated Nov. 1997, Heft 5, VP0015588-15598.
'Applix announces Applix Anywhere Office, the most complete Java-based desktop environment for the Sun JavaStation' dated Oct. 29, 1996 <www.thefreelibrary.com> ABC0037982-37987.
'Applix demos one of the first enterprise-aware Sun Microsystems Java web application; World Wide Web becomes transport for new kind of client/server deployment—simplified access to enterprise data for decision support any time, anywhere in the world' dated Nov. 8, 1995 <www.thefreelibrary.com> ABC0037988-37993.
'Anyware Demo' dated 1997 <www.applix.com> ABC0037994-38017.
'Applix helps you to stay ahead of your changing world' dated 1997 <www.applix.com> ABC0038018-38019.
'Applix Anyware' dated 1998 <www.applix.com> ABC0038020-38023.
Applix Web Word demo. Retrieved from Internet: <http://web.archive.org/web/19980429184900/www.applix.com/anyware/demo/webword.gif> ABC0038024-38025.

'Commission File No. 0-25040 Applix, Inc.' U.S. Securities and Exchange Commission Form 10-K/A dated Dec. 31, 2000 ABC0038057-38076.
'Commission File No. 0-25040 Applix, Inc.' U.S. Securities and Exchange Commission Amendment No. 1 to Form 10 K/A dated Dec. 31, 2000 ABC0038077-38161.
'Applix sells off Vistasource, Applixware Office, Anywhere Office, and Cosource' dated May 15, 2001 <www.linuxtoday.com> ABC0038162-38178.
Preliminary Invalidity Claim Chart for U.S. Pat. No. 6,247,011—Corel Office For Java dated Jun. 13, 2008.
Both, D. 'OS/2 Warp' <www.os2bbs.com> Millennium Technology ABC0037827-37838.
'IBM OS/2 Warp 4 screen shots' <toastytechcom> undated ABC0037839-37858.
'OS/2', Wikipedia, undated <en.wikipedia.org> ABC0037859-37879.
'Corel Office—Java Version Beta 1' dated Apr. 16, 1998 <www.somis.dundee.ac.uk> ABC0037880-37898.
'Corel Office fuer OA/2 Warp 4' dated Sep. 25, 1996 <groups.google.com/group/maus.os.os2.talk ABC0037899.
'Corel Office for Java Certified 100% Pure Java' dated May 1, 1997, 2008 Novell, Inc., ABC0037900-37901.
'SOMIS—University of Dundee—Downloadable Goods' Apr. 16, 1998 <www.somis.dundee.ac.uk/pub/downs/goods.htm> ABC0037902-37905.
'Welcome of Corel Office or Java' dated Nov. 19, 1996 <officeforjava.corel.com> ABC0037906-37930.
'WordPerfect for IBM Personal Computers' Version 5.0 WordPerfect Corporation 1989, ABC0037931-37934.
'WordPerfect Suite 8 User's Guide' Corel Corporation Limited, 1997, ABC0037935-37981.
CD containing Corel Office for Java Version 1.0, © Corel Corporation Limited, 1997 ABC0038310.
Preliminary Invalidity Claim Chart for U.S. Pat. No. 6,247,011—SCITEX dated Jun. 13, 2008.
Seybold Special Report 'SSF '95, Part I, Electronic Delivery, High-Res Output, Short-Run Printing' © 1995 Business Wire, © 1994 Gale Group VP0015949-15952.
European Patent Office, Decision revoking the European Patent EP1040428B1, Jun. 25, 2009, Germany, pp. 49.
Pages from the Corel Office for Java website retrieved from archive.org and accompanying affidavit, dated Nov. 19, 1996 and Jan. 13, 1997 and archived Dec. 19, 1996 and Feb. 10, 1997.
Sommergut, Wolfgang,*Office Solutions for the Slim Client*, Mar. 1997, Germany, along with original foreign language version.
Brors, Dieter, *Internet-Office: Office Packages Increasingly Application Servers*, May 1997, Germany, along with original foreign language version.
Michel, Dieter, *Applix Anyware and Corel Office for Java: Thick and Thin*, Jul. 1997, Germany, along with original foreign language version.
Seybold Special Report, *Electricity Delivery, High-Res Output, Short-Run Printing*, Sep. 26, 1995 and Oct. 23, 1995, San Francisco, CA.
Complaint for Patent Infringement, *CreatAds LLC v. Vistaprint USA, Inc.*, Nov. 29, 2012.
File History for U.S. Appl. No. 07/702,052, filed May 17, 1991.
File History for U.S. Appl. No. 08/268,613, filed Jul. 1, 1994.
File History for U.S. Appl. No. 08/288,793, filed Aug. 10, 1994.
Microsoft Corporation, "Microsoft Publisher User's Guide," Version 1.0, 1991.
McHenry, et al., "25 Hottest Careers," Working Woman, vol. 19, No. 7, pp. 37-48, Jul. 1994.
Notice of Allowance and Fee(s) Due, dated Jun. 3, 2013, for U.S. Appl. No. 10/608,981.
Notice of Allowance and Fee(s) Due, dated May 20, 2013, for U.S. Appl. No. 11/543,372.
Examiner's Report issued Apr. 23, 2013 in Canadian Application No. 2,398,171.
Summons to Attend Oral Proceedings Pursuant to Rule 115(1) EPC, with attached annex examination report, issued Feb. 25, 2013 for EP Application No. 01903233.3.

(56) References Cited

OTHER PUBLICATIONS

Edwards, Stephen, et al., "Roll over, Gutenberg: how the Web is changing printing," Sep. 1997; Seybold Report on Internet Publishing; V2, N1, pp. 1-18.

Print outs from Banc JEX Insty Prints online printing catalog, on-line on Internet in 1996-97.

Print outs from BizCards Online business card catalog, on-line Internet in May 1997.

Print outs from www.iprint.com web site. It is Applicants' belief that this web site was available sometime in early 1997, prior to the Applicants' filed. This is not admitted as a fact, however, as this has not been independently comfirmed by Applicants.

Fallstrom; "Using a Simulator for Testing and Validating a Newspaper Production Decision Support System"; 30th Hawaii Intl Conf on System Sciences; Jan. 1997; pp. 387-396.

Walker, "Supporting Document Development with Concordia", IEEE, 1988, pp. 355-364.

Chamberlin, et al, "Quill: An Extensible System for Editing Documents of Mixed Type", IEEE, pp. 317-326.

Schonhut, et al, "Constructive Page Description", IEEE Computer Graphics and Applications, Mar. 1991, pp. 71-78.

Brooks, "Lilac: A Two-View Document Editor", IEEE, Jun. 1991, pp. 7-19.

House, et al, "An On-Line Communication Print Service for the Demanding Client", SIGDOC'93, pp. 135-140.

Shore, "Acrobat 2.0", Compcon 1995, Mar. 1995, p. 379.

Grazia Bitti, Maria; "A WWW-Based Distributed System for Medical Data Analysis and 3D Reconstruction," Computer Assisted Radiology, Proceedings of the International Symposium, XP002057164, Jun. 1, 1996, pp. 345-350.

Sorgaard, et al., "Problems with Styles in Word Processing: A Weak Foundation for Electronic Publishing with SGML," IEEE, Published in the Proceedings of the 30th HICSS, Jan. 7-10, 1997, pp. 137-146.

Galanter, "Managing Color on the Desktop, from Scanned Image to the Printed Page," ACM SIGUCCS Newsletter, vol. 25, Issue 3, Sep. 1995, pp. 11-13.

Watanabe, et al., "A Document Preparation Paradign Based on the Specification Method of Layout Structure," Tencon '94. IEEE Region 10's Ninth Annual International Conference. Proceedings of 1994, 1994 pp. 887-891 vol. 2.

Ligtenberg, "JPEG++: Selective Compression for High Quality Color Desktop Publishing," IEEE Explore, published in Compcon Spring '91. Digest of Papers, meeting dates Feb. 25-Mar. 1, 1991, pp. 349-353.

Grayson, et al., "Adobe Print Publishing Guide," Adobe System Incorporated, Entire Manual, 1993-1995.

* cited by examiner

Options: Blank Reverse Side
As part of this product order, VistaPrint.com proposes you use this specific option. See below for details.

| Name | Qty | Total Price |
|---|---|---|
| 250 Business Cards | 250 | Free |
| Full-Bleed Document Printing | 1 | Free |
| SubTotal : | | Free |

For promotional purposes, VistaPrint.com is advertising on the back of every business card we print "Free Business Cards at http://www.vistaprint.com"
So, on, so, on...
Option costs: $8.00

☐ Please print my Business Cards with a blank reverse side.

BROWSER-BASED PRODUCT DESIGN

This application is a divisional of prior application Ser. No. 10/608,885 filed on Jun. 27, 2003, which is a divisional of prior application Ser. No. 09/557,571 filed on Apr. 25, 2000 issued as U.S. Pat. No. 6,650,433, each of which is hereby incorporated by reference in its entirety.

TECHNICAL FIELD

This invention relates to managing print jobs.

BACKGROUND

Short-run print jobs, e.g., business cards, letterheads, sell sheets, invitations, announcements, folders, brochures, and marketing materials, are generally printed by commercial printers using relatively small, low cost printing equipment. Because of the set-up time involved in changing from one print job to the next, and the relatively low volumes printed (often less than 1000 units/order), the printing cost is typically relatively high, e.g., $20-50 per thousand square inches ("MSI"). In some cases, several print jobs are manually "ganged" together (consolidated or aggregated) onto a single master, in an attempt to reduce the average set-up time per order. Another strategy for controlling cost, employed by printers of products such as invitations, office stationery, and address labels, is to offer customers a limited selection of papers, formats and colors from which to choose.

Printing costs per MSI are much lower for high-volume high-quality full-color publishing and packaging print jobs, e.g., food labels, consumer good packaging, magazines, catalogues and high volume marketing materials. Publishing and packaging printing is generally done using large, expensive offset printing presses (either web press or sheet feeding of large-format paper stock) in a highly automated large-volume manufacturing environment. Because these presses have high set-up and amortization costs, their use has been focused on long print runs that are typical in the packaging and publishing segments of the printing market.

Attempts have been made to reduce the high cost of short-run printing. Set-up costs may be reduced by using rapid changeover production machinery, digital technologies, thermographic printing, or single-color offset printing. Typically, these techniques assume that each print job is to be processed as a discrete production run subject to economies of scale based on the quantity of that print job.

Another approach has been to preprint high volumes of a standard base product (e.g., invitation "blanks" bearing high quality color graphics) using high quality offset printing, and then to overprint variable, custom text (e.g., the text of the invitation) for each order, typically using simpler printing processes and conventional short run printing methods.

Yet another approach has been to reduce the cost of setting up a print job by letting the customer, or an intermediary other than the printer, be responsible for the layout, sales and administration aspects of the customer's order. For example, some companies, such as Hallmark, have provided WYSI-WYG ("what you see is what you get") terminals at which a customer can view a WYSIWYG display of the item to be printed, and then upload information regarding the print job to a local or remote printing site. Another example of this approach is desktop publishing software, which allows a customer to design a print job on-screen.

Computers have been used to reduce cost and improve efficiency of printing processes, e.g., to make the process of page layout, proofing, approvals and transmission to the printing floor more efficient. For example, in the newspaper and printing industries, on-the-fly page markups have been sent directly to the production floor using digital workflow technology. Prepress software and equipment that automates workflow is also used by printers and graphics professionals. Recently, Internet companies such as Noosh and Impresse have been providing services that improve the efficiency of buyer-seller transactions involving printing, e.g., by giving users of their websites the ability to "connect" with a wide variety of print vendors, from short-run demand printers to long-run offset printers.

SUMMARY

The invention features method for managing print jobs.

In one aspect, the invention features a method including (a) accumulating discrete print jobs electronically from respective customers, (b) aggregating the discrete print jobs into aggregate print jobs, each of the aggregate print jobs being printable at one time on units of an integral print medium, and (b) electronically distributing the aggregate print jobs to respective printers for printing.

Implementations of this aspect of the invention may include one or more of the following features. The integral print medium may include cut sheets of paper, or large rolls of paper designed for use on offset printing web presses, e.g., rolls having roll widths of 20 inches or more. The print jobs are accumulated through web browsers. Printing of the aggregate print jobs is done during periods of otherwise unused capacity. Each of the discrete print jobs includes a run of fewer than 5,000 copies. Printing is done on large-scale offset full-color presses. Aggregating is done automatically.

In another aspect, the invention features a method including (a) defining a two-dimensional grid of discrete print jobs, the print jobs occupying positions along the two dimensions of the grid, the grid corresponding to a substrate to be printed, the print jobs being arranged on the grid so that at least at some different positions along each of the two dimensions of the grid are print jobs that have different content to be printed on the substrate, (b) printing the print jobs on the substrate at their respective positions defined by the grid, (c) cutting the substrate to separate the print jobs, and (d) distributing at least some of the separated print jobs to different customer locations. In some implementations, the print jobs are in different formats, and all of the print jobs are printed on the substrate at one time.

In a further aspect, the invention features a method including defining a two-dimensional grid of discrete print jobs, the print jobs occupying positions along the two dimensions of the grid, the grid corresponding to cut sheets of a substrate to be printed, printing the print jobs on each of the sheets at their respective positions defined by the grid, and cutting the sheets of the substrate along each of the two dimensions to separate the print jobs into rectangular stacks. In some implementations, each stack defines a separate print job.

The invention also features a method including defining a two-dimensional grid of discrete print jobs, the print jobs occupying positions along the two dimensions of the grid, the grid corresponding to a non-preprinted substrate to be printed, printing the print jobs on each of the sheets at their respective positions defined by the grid, and cutting the sheets of the substrate along each of the two dimensions to separate the print jobs.

In another aspect, the invention features a method including defining a two-dimensional grid of discrete print jobs, the print jobs occupying positions along the two dimensions of the grid, the grid corresponding to a substrate to be printed, printing the print jobs in full color on each of the sheets at their respective positions defined by the grid, and cutting the sheets of the substrate along each of the two dimensions to separate the print jobs.

In a further aspect, the invention features a method including receiving orders for discrete print jobs from customers, each of the orders being received at an associated ordering time, each of the orders having an associated delivery time, the periods between the ordering times and the delivery times of at least some of the print jobs being different, aggregating a set of the print jobs that have essentially the same associated delivery time into an aggregate print job to be printed at one time on shared substrate units, and arranging for the production of the aggregate print job at a time that is just ahead of the delivery time. In some implementations, the method also includes adjusting the prices of the discrete print jobs based on the period between the ordering time and the delivery time. The method may also include arranging for the production during periods of unused printing capacity.

The invention also features a method including offering the printing of discrete print jobs to customers in at least two different service levels, one of the service levels including printing the print jobs free for the customers and another of the service levels including charging for the print jobs, receiving orders from customers for print jobs at selected service levels, and aggregating a set of the print jobs for printing at one time on shared substrate units. The service levels may be associated with speed of turnaround, and/or with the presence or absence of third-party advertising on the print job.

In yet another aspect, the invention features a method including receiving orders for discrete print jobs from customers, electronically creating and accumulating non-commodity information associated with each of the print jobs, aggregating a set of the print jobs into an aggregate print job for printing at one time on shared substrate units, and arranging for the production of the aggregate print job using commodity supplies and services including non-preprinted paper as the common substrate, and commodity inks. The arranging for production may include locating printers having unused capacity suitable for the aggregate print job.

In another aspect, the invention features a method including receiving orders for discrete print jobs from customers, automating the generation of non-commodity information associated with the print jobs, aggregating a set of the print jobs into an aggregate print job for printing at one time on shared substrate units, and arranging for production of the aggregate print job in accordance with the non-commodity information. The non-commodity information may include at least one of content, approval service, price, delivery terms, color verification services, quantity, and set up steps.

In a further aspect, the invention features a method including receiving orders for discrete print jobs from customers, defining an aggregate print job comprising a set of the discrete print jobs for printing at one time on shared substrate units, the aggregate print job having a delivery time, enabling printers having equipment not economically suitable for completing individual ones of the discrete print jobs to bid competitively for the aggregate print job up to a time just ahead of the delivery time, and awarding the aggregate print job to one of the printers prior to the delivery time. The enabling and awarding may be done electronically.

The invention also features a method including (a) receiving information defining discrete print jobs each of which is alone economically unfeasible for printing on high volume printing equipment, (b) aggregating sets of the discrete print jobs into aggregate print jobs, each of the aggregate printing jobs being configured for printing at one time on units of a common substrate, the aggregate print jobs being economically feasible for printing on high volume printing equipment, each of the aggregate printing jobs having a defined delivery time, (c) making the aggregate print jobs available up to just before the delivery time, for competitive bidding by printers having the high volume printing equipment, and (d) awarding each of the aggregate print jobs to the printer with the most competitive bid based on predetermined criteria.

In another aspect, the invention features a method including (a) using a high volume printing machine to produce high volume print jobs, each of the high volume print jobs comprising printing of only a large number of identical images one after the other, (b) determining the availability, between high volumes print jobs, of unused printing capacity, (c) bidding for aggregate print jobs that can be produced economically on the high volume printing machine using the unused printing capacity, each of the aggregate print jobs comprising an aggregation of discrete print jobs that would be economically unfeasible to print separately using the printing machine, and (d) printing at least one of the aggregate print jobs.

In a further aspect, the invention features a method including performing graphic design of a discrete print job on a design application that runs on a web browser, transferring the print job to a web server for storage after the graphic design is performed, modifying the print job on the web browser, and updating the print job on the web server after the modifying is done.

The invention also features a method including aggregating discrete print jobs into aggregate print jobs to be produced on units of a common substrate, all of the aggregate print jobs conforming to a standard format, transmitting the aggregate print jobs to a printer electronically, and, at the printer, configuring printing equipment for producing different ones of the aggregate print jobs using the same steps.

In another aspect, the invention features a method including (a) defining a standard template format for containing common graphical information that relates to different discrete print jobs, (b) providing a design tool to enable a designer to create a template that complies with the standard template format and embodies the common graphical information, (c) enabling the designer to deliver the template to a server electronically, (d) enabling users at client machines to use the template to generate different discrete print jobs that conform to the template and include custom graphical information specific to each of the discrete print jobs, and (e) aggregating sets of the discrete print jobs into aggregate print jobs for printing at one time on units of shared substrate.

In yet another aspect, the invention features a method including aggregating discrete high-quality full color print jobs into a single aggregate print job, printing the single aggregate print job using standard process colors and standard un-pre-printed paper on high speed printing equipment, and distributing the aggregate print jobs in electronic files.

The invention also features a method including (a) digitally aggregating discrete print jobs into an aggregate print job to be printed at one time on units of a standard shared substrate, the aggregate print job being defined in a standard compressed prepress data format, (b) sending the aggregate print job to a workstation at a printing site, at the printing site, Raster Image Processing the aggregate print job to create standard color separations, (c) using a computer-to-plate process to create plates based on the color separations, (d) loading the plates onto a high volume press in accordance with a standard predefined protocol, (e) loading units of the standard shared substrate onto the press, (f) printing the aggregate print job onto the standard shared substrate, (g) cutting apart the standard shared substrate units to separate the discrete print jobs, and (h) forwarding the discrete print jobs to different customer destinations.

The invention also features a method including (a) aggregating discrete print jobs into a digital aggregate print job to be printed at one time on units of a standard shared substrate, the placement of the discrete printing jobs within the aggregate print job being defined by a digital aggregation template that represents the locations of cuts that will be needed to separate the discrete print jobs from the aggregate print job, (b) placing a physical embodiment of the aggregation template on the units of the standard shared substrate, and (c) using the physical embodiment of the aggregation template as a guide to making cuts to separate the discrete print jobs. The aggregate print job may include a plurality of aggregated sheets, and be identified by an identifier printed on each aggregated sheet within the aggregate print job. Information printed on the aggregation template may be used to automatically identify each discrete print job.

In another aspect, the invention features a method including (a) aggregating discrete print jobs into an aggregate print job, (b) printing the aggregate print job at a printing site, (c) separating the discrete print jobs by cutting apart the aggregate print jobs, (d) electronically identifying the discrete print jobs as having been completed using a print job identifier, (e) at the printing site placing the print jobs into shipment bins of a parcel carrier that tracks shipments electronically using a shipment identifier, (f) associating the print job identifier with the parcel carrier's shipment identifier, and (g) enabling customers of the discrete print jobs to track the progress of delivery of their discrete print jobs electronically.

In a further aspect, the invention features a method including (a) aggregating discrete print jobs of respective customers into an aggregate print job, (b) printing the aggregate print job at a printing site, (c) separating the discrete print jobs by cutting apart the aggregate print jobs, (d) electronically identifying the discrete print jobs as having been completed using a print job identifier, (e) shipping the discrete print jobs essentially as soon as they are printed, cut and packaged, (f) electronically billing the customers in response to completion of the printing and delivery of the discrete print jobs to a shipper for shipment.

The invention also features a method including printing an aggregate print job, cutting the aggregate print job apart to form different discrete print jobs, automatically printing shipping labels for shipping the different discrete print jobs to different respective customers, and applying the labels to the different discrete print jobs in accordance with identifiers on the labels.

In a further aspect, the invention features a method including (a) providing different kinds of entry ports into a print job execution system, each of the entry polls enabling a user to create interactively a full color print job in accordance with a pre-defined design template, (b) at each of the ports, generating a digital print job file based on the design template and design input of the user, all of the print job files being expressed in a standard design data format, (c) routing all of the digital print job files electronically to an aggregation system, (d) at the aggregation system, assembling selected ones of the digital print job files into aggregate print jobs, all of the aggregate print jobs being expressed in a standard prepress format, and (e) routing different ones of the aggregate print jobs electronically to different printers for printing.

The invention also features an apparatus that includes (a) web browsers configured for interactive design by users of discrete print jobs, (b) a central storage for information about the discrete print jobs that results from interaction with the users, (c) a scalable group of web servers that interact with the web browsers and with the central storage, and (d) a scalable group of printing servers configured to aggregate the discrete print jobs into aggregate print jobs and deliver the aggregate print jobs electronically to printers.

Among the advantages of the invention, short run print jobs can be printed using high-quality, large-volume printing equipment, while reducing printing cost significantly, improving print job quality as compared to alternative short run printing processes, and improving capacity utilization of the printing equipment. In some implementations, the printing cost is less than 10%, or even less than 5%, of the cost of printing an identical item using traditional short run printing techniques. Some implementations also provide a fast possible turnaround time from when the customer places an order until the customer's print job is done, e.g., less than two hours, and allow queuing of print jobs so that expedited print jobs are printed first and lower priority print jobs are printed later. A large number of customers with short-run print jobs can be served by a relatively small number of industrial print subcontractors, to achieve end-to-end automation and aggregation of the print jobs.

Each customer can design a print job directly on a web browser and, if desired, upload the customer's own graphics, e.g., a logo design. Use of the web browser based design capability can replace or enhance traditional methods of graphic design, in which a graphic designer translates a customer's sketch and/or verbal description into a finished design and provides one or more proofs for the customer's approval prior to printing.

The invention allows the printing subcontractors'0 production floors to be organized and operated in a manner consistent with the best-in-class practices for high-volume, high quality publishing and packaging printers, despite the fragmented nature of the custom printing jobs involved. The invention also features a scalable systems architecture, to allow the systems of the invention to accommodate higher volumes of customers and/or printing jobs. Based on real time information provided by printers, order flow can be redirected to those printers who, at a given moment in time, have excess production capacity and are willing to sell that capacity at a price lower than their "fully loaded" production cost.

Customer orders can consist of a variety of document types, layouts and quantities, for a potentially infinite range of order characteristics. Yet the traditionally high cost of managing this variability of order characteristics is reduced or eliminated through a conversion of the variability into a consistently formatted, repetitive stream of pre and post press digital information that is compatible with printing industry standards. Groups of customers (e.g., multiple customers within a single company) are able to share and centrally control common document characteristics (e.g., a template for a brochure layout or a business card design that is shared by multiple persons within the same company), while decentralizing individual purchase decisions, order entry and modifications to text or other variable elements within the documents.

Based on market information and printer information, received both previously and in "real time", the web server host can modify the price, delivery, and product options that are offered to a given customer or set of customers. For instance, if excess production capacity will be available in the next several hours, printers may be willing to temporarily cut their wholesale price in order to fill the near-term capacity, and the web server host could, in response, immediately modify the offers displayed to customers via the Internet so as to increase demand. There is no incremental (marginal/variable) cost to processing a customer's order in a very rapid time (e.g., two hours), and the system allows real time rescheduling of order queues to manage capacity fluctuations. This allows the web server host to charge a higher price for expedited orders without incurring additional cost to provide the expedited service.

Other features and advantages of the invention will be apparent from the description and drawings.

DESCRIPTION OF DRAWINGS

FIGS. 1A and 1B are the top and bottom halves, respectively, of one diagram.

DESCRIPTION

Implementations of the invention include interrelated elements. These elements and their relationships will first be discussed briefly and then later in more detail.

Figure 1:
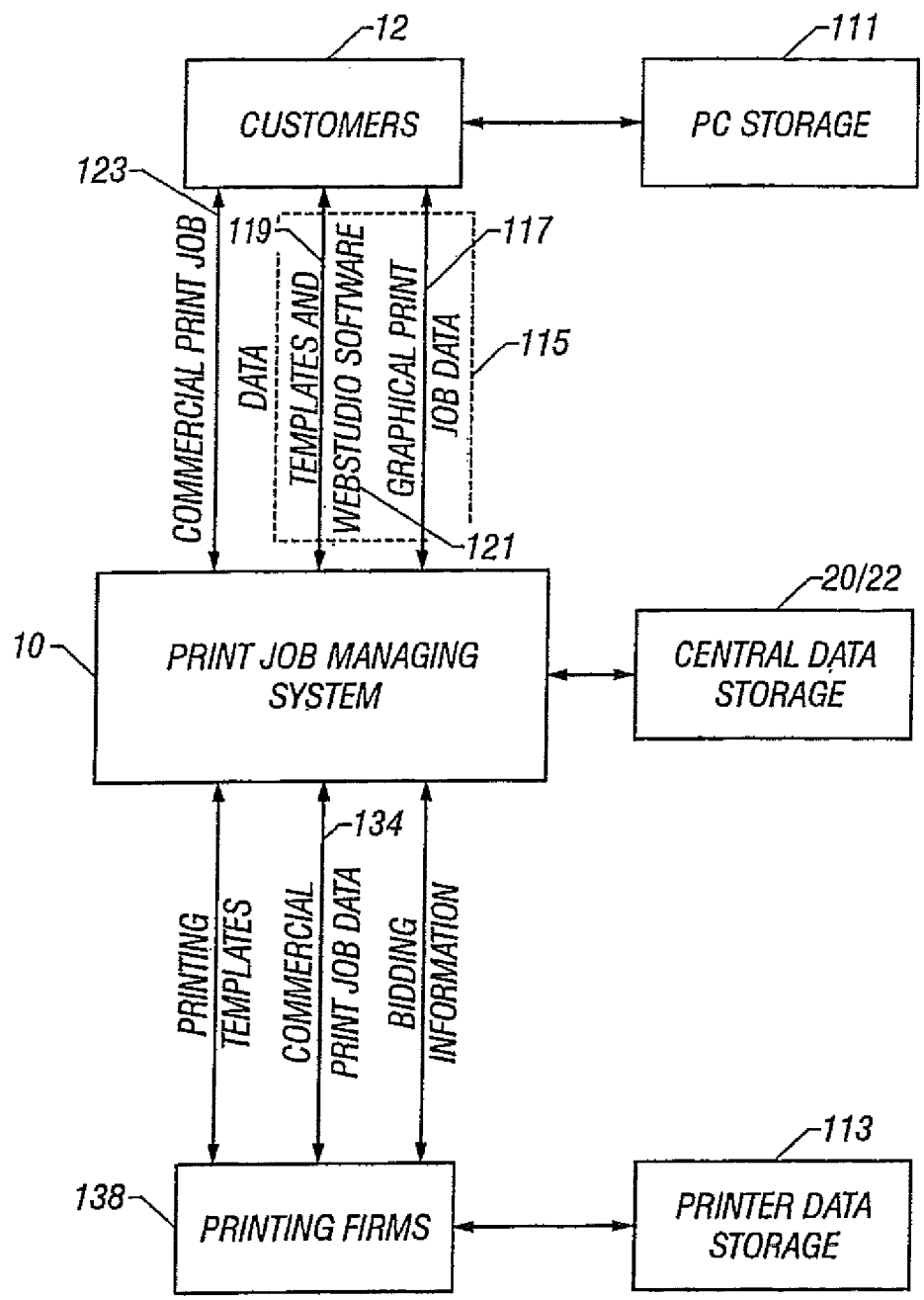
FIGS. 1, 1A, and 1B are schematic block diagrams of a system according to one implementation of the invention.
Figure 1A:
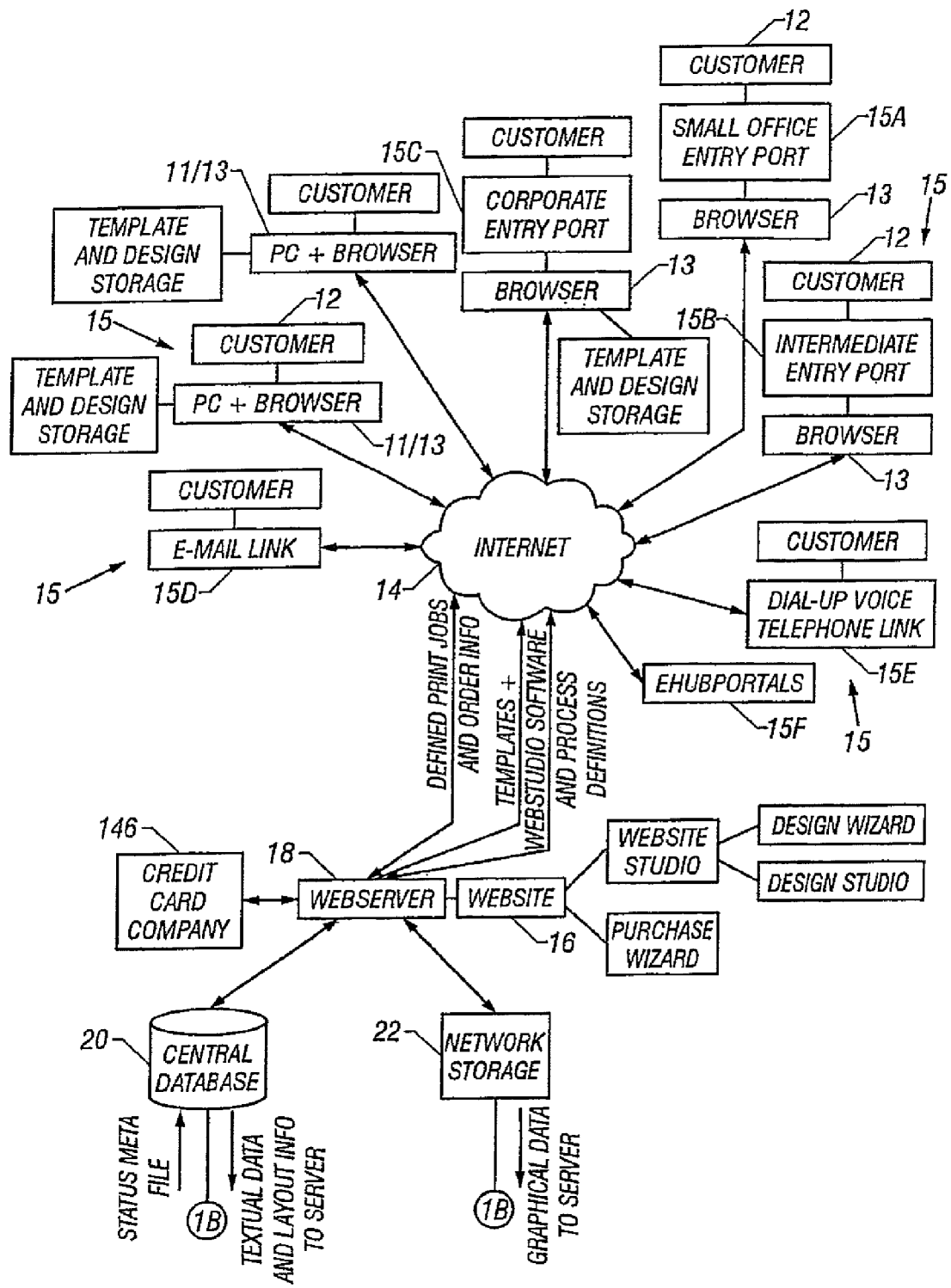
Figure 1B:
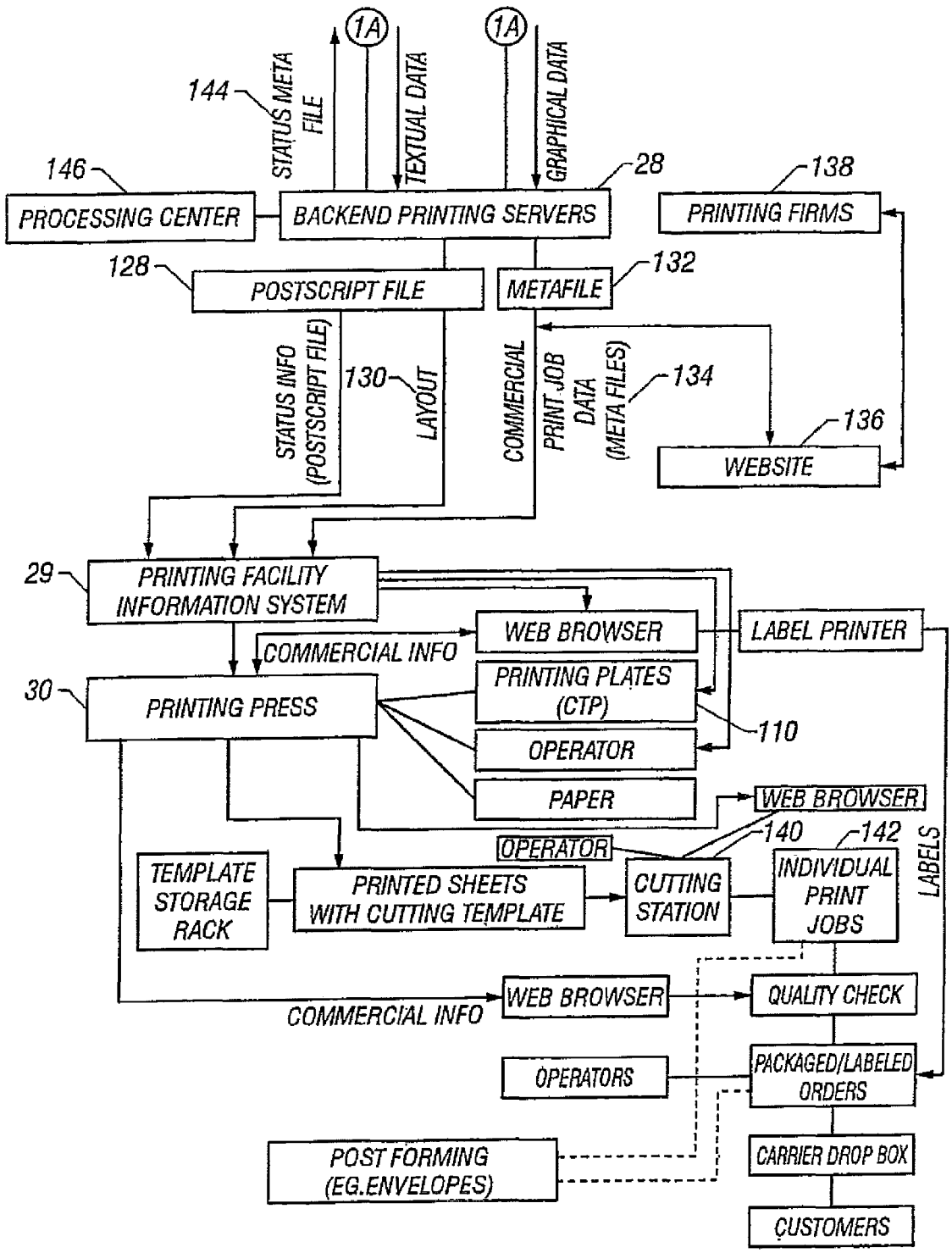

An implementation of a print job management system 10 is shown schematically in FIGS. 1, 1A, and 1B. A potentially enormous number (e.g., thousands or even hundreds of thousands or millions) of individual and commercial customers 12, wishing to place orders for discrete print jobs (generally short run printing jobs, i.e., jobs of less than 40,000 units, typically 250-5,000 units), access the Internet 14 via web browsers 13 (or similar interactive communication software) running on personal computers or other electronic devices 11. Customers can access the system through any one of several different types of entry ports 15 into the print job management system, where some types of entry ports may be characterized by their economic and market characteristics. The types of entry ports could include home office/small office computer entry ports 15a, intermediary ports (such as boutique stationery stores) 15b, and large corporate entry ports 15c (such as a Communications Department of a large corporation). Other entry ports need not be based on web browsers, but could be, for example email links 15d and dial up voice telephone lines 15e. The system can also be integrated with bidding systems or "eHub" bidding sites such as Noosh, Impresse, Collabria and Ariba (ehub portals 15f).

The term "print job" refers to an individual print job, such as a single design version of a brochure for a business in a given quantity such as 1000 brochures. The term "order" is used to refer to a group of print jobs that are ordered at the same time, such as a business card, letterhead, and envelopes for a business. For some customers, individual print jobs could be part of a large corporate communication program that would include hundreds of different documents each bearing common graphic elements and custom text associated with each document.

Through the Internet 14, each customer can access a website 16, that includes a website studio 16a which provides design software that is made available from a central web server 18. The website studio, which will be discussed in further detail below, allows each customer to design one or more custom printing jobs, e.g., business cards, brochures, postcards, folders, letterhead, and envelopes. The customer chooses from a limited selection of standardized papers, formats (provided to the user in the form of templates with user-specified data fields), colors and quantities. The website studio software is downloaded from the server as part of web pages displayed to the user, runs on the user's browser, and enables the user to perform simple design functions by completing a selected template using a Design Wizard, or more complex design functions using a Design Studio, locally on his browser. Typically, only the results of the design process are uploaded to the server as a print job. The templates are created using an XML format or other appropriate format. Alternatively, a customer or a professional designer could generate his own template, using the website studio itself, or using desktop publishing software, and upload it to the server website studio.

As shown in FIG. 1, two kinds of data pass back and forth between the customers and the system, and there are two series of processes that handle this data. The data can be categorized as graphical print data 115 (in FIG. 1, graphical print job data 117, templates 119 and web studio software 121), and commercial print job data 123. Processing of this data is split into two pieces: what goes on between the customers and the system, shown in FIG. 1A, and what goes on between the system and the printers, shown in FIG. 1B. As shown in FIG. 1, there is storage at various points in the system to store the data. For example, some of it is stored in the customer's PC storage 111, some in the system's data storage 20/22, and some at the printer data storage 113.

The system's data storage is shown in more detail in FIG. 1A. The data input by a customer when an order is placed is stored in a central database 20 and/or a network storage 22, depending on the nature of the data, as will be discussed below. The network storage 22 stores all of the graphic files that define a print job, e.g., logos, fonts, backgrounds, layouts and frame designs, while the central database 20 stores, among other things, all of the non-graphical information, e.g., the text to be printed and the business information that is needed to get the jobs printed and delivered. The central database 20 also stores information regarding the customer, e.g., the customer's name and address, and stores the non-graphical elements of the website studio templates (the graphical elements that are stored in the network storage are referenced by the templates and document layouts).

Figure 2A:
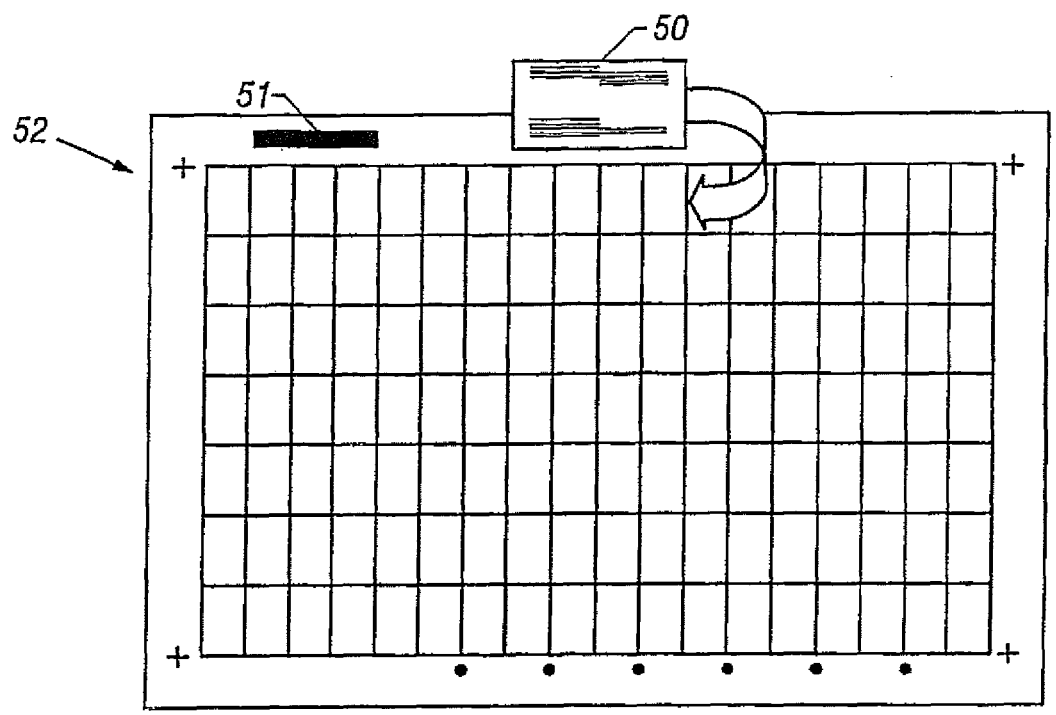
FIGS. 2A-2B are schematic top views of layouts of print jobs.
Figure 2B:
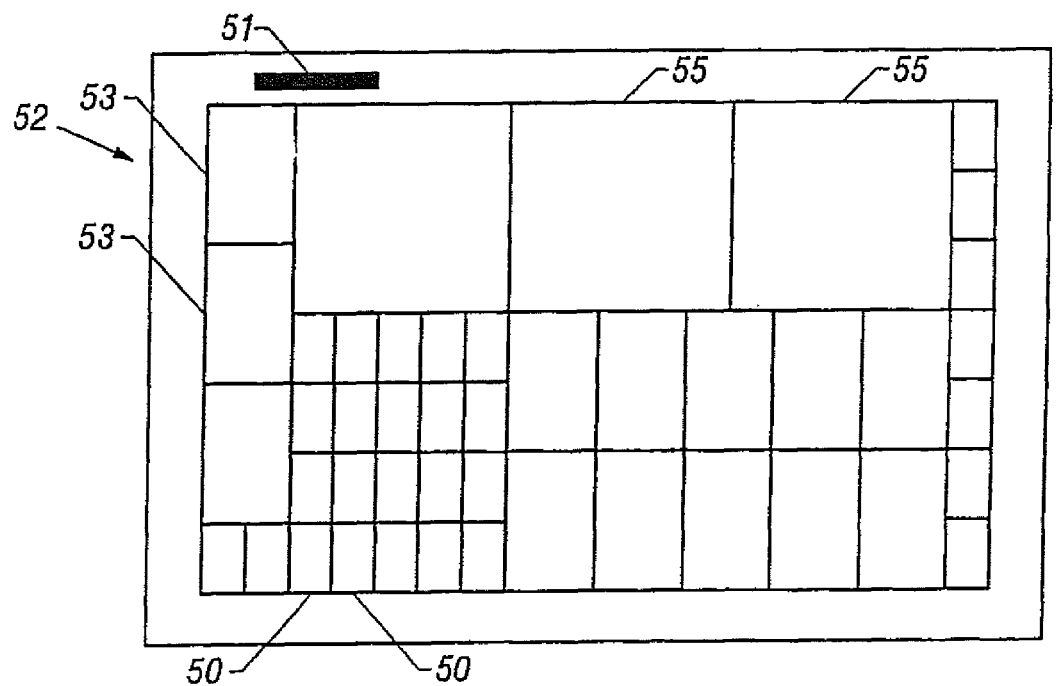

Once the customer has finished designing the print job the customer places an order, e.g., using a Purchase Wizard 16b, as discussed below. The customer's print job is sent to the server in XML format, and the XML file is then converted by the server into a digital format, e.g., into a PostScript file 128 (FIG. 1B). The backend printing servers 28 then automatically aggregate, or "gang together", the customer's PostScript file with multiple PostScript files from other customers to produce a consolidated print sheet (a "layout"). To achieve this, the backend servers assemble the individual PostScript files to create the layout 130 (FIG. 1B), with different individual print jobs arranged on respective portions of the layout. For example, as shown in FIG. 2A, 133 different business card print jobs 50 of identical size could be aggregated into a layout and printed on a single large printing sheet 52, e.g., a large format printing sheet measuring 1.0 meter by 0.6 meter. In other examples, different sizes and shapes of print jobs can be aggregated, e.g., as shown in FIG. 2B and discussed below. The organization of the different print jobs on the layout 130 is defined by aggregation templates that characterize where cuts need to be made after printing in order to separate the different print jobs. The choice of which print jobs to place onto a given layout and in what arrangement is discussed below.

The commercial information related to the customer's order (e.g., the shipping address, shipping date, etc.) is stored in a customer information file 132 (FIG. 1B). The customer information file 132 is aggregated with other customer's files (the same customers whose PostScript files have been aggregated onto the layout), to create an aggregate meta file 134 which contains all of the commercial information for the customers' print jobs. The aggregate meta file 134 also includes commercial information relating to the printing run, e.g., a batch number ("template layout reference number"), the number of sheets to be printed, and the cutting template to be used to cut the printed sheets into individual printed print jobs.

The aggregate meta file is posted by the backend server to a website 136 that is accessible to printing firms 138 wishing to sell their printing services to the web server host. The aggregate meta file 134 includes the commercial details of the print run that will be performed using the PostScript layout file 130 (e.g., number of sheets, type of paper, and deadline). As will be discussed below, printing firms with unused capacity bid for a contract to print the print run. Generally, the contract is automatically awarded to the bidder providing the most competitive bid based on predetermined criteria, e.g., lead time, quality, history, price or other factors. The successful bidder's contractual obligations, and the PostScript layout file and aggregate meta file, are then transmitted by the backend server to that printing firm, e.g., to a server 32 located at the printing site.

The PostScript layout file is converted at the printing facility 29, during RIPing (Raster Image Processing), to the color separated prepress format that is used by standard computer-to-plate systems that produce four-color photolithographic plates 110 (FIG. 1B) for use on automated large scale offset printing presses 30. By large scale offset printing presses we mean either (a) sheet-fed presses with sheet formats of 530.times.740 or larger and straight printing rates of 12,000 sheets per hour or higher, or (b) web presses with roll widths of 20 inches or higher and printing rates of 40,000 iph (inches per hour). Large scale offset printing presses include, e.g., Heidelberg, Speedmaster; and other similar or larger printing press production systems.) The server 32 provides a browser interface for use by people who operate the printing presses ("print operators"). Information about how to set up and perform each of the print runs is provided in a simple format to the print operators through the browser interface, as discussed below. The plates are used to print a desired number of copies on a standard printing paper that is loaded by the print operator using standard four-color process inks, based on meta file information that is provided by the backend printing server to the operator on a web-browser based computer display 32 at the operator's station.

The printed sheets are then transferred to a cutting station 140 (FIG. 1B), where they are cut and sorted into individual print jobs 142, as will be discussed below. In some implementations (such as for presentation folders or envelopes) additional post-print processing is performed such as folding and/or gluing. The orders are then immediately shipped to the respective customers, using shipping information that is displayed on a computer display 34 in the shipping area of the printing facility.

Most customers "pre-pay" (e.g., provide their credit card billing information) upon placing their orders. Some corporate customers may be invoiced. Generally, the customer's credit card is not debited until after the customer's order has been shipped. The backend printing server sends a meta file 144 back to the web server after a shipment has been made, informing the web server of the status of each customer's order. Once an order has been successfully shipped, the backend server interacts with a processing center 146 iso that the customer's account will be debited, or, in the case of a corporate customer, sends the corporation an invoice.

Customer Interface with the Internet

The only requirement for use of the print job management system by a customer who is accessing the system through one of the types of browser-based entry ports described above is a computer that is linked to the Internet by a standard recent web browser, e.g., Microsoft Internet Explorer 4.0 or higher. The customer accesses the website 16 by entering the website URL address into the browser. Other entry ports do not even require that the customer have access to a browser, e.g., a dial-up voice telephone link 15e could be used to enter information by voice or punching keys on the telephone keypad.

The design and order process is conducted through the website. The rest of the system is "invisible" to the customer. The customer's order is printed and delivered to the customer without any requirement for further interaction, although the customer may use the website to track the progress of the order through the printing process and the shipment of the order to the customer.

The Website Studio

The website studio allows the customer to design his own print job, using the browser for design selection and editing. The website studio uses a user-friendly "what you see is what you get" ("WYSIWYG") functionality that allows the customer to choose a base design for a desired printed item (e.g., business card or stationery), and then edit the design. The functionality is similar to that of existing desktop word processing publishing products, making the website easy for most customers to use.

Figure 3:
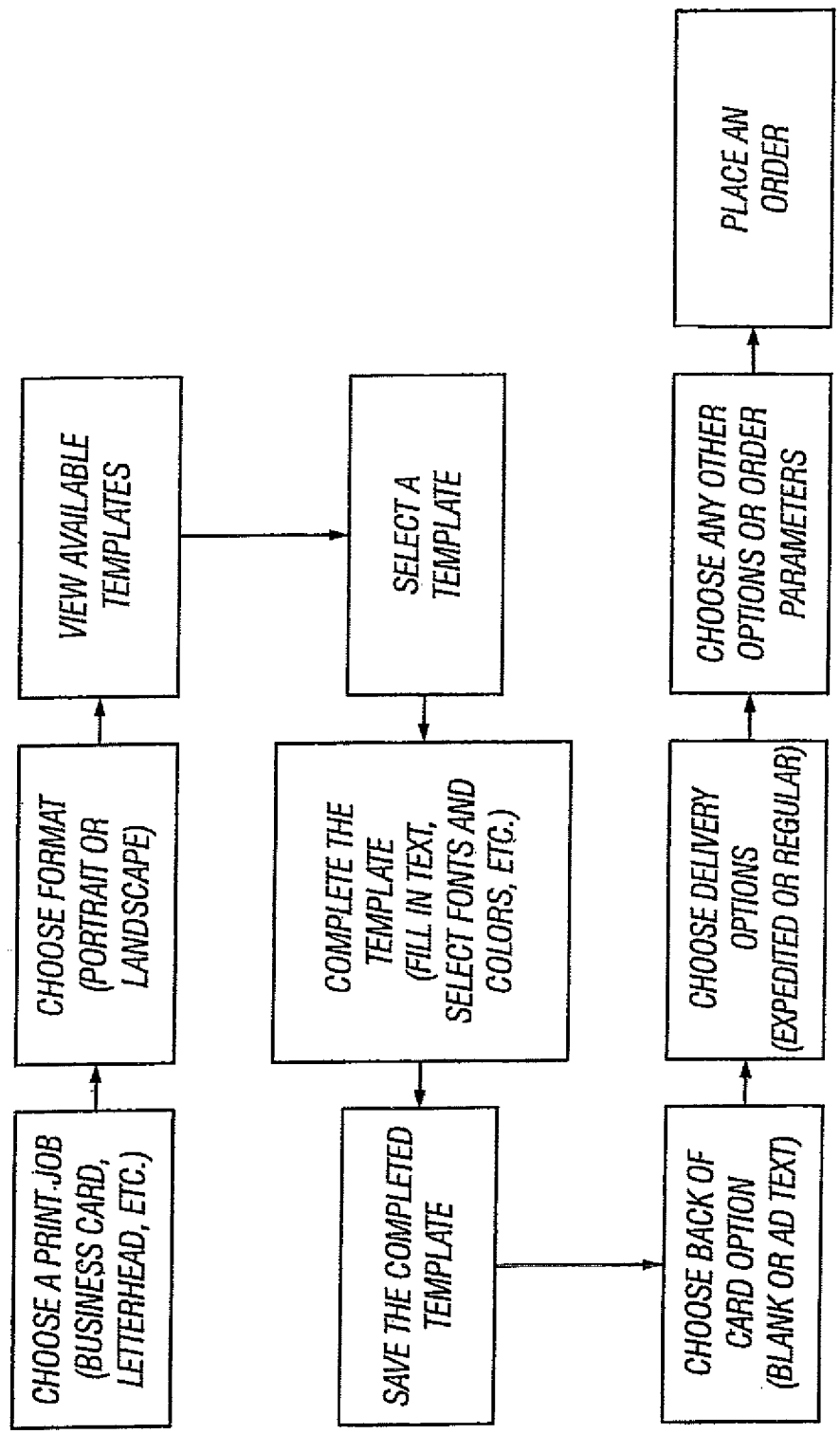
FIG. 3 is a flow diagram illustrating the designing of a print job on a web browser.

As shown in FIG. 3, using the browser and the Design Wizard portion of the website studio the customer can choose a printed item from a wide selection (e.g., business cards, letterhead, invitations, brochures and marketing materials), choose basic options such as page orientation (portrait or landscape), view a variety of design templates that are available for the item and choose one, complete the template (e.g., by supplying new text, uploading graphics files and adjusting fonts), and save the resulting design. The customer can then add the item to his shopping cart, place an order, or perform further design modifications using the Design Studio portion of the website studio. The design process will be described in further detail below with reference to FIGS. 4-4O. Once the customer is satisfied with the design, the customer can add the design to his shopping cart as a print job, and use the Purchase Wizard, discussed below with reference to FIGS. 4P-4W, or other purchase function, to place an on-line order and pre-pay for the order over a secure connection.

The customer is offered a relatively limited selection of standard papers, to allow easy and cost efficient aggregation of print jobs and printer set-up, as will be discussed below. Customers also select from certain predetermined print quantities, e.g., multiples of 250 units (250, 500, 1000, etc.).

The procedure described above would be followed by a customer entering the system from his individual PC. If other entry ports are used, for example an intermediary port 15*b*, some of these steps may be bypassed, e.g., the customer may not use a Purchase Wizard to place and pay for the order.

Figure 4:
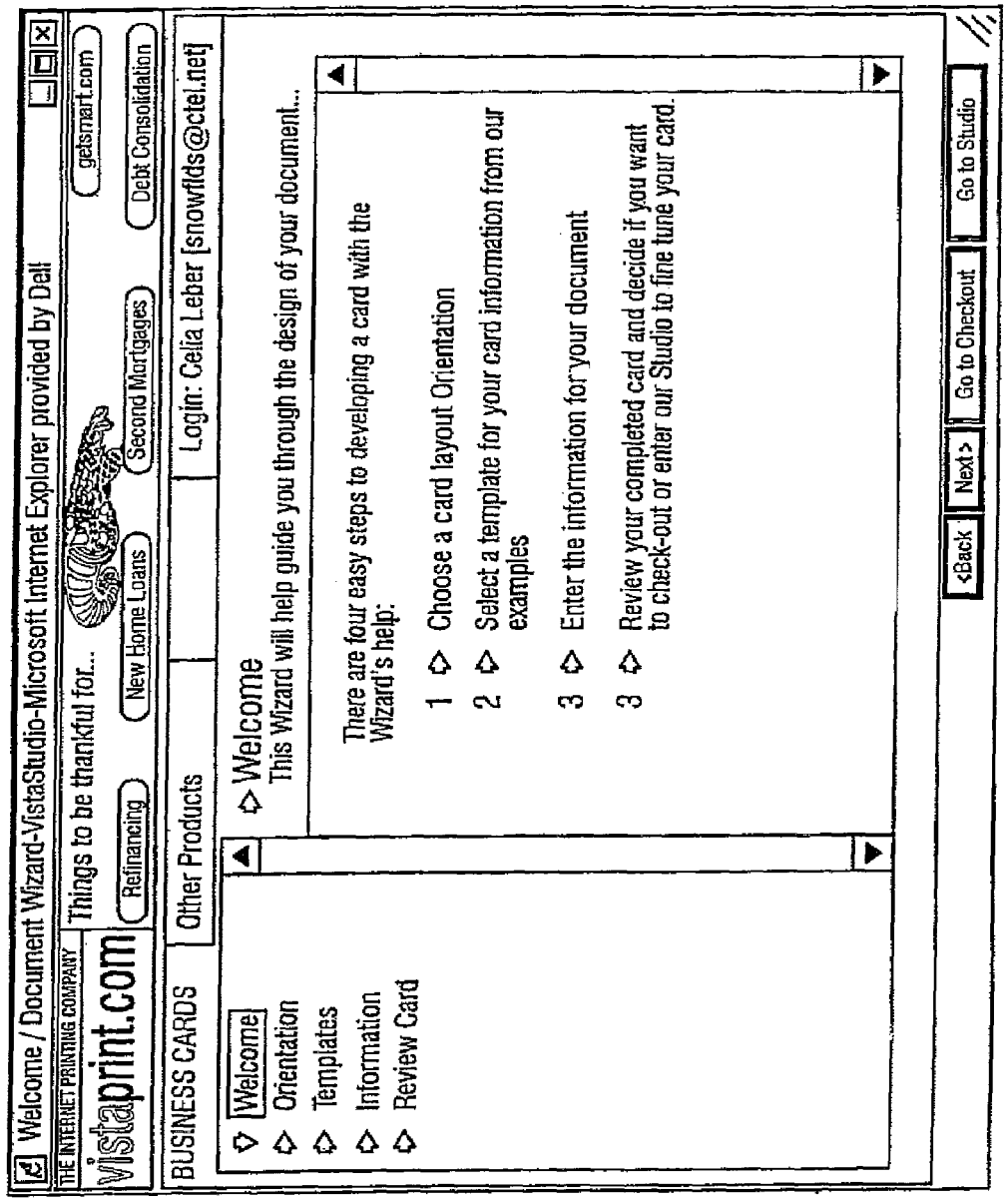
FIGS. 4-4W are webpages according to one implementation.
Figure 4A:
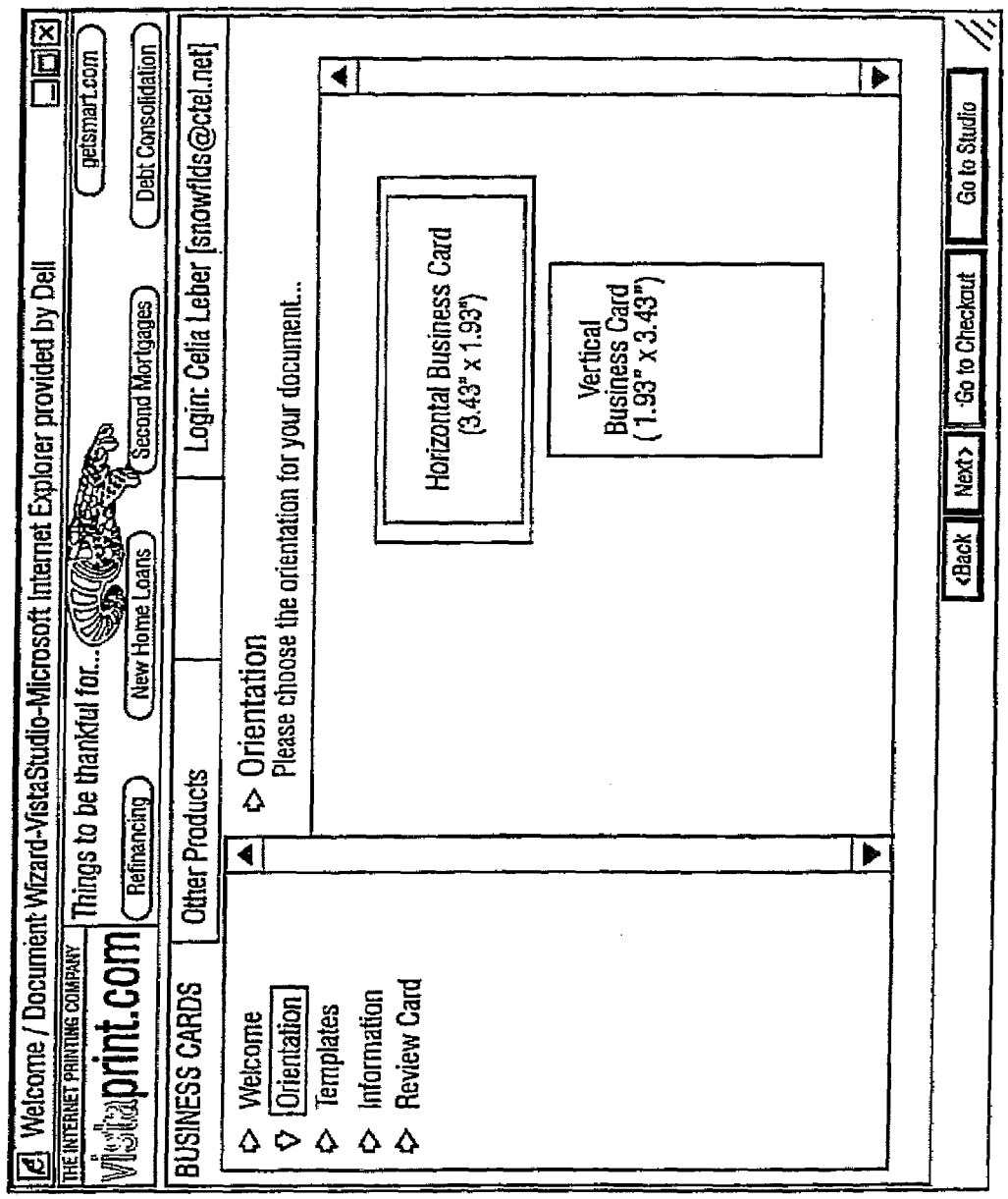
Figure 4B:
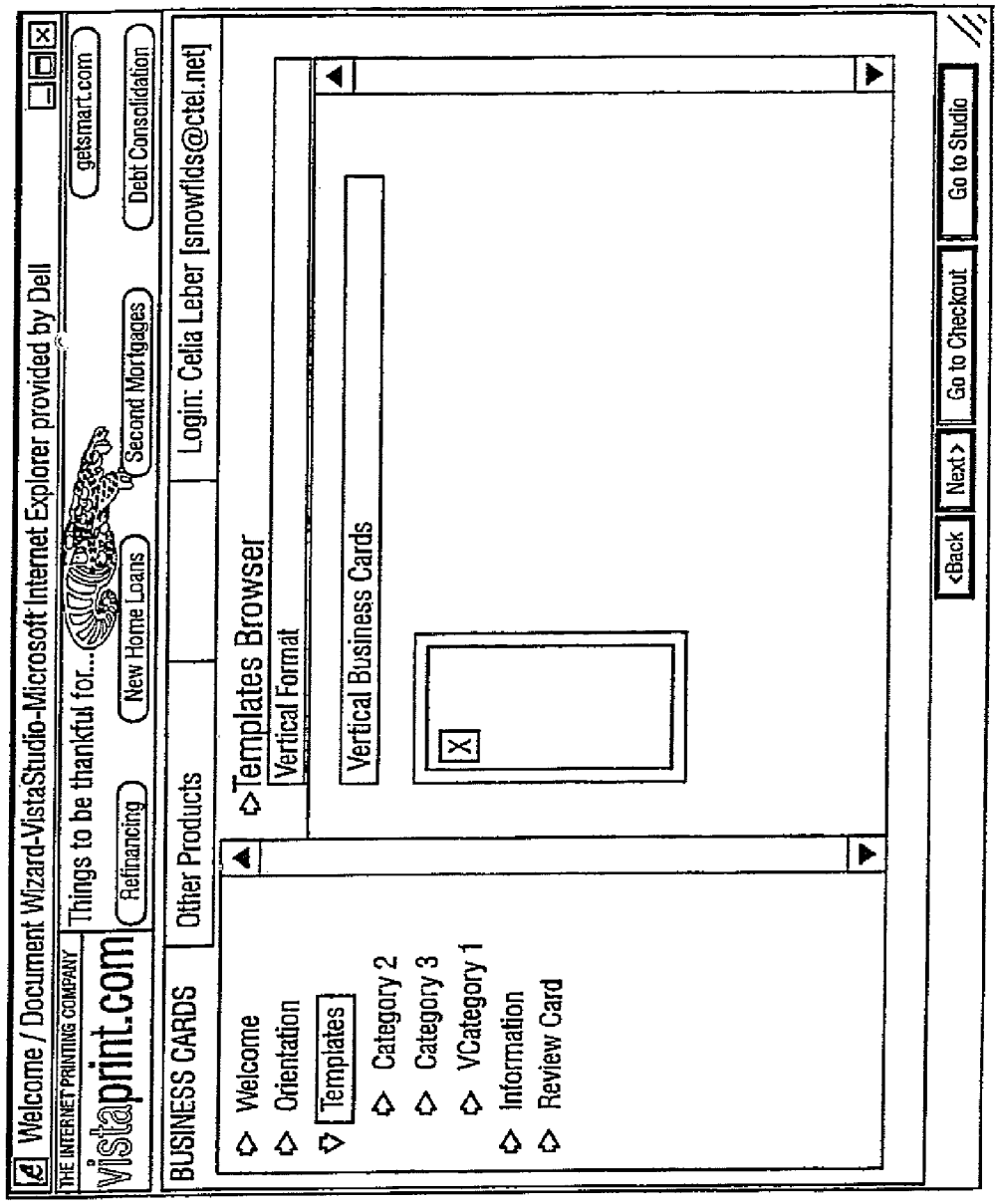
Figure 4C:
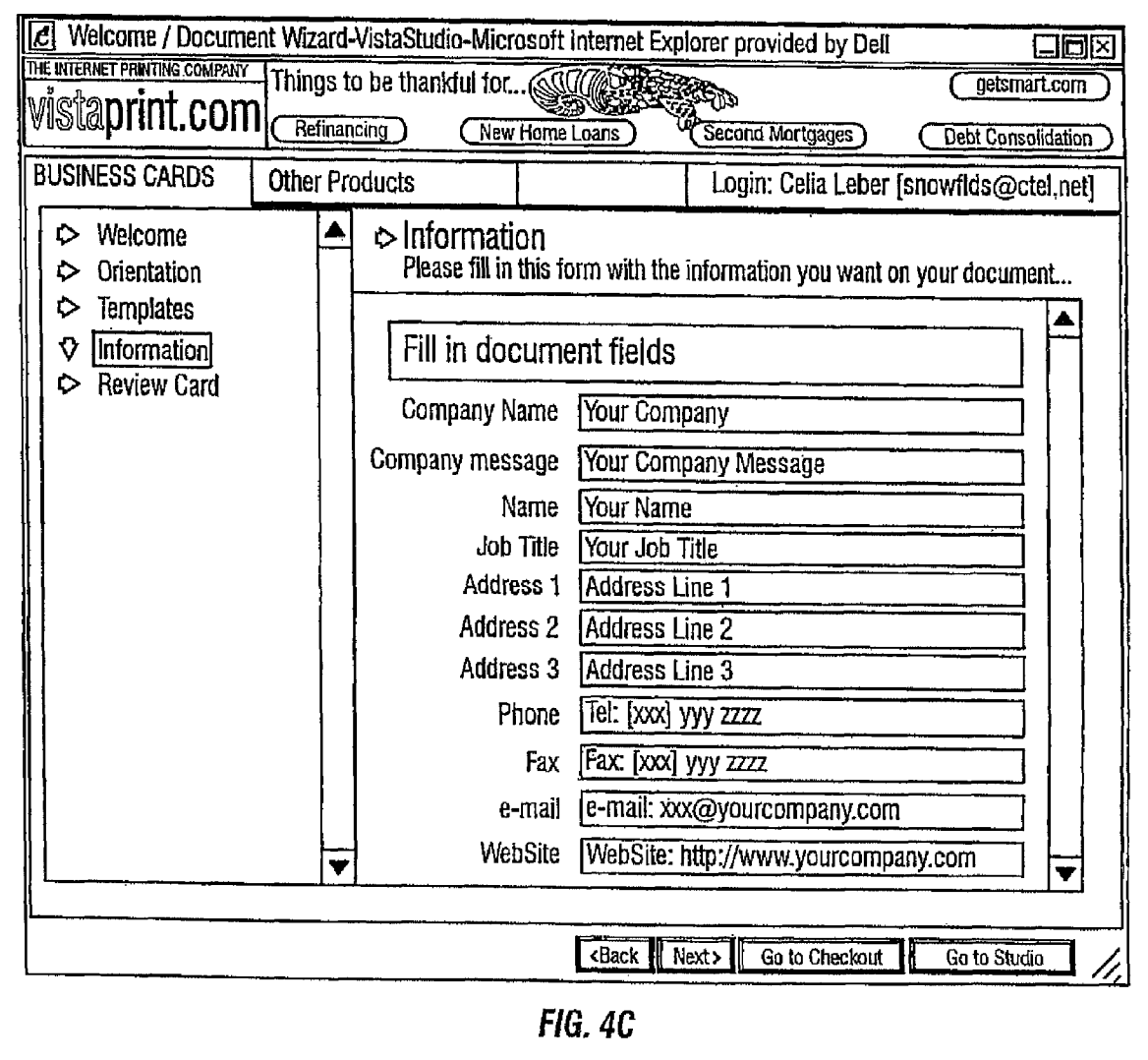
Figure 4D:
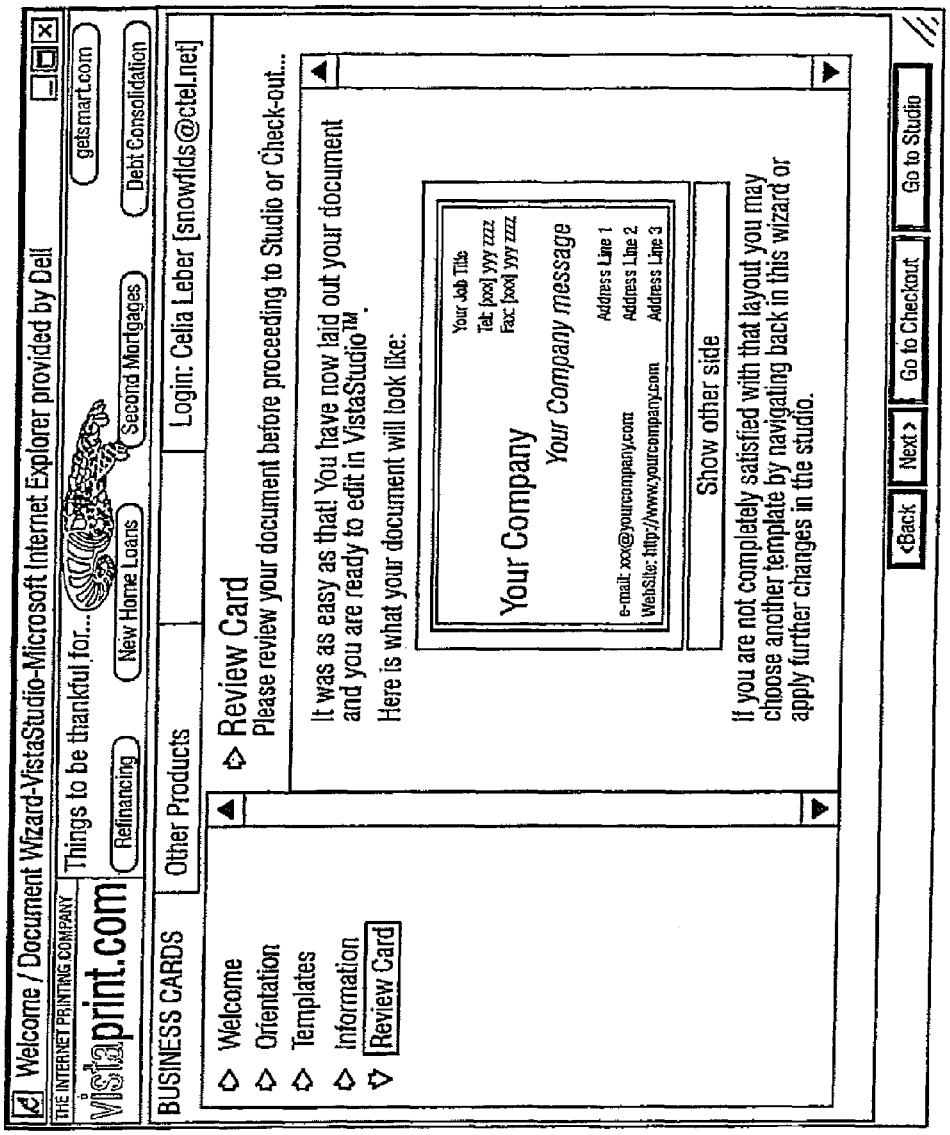
Figure 4E:
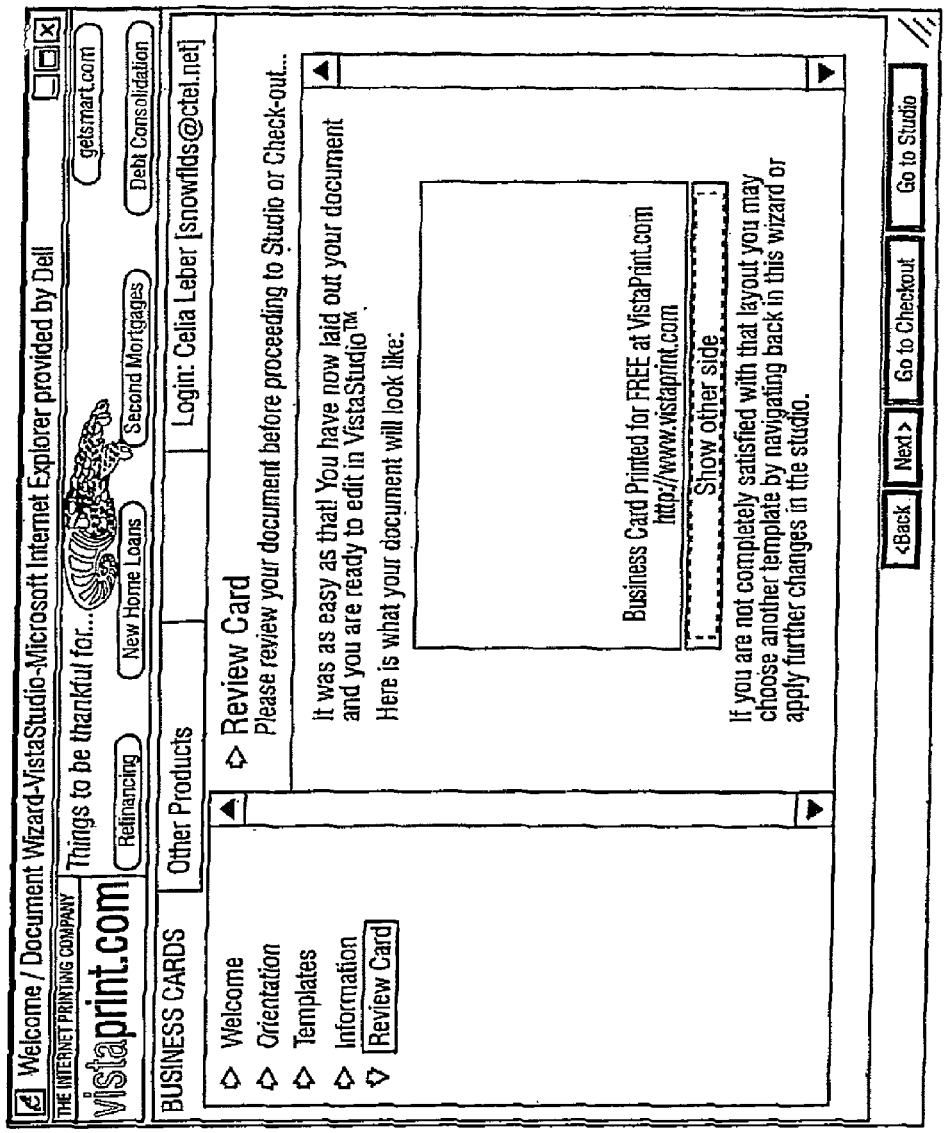
Figure 4F:
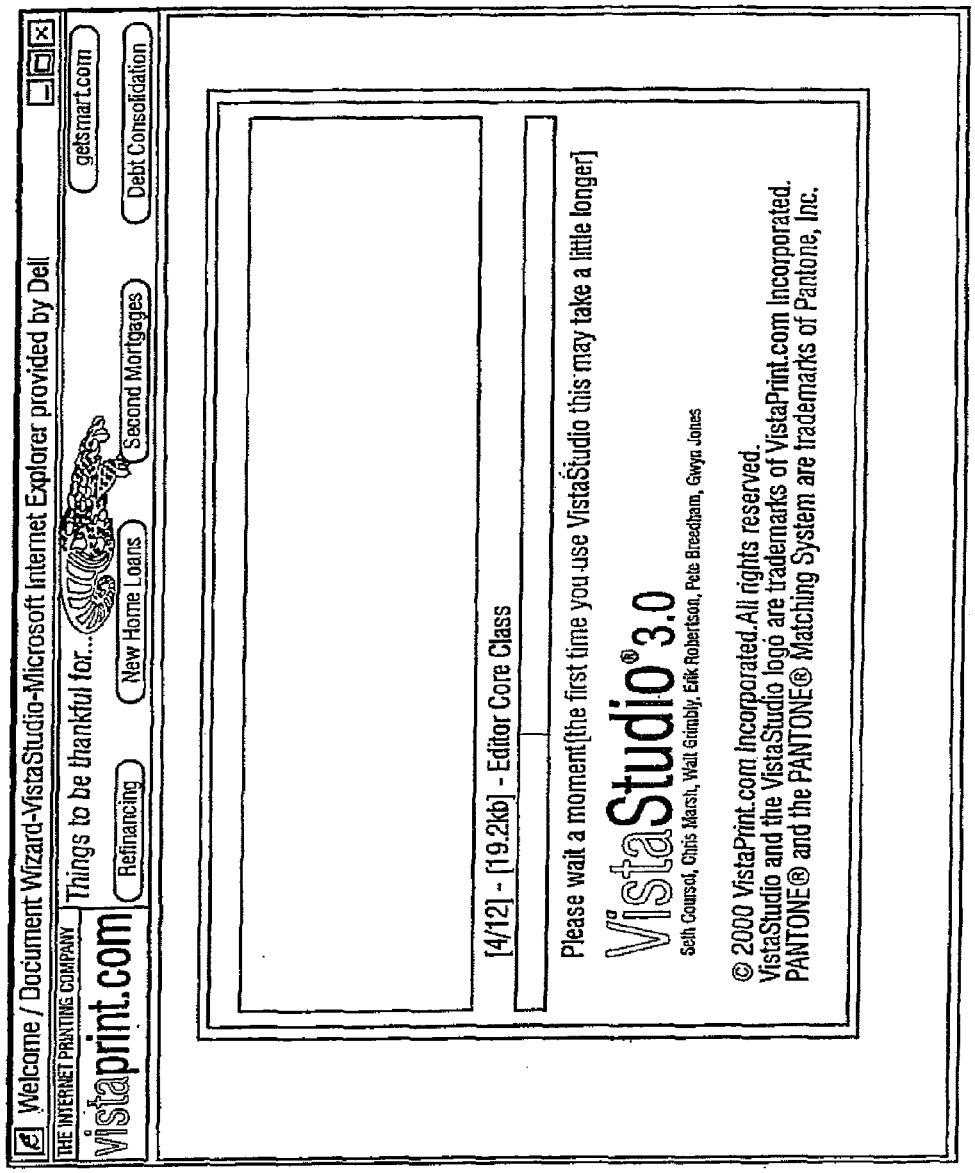
Figure 4G:
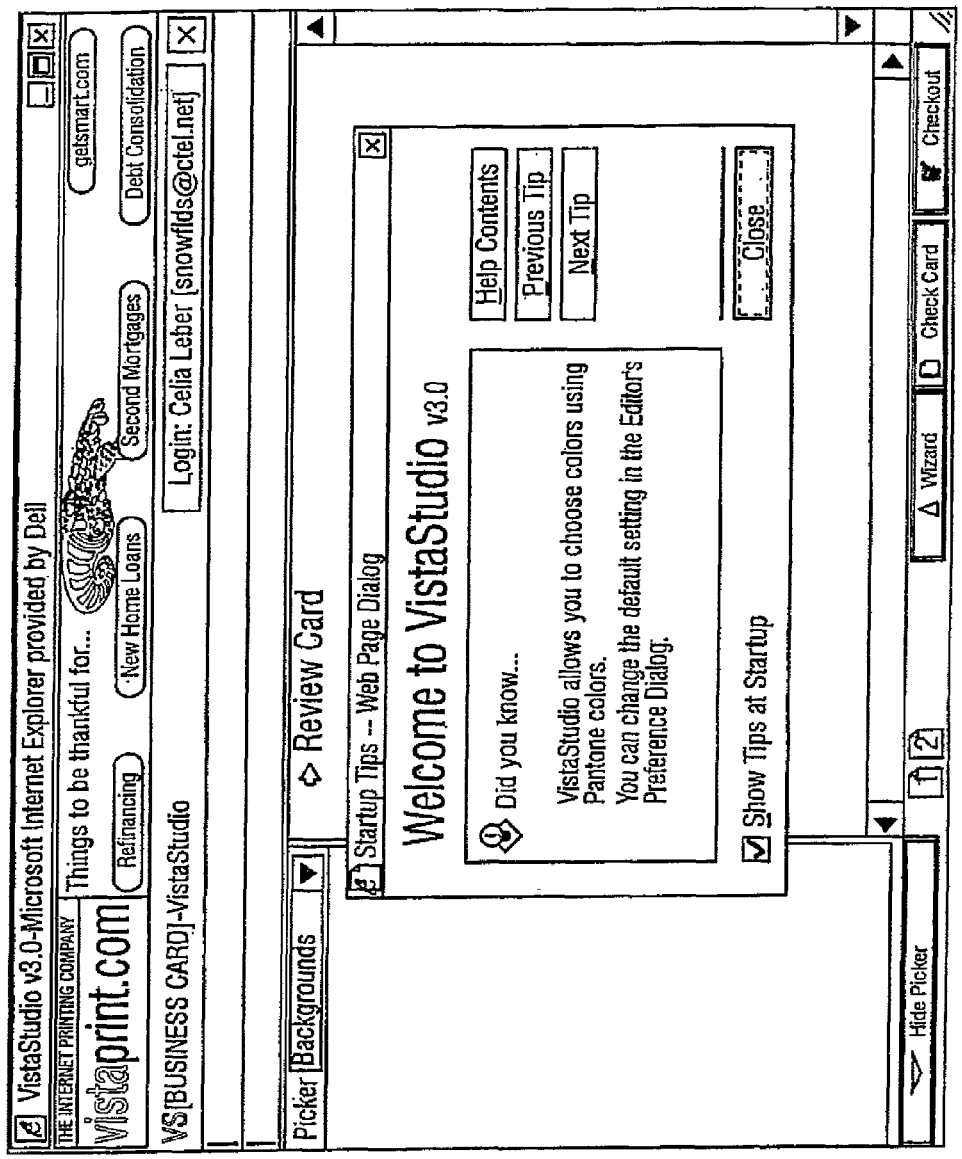
Figure 4H:
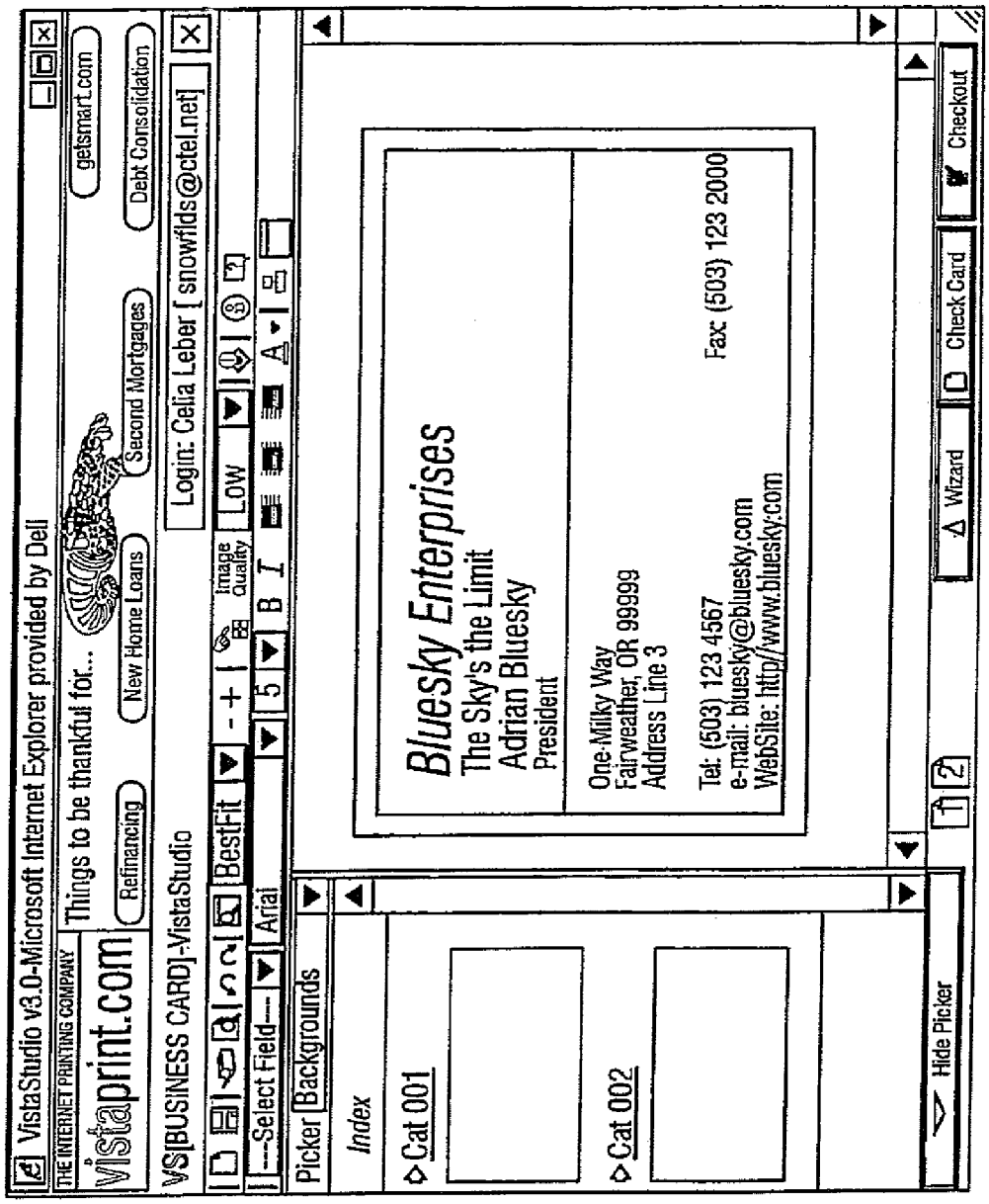
Figure 41:
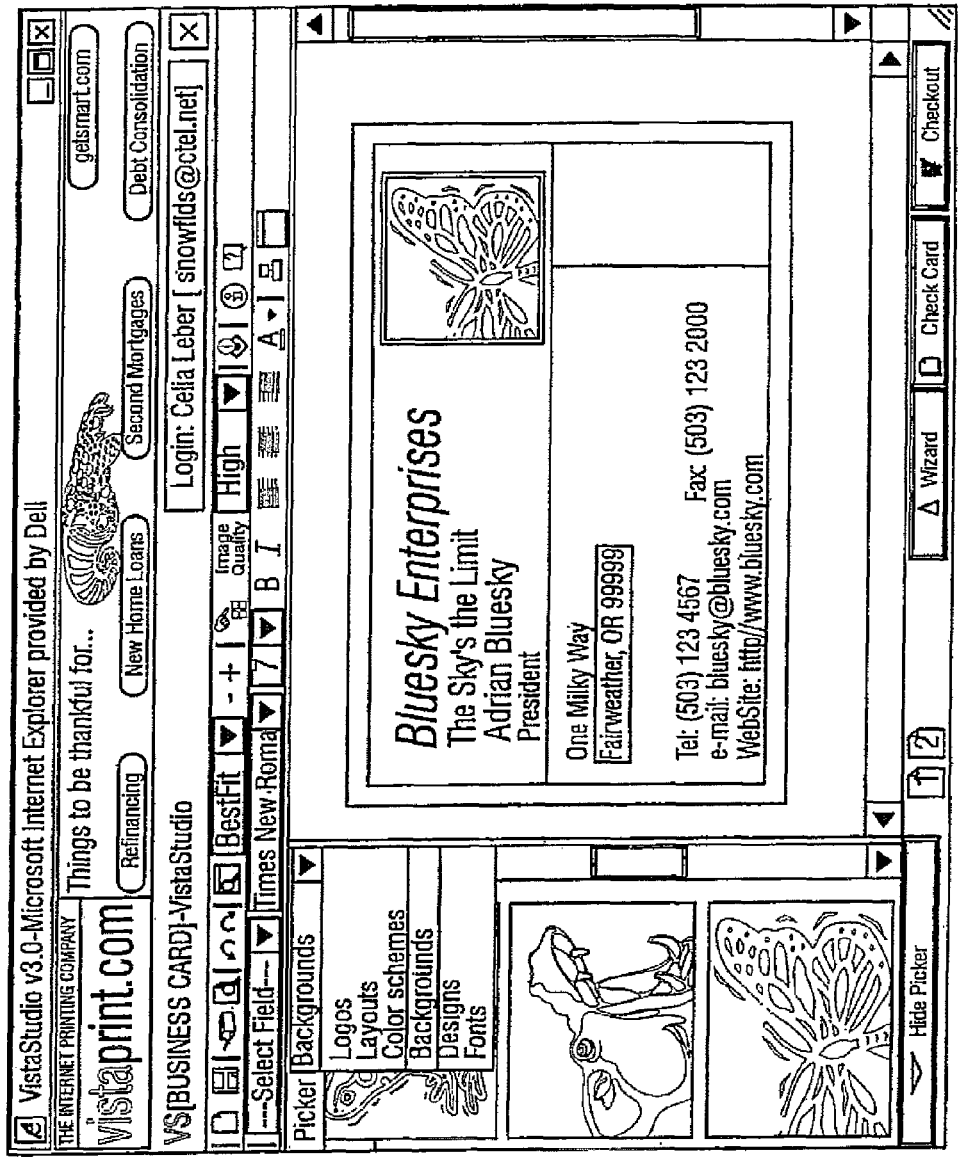
Figure 4J:
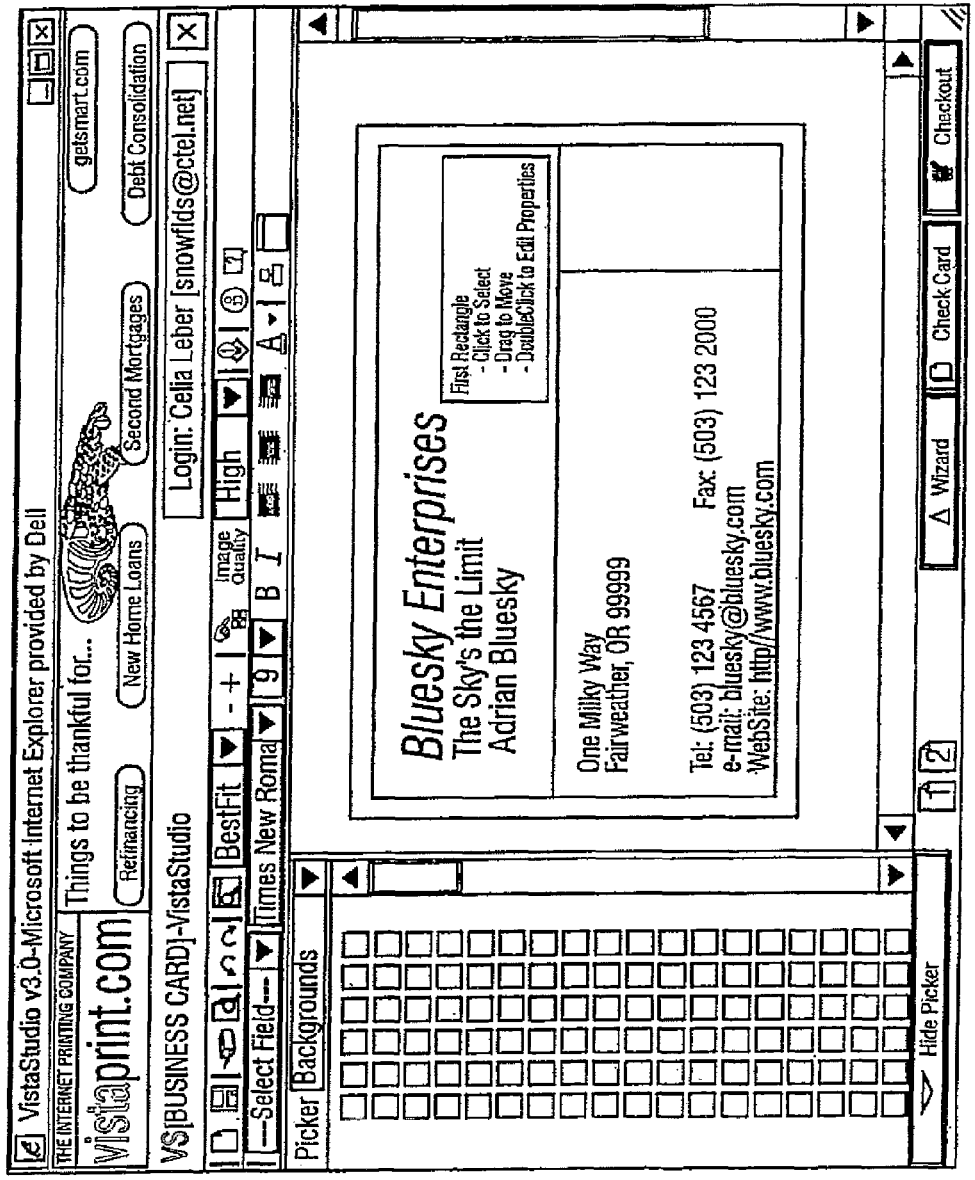
Figure 4K:
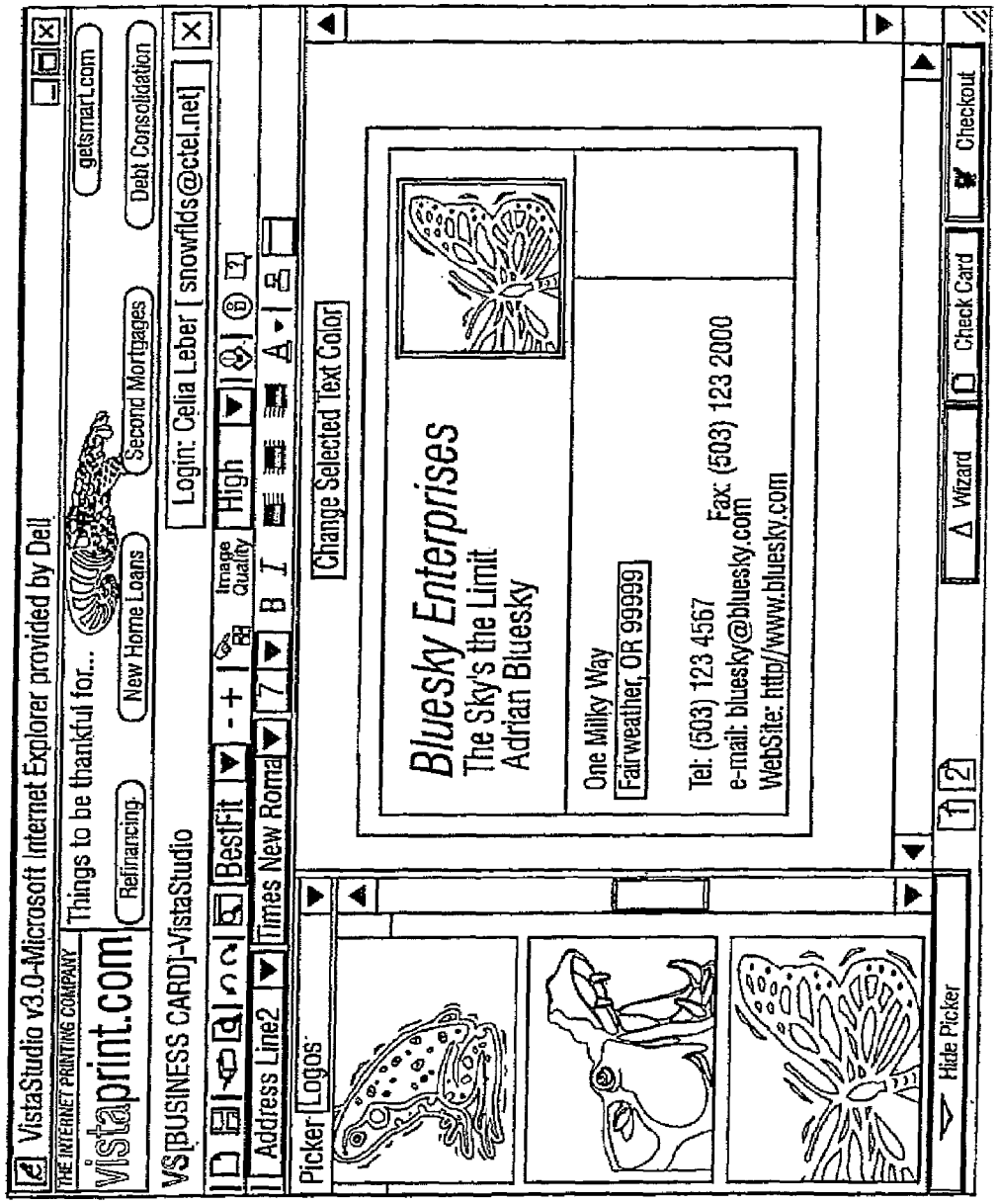
Figure 4L:
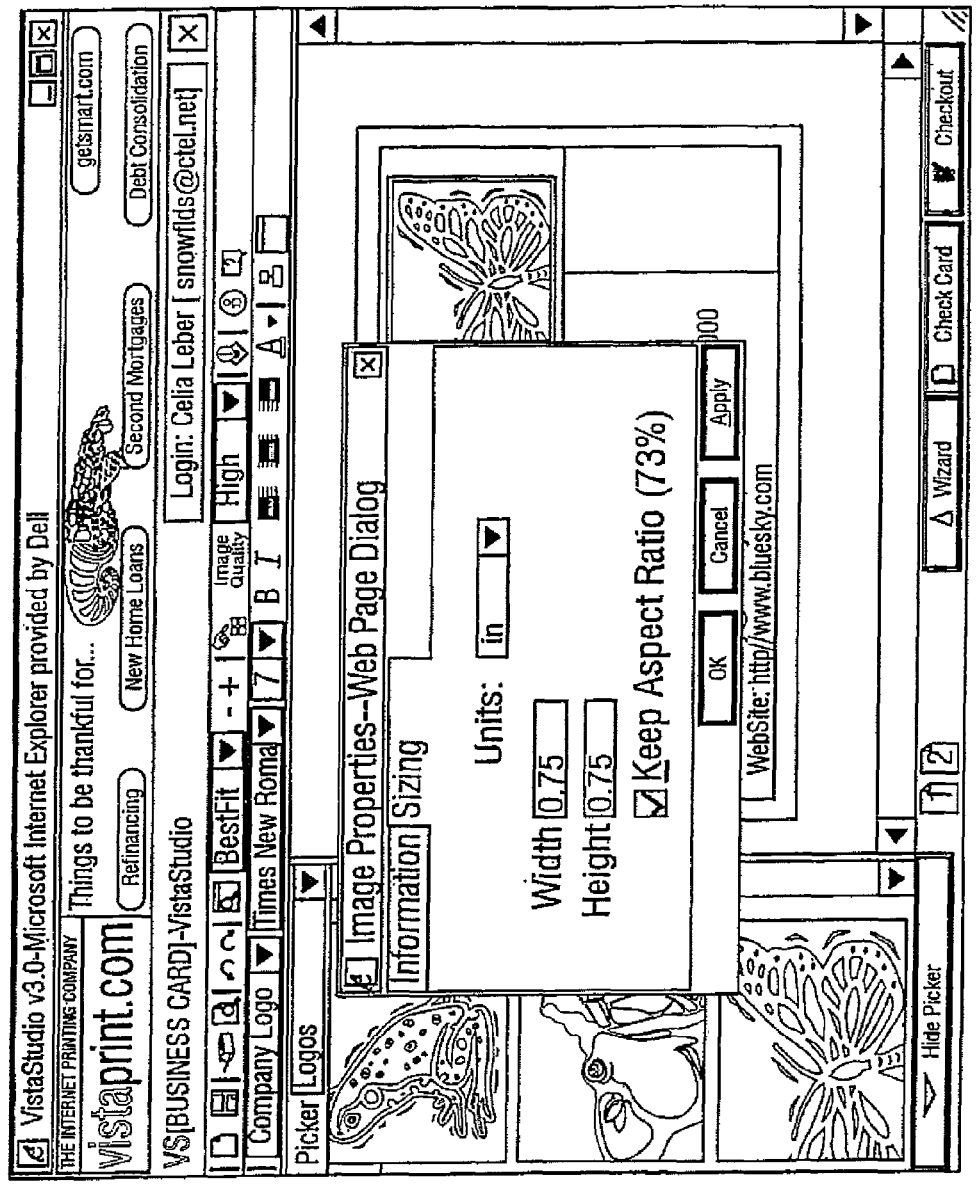
Figure 4M:
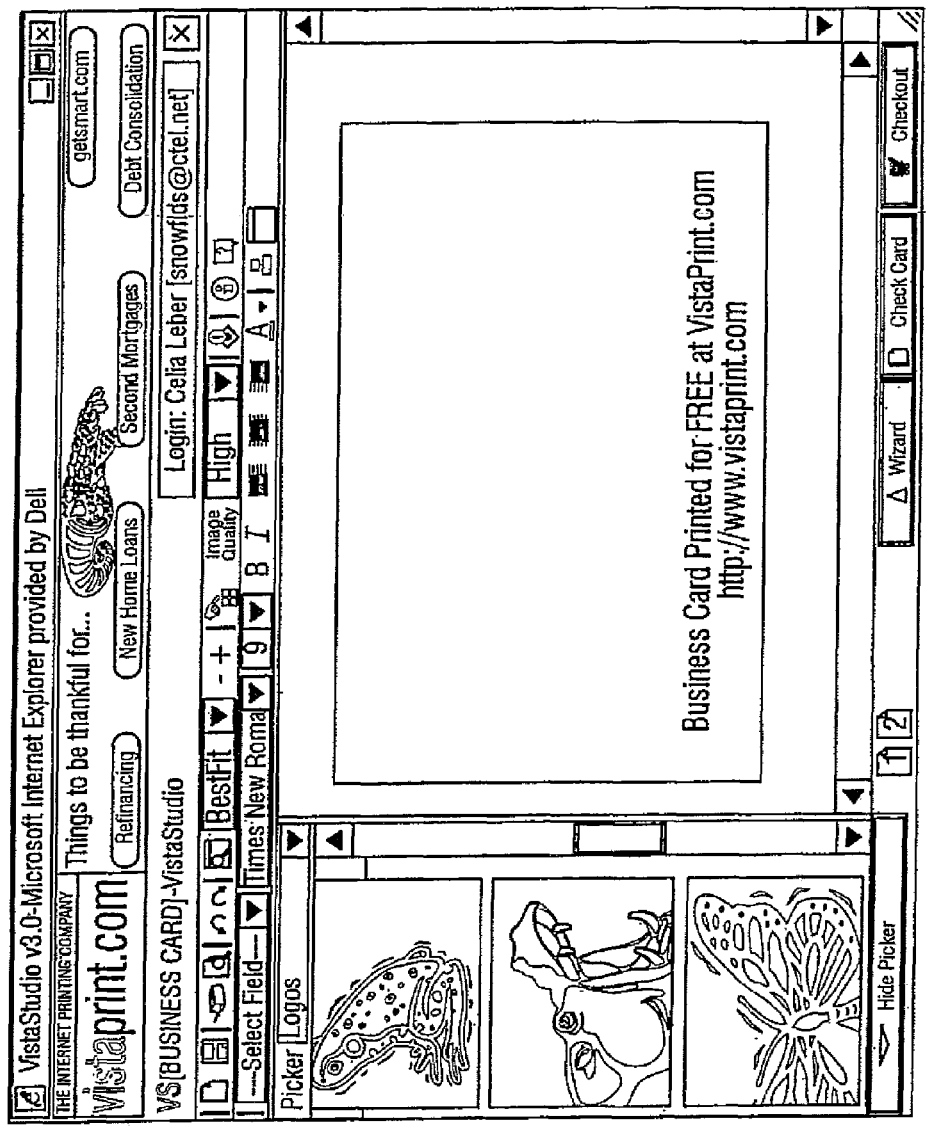

FIGS. 4-4O show webpages from a website studio used in one implementation of the invention. To begin the design process, the customer first navigates from a home page (not shown), to the Design Wizard (FIGS. 4-4E). The Design Wizard is configured to appear to the customer like a standard Windows® Wizard application, e.g., with "back", "next" and "finish" buttons, giving the customer a feeling of familiarity and user-friendliness. In the Design Wizard, the customer selects the item that the customer wishes to design (e.g., business cards or other items, in FIGS. 4-4E). For business card design, the Design Wizard includes a Welcome screen (FIG. 4), an Orientation screen (FIG. 4A) that allows the customer to choose between horizontal and vertical cards, a Template Browser screen (FIG. 4B) that allows the customer to choose between a variety of different design templates (not shown), an Information screen (FIG. 4C) at which the customer fills in a number of fields to complete the selected design template with the customer's information, and Review screens FIGS. 4D and 4E) that allow the customer to review the front and back of the resulting business card. After reviewing the card, the customer can decide to (a) go back and edit the card, (b) go to the Checkout (the Purchase Wizard described below), or (c) go to the Design Studio to perform more complicated design functions (e.g., changing fonts and color schemes).

A Design Studio used in one implementation of the invention is shown in FIGS. 4F-4O. When the customer opens the Design Studio, the customer will first see an initial screen (FIG. 4F) with a loading bar, indicating the status of the downloading of the Design Studio to the customer's browser. Each time something (e.g., a font) is downloaded to the customer's browser from the web server, a similar loading bar will be provided. The Design Studio is configured to have toolbars and other features that are similar to those used in standard word processing and desktop publishing user interfaces, so that again the customer will have a feeling of familiarity with the software and will find the software easy to use. In the case of the loading bar, the user is comfortable with the notion that the application is loading even though it is not being loading in the usual sense of being moved from a hard disk to memory in the user's computer. The Design Studio also includes a standard "Startup Tips" dialog box (FIG. 4G), like other Windows® applications, and a Help system.

Figure 4N:
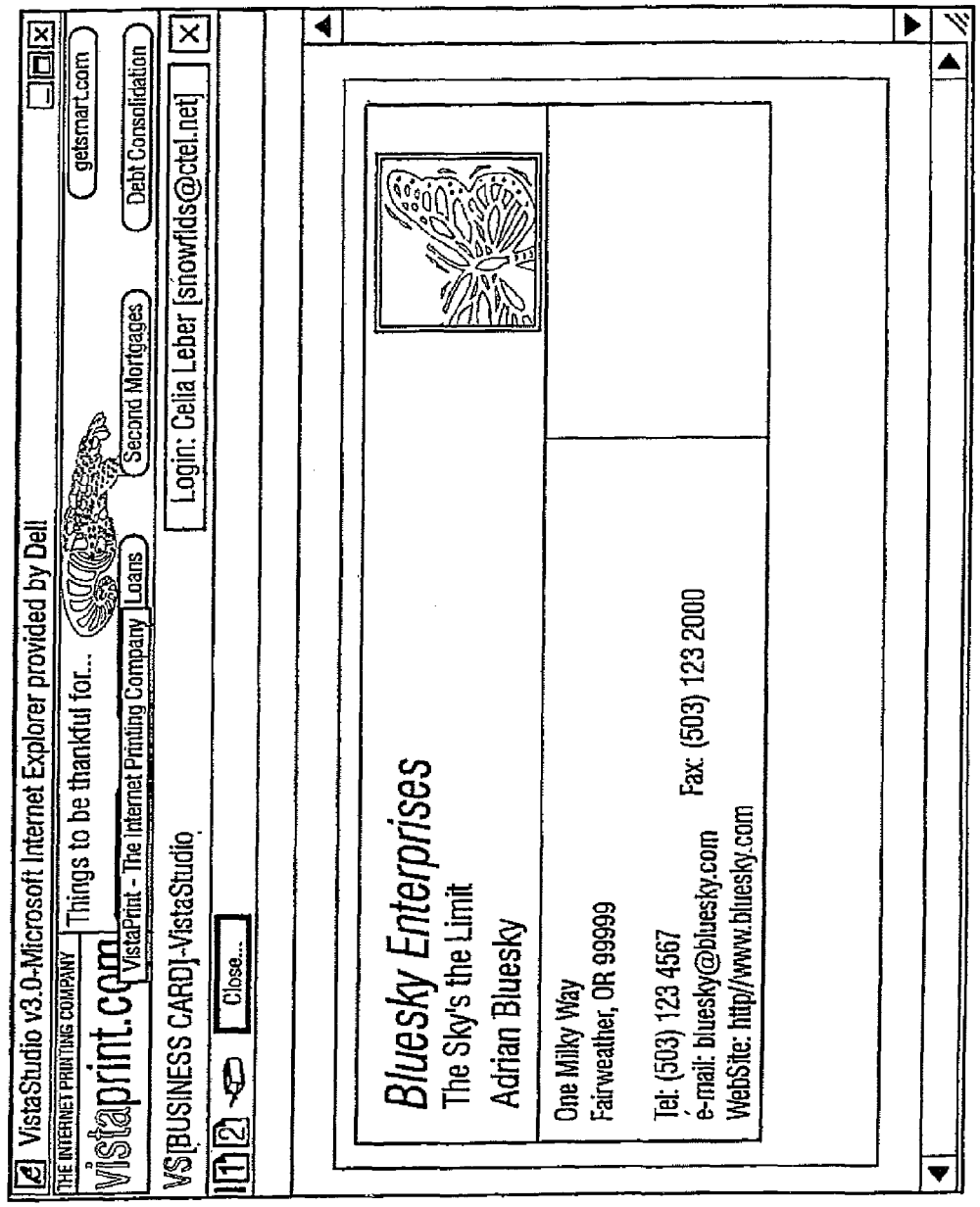
Figure 40:
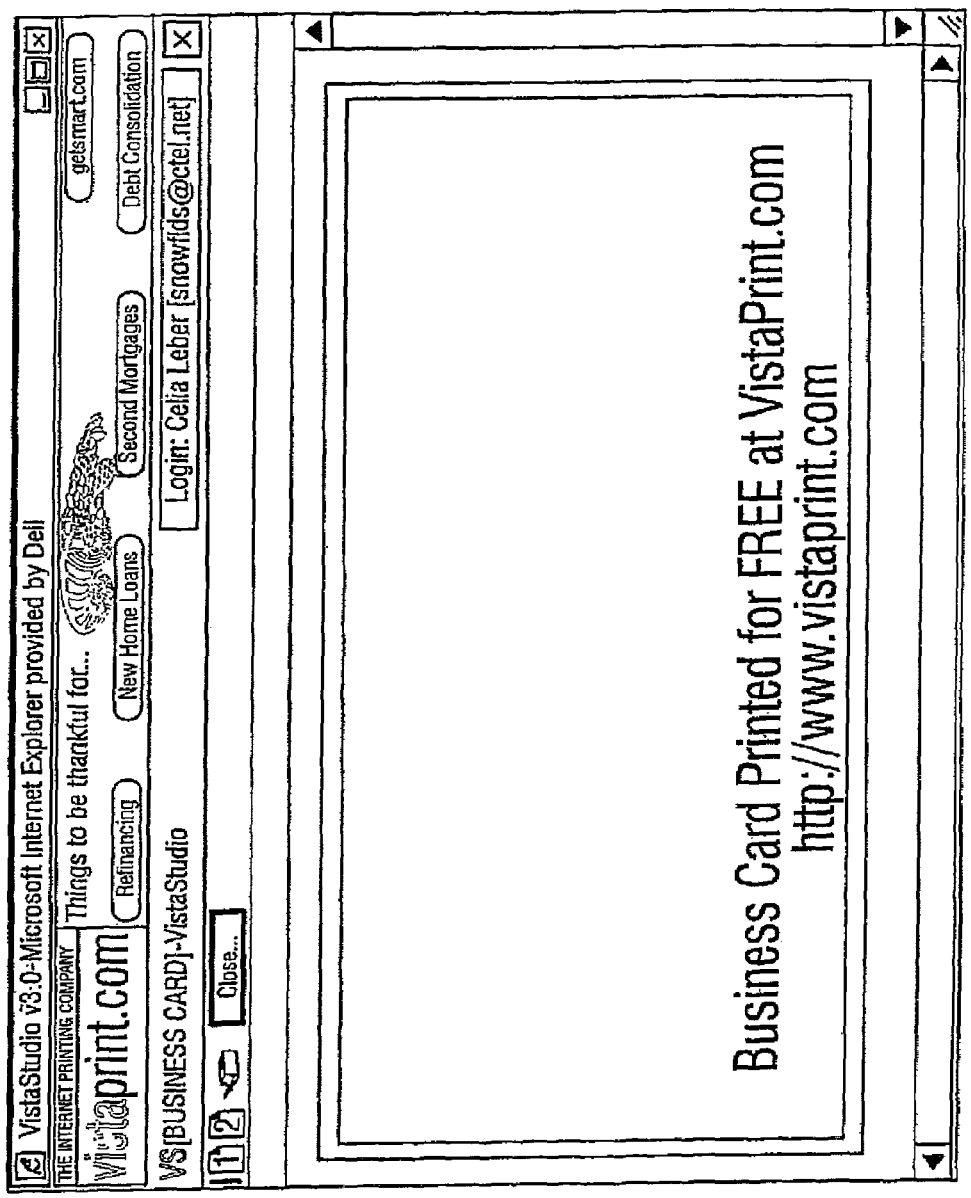
Figure 4P:
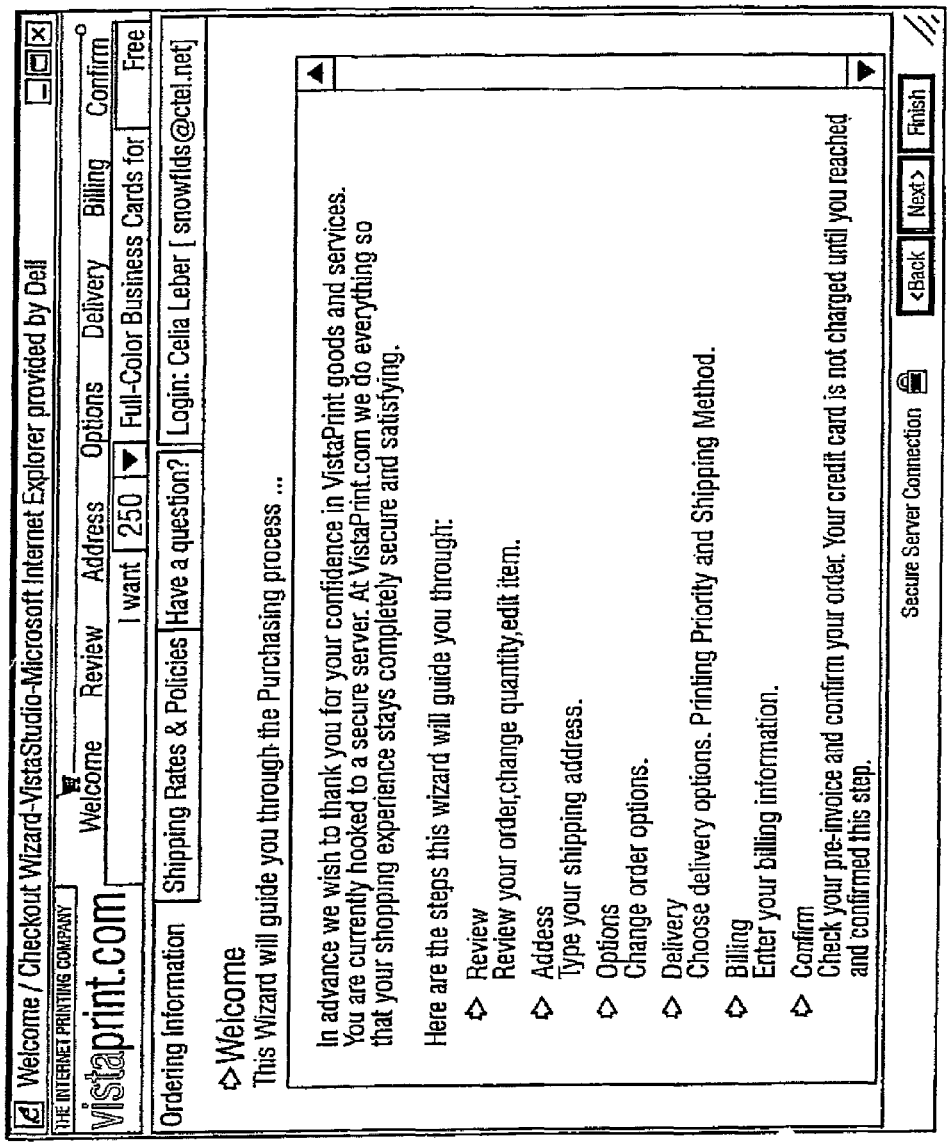
Figure 4Q:
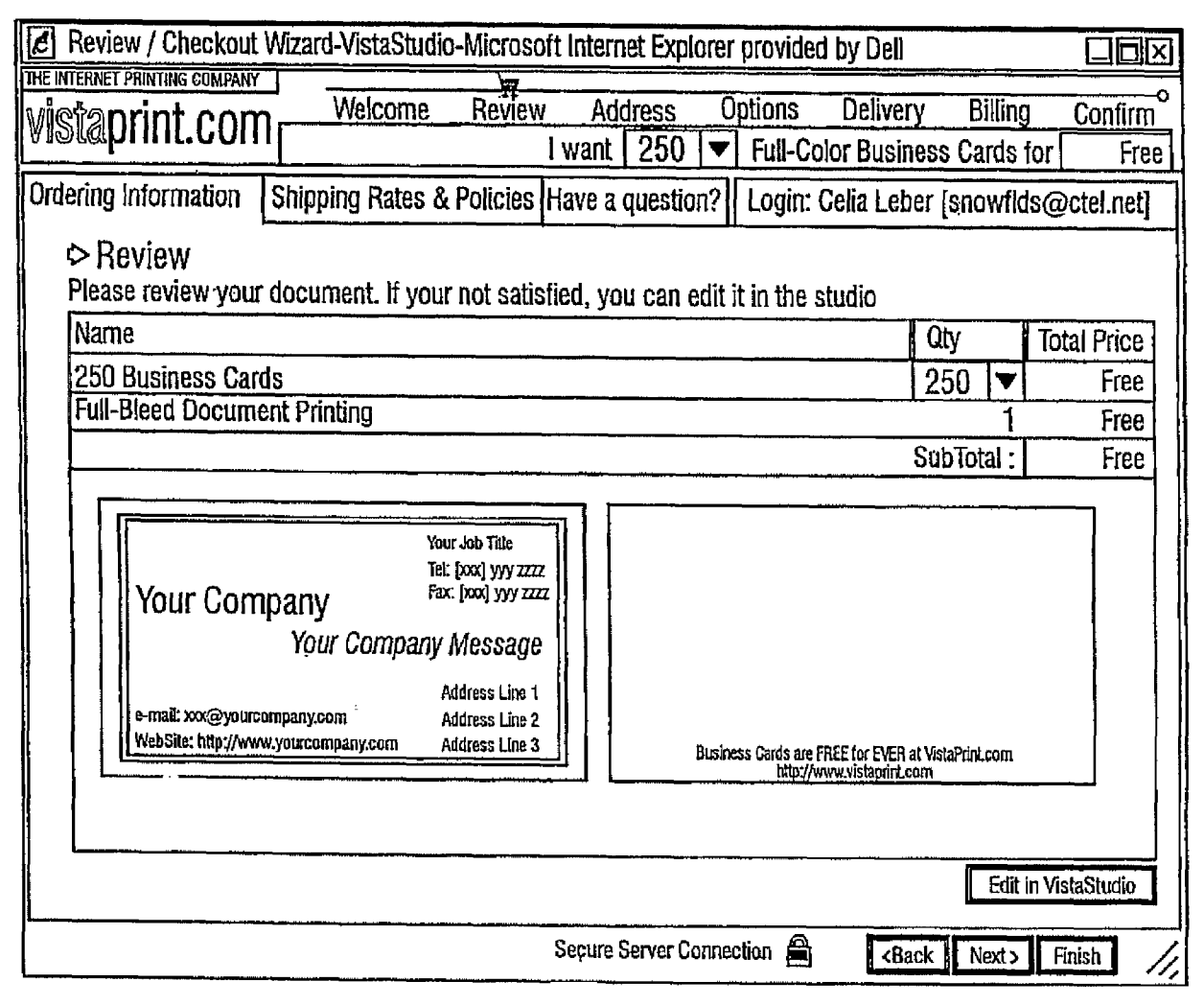
Figure 4R:
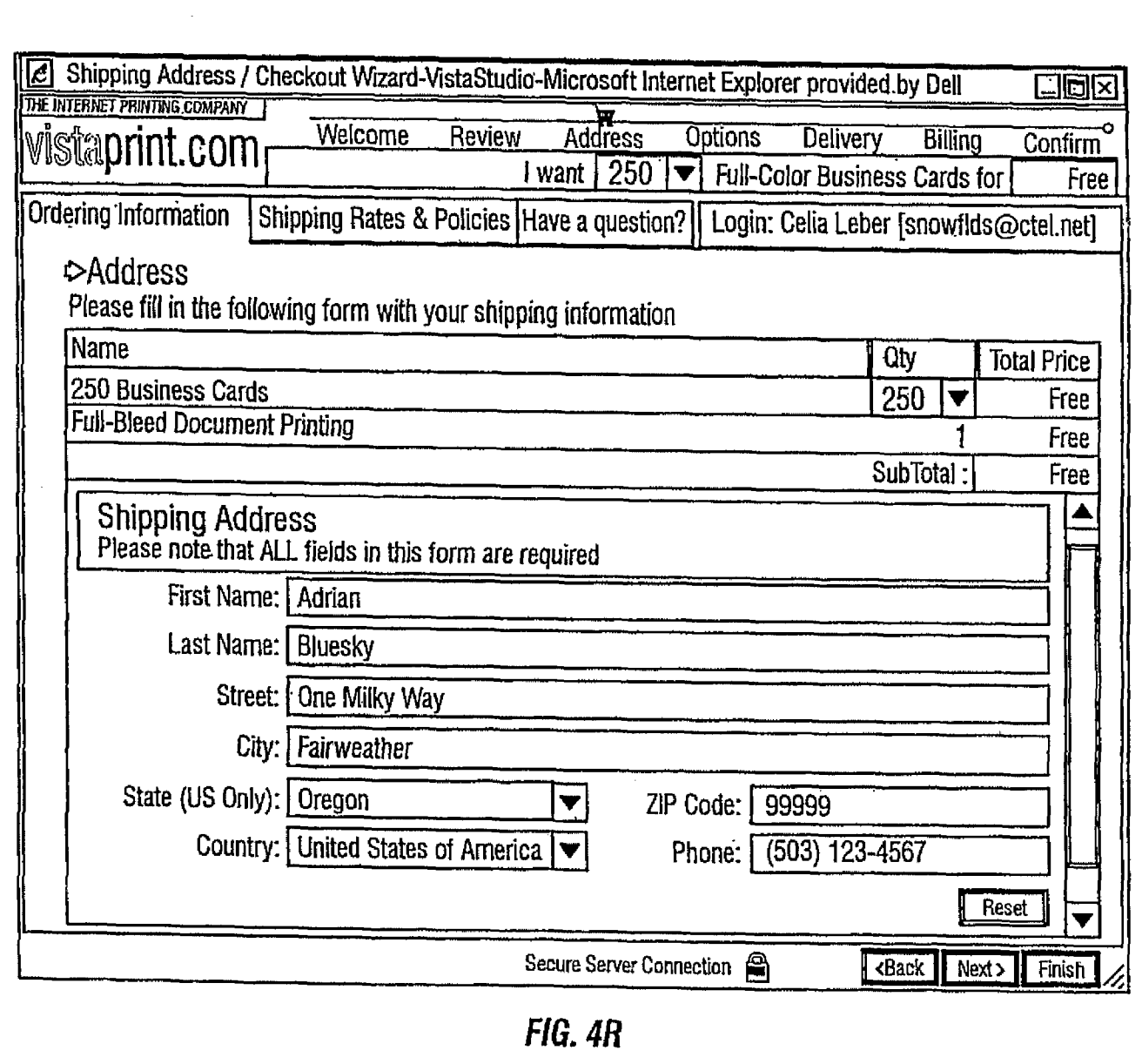
Figure 4T:
Figure 4U:
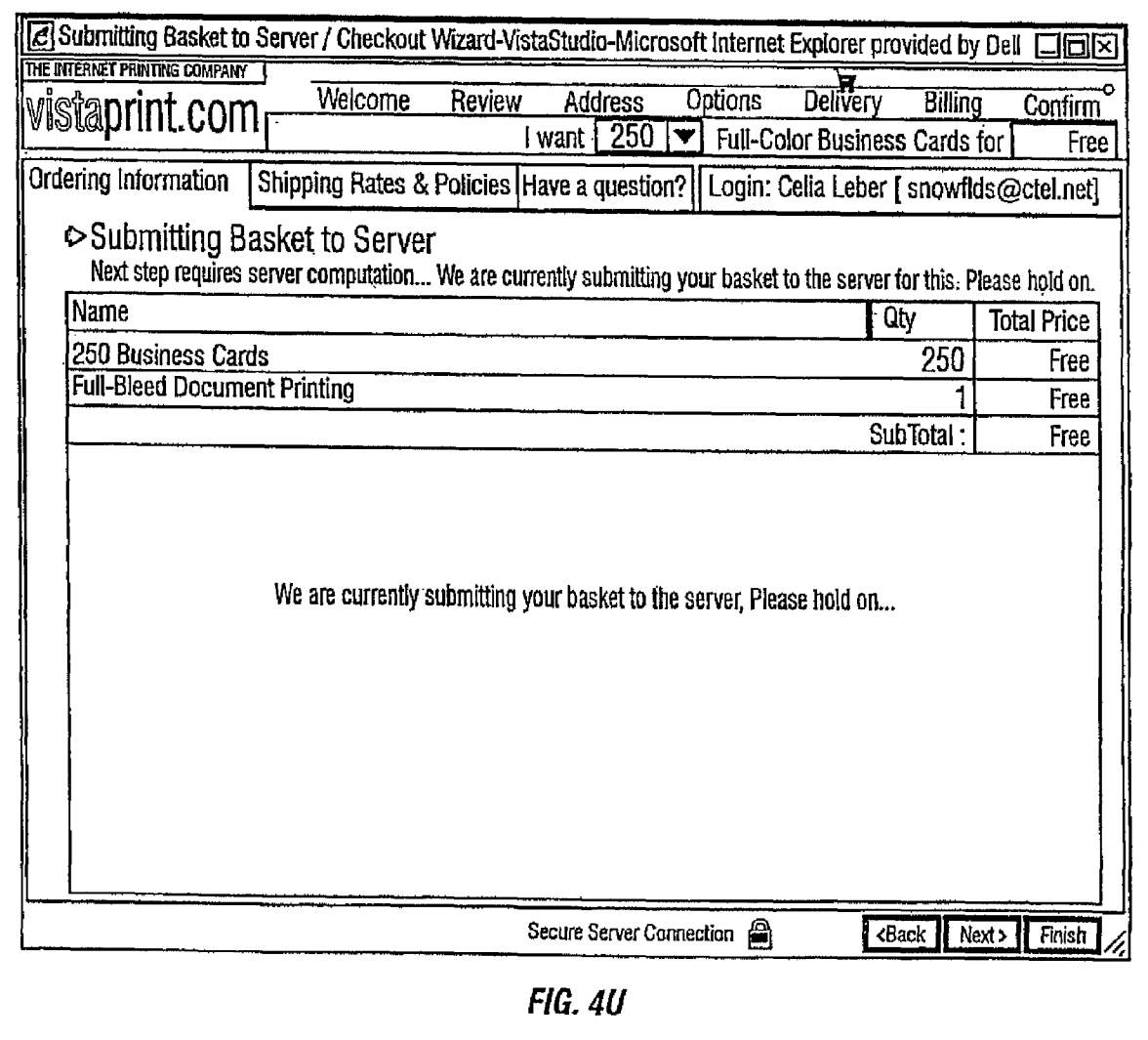
Figure 4V:
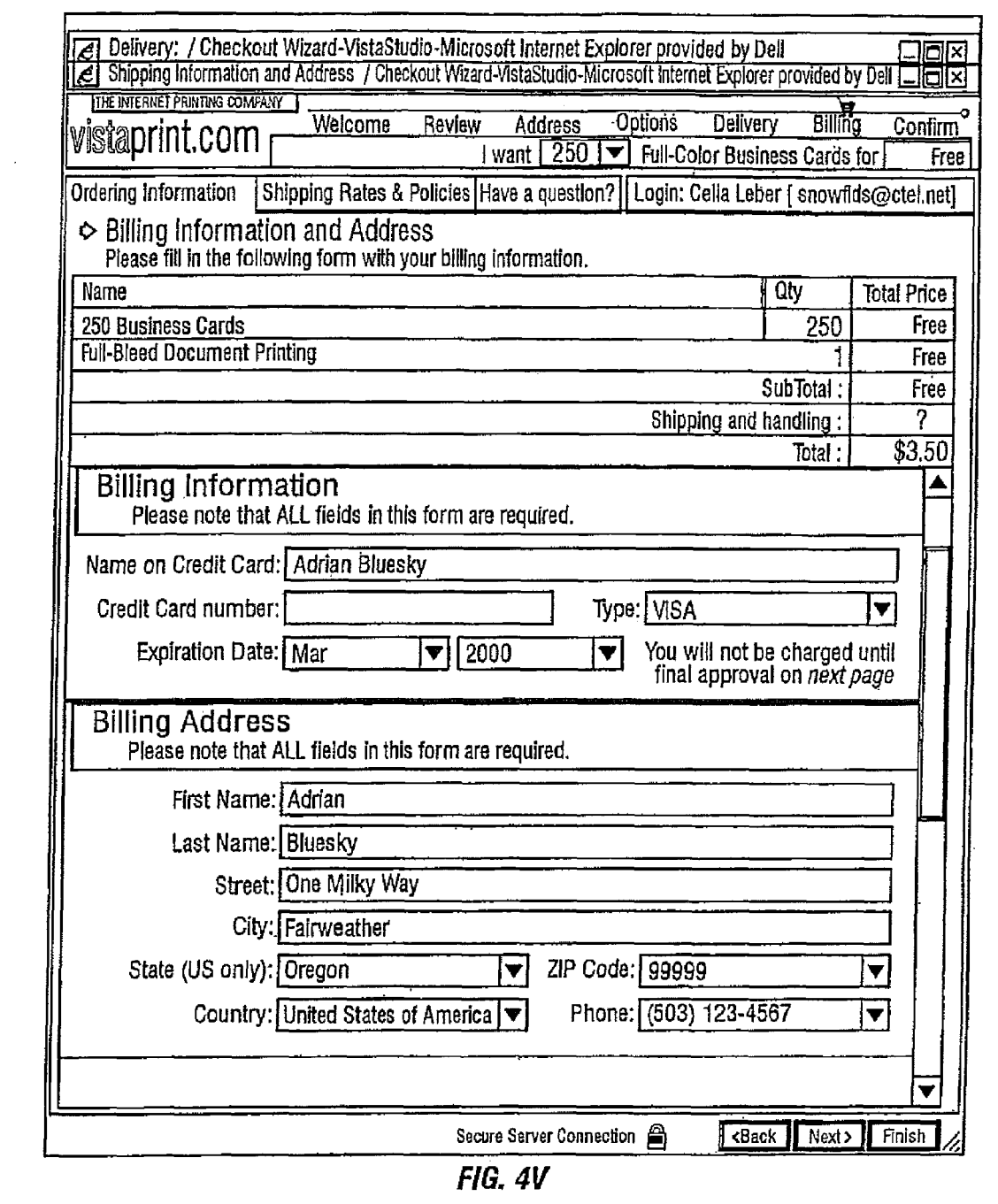
Figure 4W:
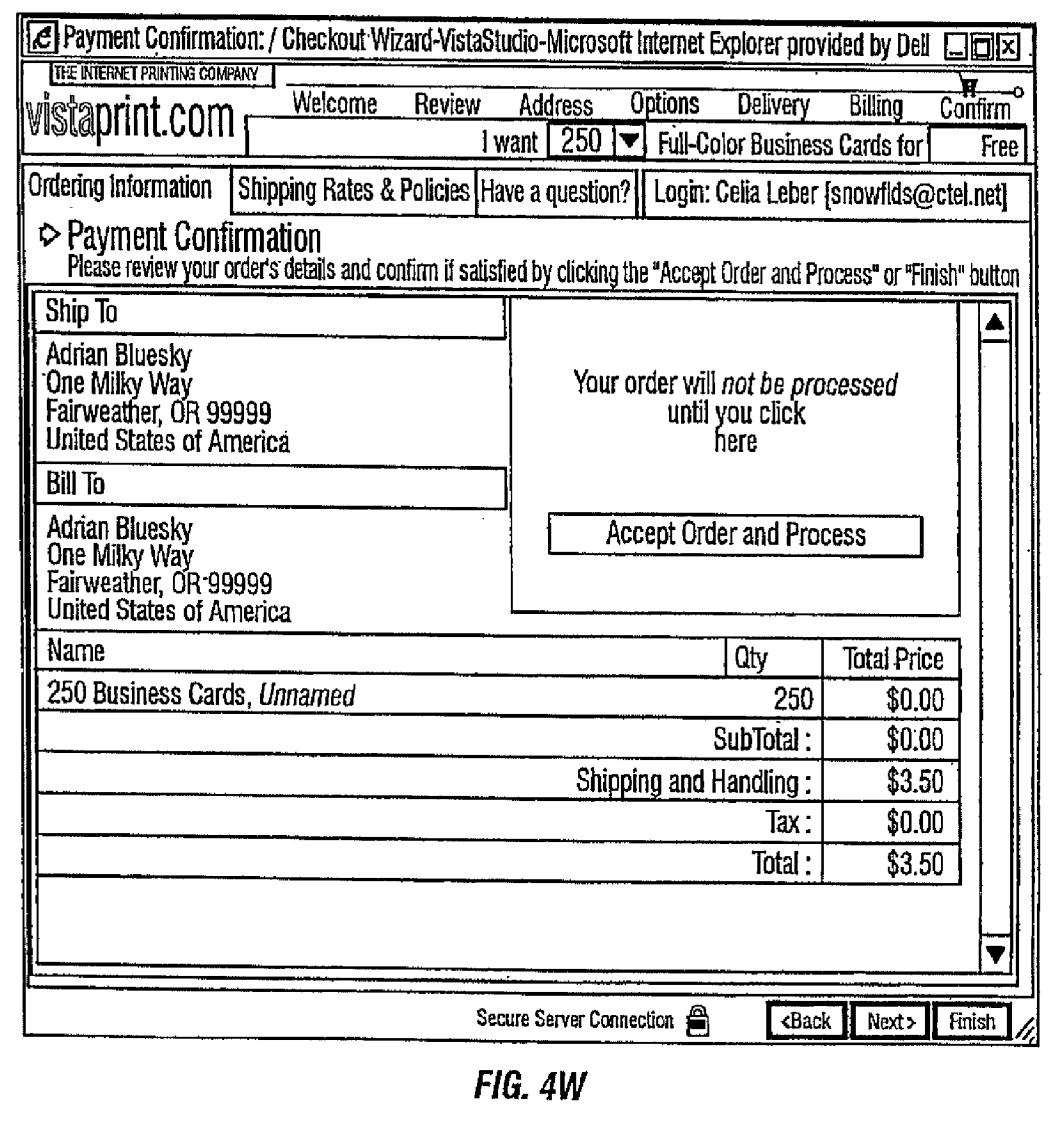

In the Design Studio, the customer call select a background from a variety of choices (FIG. 4H), use a "picker" dropdown list (FIG. 4I) to select other design features (logos, card layouts, color schemes, designs and fonts), modify those design features, add a logo (FIG. 4I), select a color scheme (FIG. 4J), change the color of selected text (FIG. 4K), change the properties of an image, e.g., the logo (FIG. 4L), view the backside of the card (FIG. 4M), and preview exactly how the front and back of the printed card will look (FIGS. 4N and 4O). The Design Studio features in-place editing, i.e., the customer can double-click on an item and change it directly. While in the Design Studio, the customer can make as many modifications to the fonts, colors, card layout, etc., as desired. The customer can also choose to view the design at low resolution, medium resolution or high resolution. In some implementations, the customer can add text or graphics to the back of the card, in which case in most implementations the existing "advertisement" text is automatically removed and this removal is automatically chosen as a purchase option in the Purchase Wizard. The customer can also choose a blank back side as a purchase option.

If desired, a customer using the Design Studio can upload a graphic file, e.g., containing the customer's logo. The file can be, e.g., created using graphic design software, downloaded from the Internet, taken with a digital camera, or scanned in with an image scanner. Generally, the file should have a relatively high resolution, e.g., at least 300 dpi. Most standard graphics file types are supported. The customer's graphic file is stored in network storage 22, and is referenced by the XML file created by the customer in the website studio and added to the PostScript file for the customer's print job when the PostScript file is created.

When the customer is satisfied with the design of the card, the customer can proceed to the checkout (the Purchase Wizard), or can save the finished design (the customer's print job) for later purchase. In either case, the customer's print job is saved in XML format in the central database 20. The XML file includes the size and orientation of the document, the number of pages, and, for each page, the margins, background, frame design (if any), and the text and graphics elements on the page and their characteristics (color, font, size, etc.).

The website studio is designed for use by customers who have no graphic arts experience or specialized software knowledge, e.g., small business owners who want to "do it all" and workers in companies whose goal is to update information, such as the company address or telephone number, prior to ordering or reordering printed materials.

For users with graphic design experience and desktop publishing software, the web server provides a full toolset that is compatible with leading desktop publishing software such as Quark Express and Adobe InDesign software. Thus, a print job can be designed by a graphic artist, using professional desktop publishing software, and then uploaded to the web server for distributed access to other users at the customer company. For example, the graphic artist can define fixed and variable fields, and an administrator or other designated employees at the company can then be given access to input information (e.g., company address and telephone) into the variable fields, without changing the fixed fields (e.g., the overall design and graphics of the print job). As a result, customers having access to desktop publishing software can create their own templates, rather than being limited to the templates offered by the web server host. When the template is uploaded to the web server, it is split into graphic data (logos, fonts, backgrounds and designs) and all other data. The graphic data remains in its original format and is stored in network storage 22, as discussed above. The remaining data and layout information is converted to XML format and stored in the central database 20.

Unlike other previous, server-based approaches, the website studio utilizes browser-based processing to allow high-speed processing when the customer is working interactively to design a print job. The website studio utilizes Javascript and DHTML technologies for the graphic design by the customer, i.e., the web pages that the customer receives and views include not only the static visual display, but also graphic design programs (the website studio) that will run on the customer's browser just as any other application runs on a computer. Thus, the customer can use the browser interface to do graphical design without interacting with, and thus consuming the resources of, the web server.

So that the website studio can be quickly downloaded by the customer, in most implementations the graphic elements, e.g., fonts, backgrounds and logos, used in the website studio are stored in a library in the network storage 22, a copy of which is stored at the printing firm information system 29, as will be discussed below. Thus, a graphic element need only be downloaded by the web server to the browser when it is selected by the customer during the design process. The XML file that results from the design process (the customer's print job) will reference the appropriate information in the centrally stored library. The library is replicated at the printing firms, so that the graphic elements can be inserted during RIPing using OPI (Open Prepress Interface) techniques. The library can be distributed periodically using a CD-ROM publication or other distribution approach so that all parties to the system are working from the same library.

Post-design processes, such as high resolution proofing and processing files, are queued separately and processed by the backend servers independently of the web server, because the customer is not waiting for these processes to be completed and thus processing speed is not a concern.

The web studio may also include a dynamic shopping cart, which allows the customer to access the shopping cart at any time during the design process to add or delete items.

The web studio application is based on modules, to provide an open development architecture. Different modules are plugged into the core libraries to provide additional functionalities, e.g., the Undo/Redo History Manager is a separate module that could be deactivated, by removing a few links, or replaced by a new and more powerful module complying with the same architecture as the current module.

The web studio application uses style sheets to "style" the interface into a usual Windows®-like interface. Using style sheets allows the application to have a smaller overall size, as styling policy is centralized in a few modules that are reused in the application's web pages. Providing a centralized styling policy also allows the web server host to change the look and feel of the web studio interface at any time, just by changing the styles.

In one implementation, the modules use Internet Explorer XML DOM implementations. Using these functionalities, a real-time renderer can be created which will take any XML document and, using XML style-sheets (XSL) transform the document into a WYSIWYG preview. The use of these integrated functionalities allows a small and fast rendering/edition engine.

Using HTCs (HTML components), scalability and processing speed can be enhanced. Also, the web studio application can be designed to behave differently on the result of the XSL transformation, just by using a different previewing style sheet (CSS). Thus, after rendering, the resulting preview can be a simple "flat" preview, or an editable document that the user can interact with.

If the XML Document model is extended to VML (Vector Markup Language), the web site studio is then able to render documents created by most common office applications, e.g., Microsoft Word. The user can then modify such a document and send it to the webserver for printing. This feature enhances the compatibility of the web studio with usual Windows® applications. Extension of the XML document model to VML also allows the web studio application to draw more complex shapes (e.g., ovals, rounded rectangles and curves), apply color gradients and color schemes to complex objects, and use transformations, making it possible for a user to design and print complex documents to suit his or her needs.

The Purchase Wizard

A Purchase Wizard used in one implementation of the invention is shown in FIGS. 4P-4W. Like the Design Wizard, the Purchase Wizard appears to the customer as a standard Windows Wizard application. The Wizard may be configured to run on the user's browser, or on the web server, depending on the preference and resources of the web server host. The final purchase information is transmitted over a secure server connection. The Wizard includes a Welcome screen (FIG. 4P), a Review screen (FIG. 4Q) that gives the customer a final opportunity to review the design, an Address screen (FIG. 4R) that allows the customer to input a shipping address and select an order quantity, one or more Options screens that offer the customer choices of upgrades, e.g., to remove the advertising text on the reverse side (FIG. 4S), a Delivery screen (FIG. 4T) that allows the customer to select delivery options, e.g., expedited delivery, a screen that notifies the customer that the order is being submitted to the server (FIG. 4U), a Billing Information screen that allows the customer to input billing information (FIG. 4V), and a Payment Confirmation screen that asks the customer for final confirmation of the order.

Once an order has been placed, the server stores the customer's order information into the central database 20, including the commercial information regarding the customer's order.

In some implementations, relatively low cost items, e.g., business cards, are offered to customers by the web server host at no charge. The cost of printing these items can be recouped by the web server host by charging a fee for upgrades, e.g., faster delivery, and sales of complementary items such as business card cases. For example, as discussed above, the web server host may include an advertisement (e.g., "Free Business Cards at vistaprint.com") on the back of each free card, and charge a fee if the customer does not wish this advertisement to appear on the customer's cards.

For all orders, the web server host may, if desired, charge additional fees for enhancements such as expedited service and gloss or other special finishes.

Customers can obtain support through the website by visiting a FAQ ("frequently asked questions") or help page (not shown). In some implementations, the website will also offer interactive online support, support via email, and/or a toll-free number that customers can call for telephone support. If desired by the website host, access to interactive online support, email and telephone support may be restricted to certain preferred customers, e.g., corporate customers having accounts with the website host. Alternatively, the website host may offer these services to all customers at no charge or may charge a fee for access.

As discussed above, the customer can access the website studio using his own computer and browser, or can use another type of entry port, e.g., an intermediary port 15b (such as a terminal at a boutique stationery store), or a large corporate entry port 15c (such as a Communications Department of a large corporation). The entry port need not be based on a web browser, but could be, for example, an email link or dial up telephone line. The customer may use the website studio without assistance, or may describe the desired print job to someone else, e.g., a graphic designer or salesperson at the boutique stationery store, who will use the website studio to design the print job.

The Web Server

In some types of entry port, the web server provides the interaction of the customer with the web studio. The web server uses a typical three-tier architecture to respond to all of the customer page requests, by using server-side scripting to access server objects that implement the business logic, these objects in turn interacting with the central database and network storage to access the necessary data.

Data Storage

Hundreds of thousands (potentially millions) of customer relationships are managed by the system. Each customer order typically involves a relatively large file due to the nature of color graphic printing data. The data storage capacity of the system is robust enough to handle high levels of data storage and data access. The data storage is also capable of acting as a link between the front end at which orders are placed, the design studio, the backend printing servers, and shipping, accounting and marketing systems. A data storage system that is capable of meeting these requirements is an Oracle RDBMS running on a UNIX box or a Microsoft SQL Server 7.

All data is stored in either the central database 20 or the network storage 22. Stored data includes business-related information such as information pertaining to customers and orders, and design data specific to each customer's print job.

Network storage 22 includes one or more network attached storage (NAS) systems, and is configured to store all graphical objects that are used by the Design Wizard and Studio and that are uploaded by customers, including logos, backgrounds, fonts and frame designs. The network storage includes a library, which contains all of the backgrounds, logos and fonts that are used by the Design Wizard and Studio. Customer uploaded information is not stored in the library. The library is replicated and sent to each of the printing firms used by the system for print runs, and the contents of the library are referenced by the PostScript layout files sent to the printing firms. The network storage may also contain the web pages used in the website 16.

Figure 5:
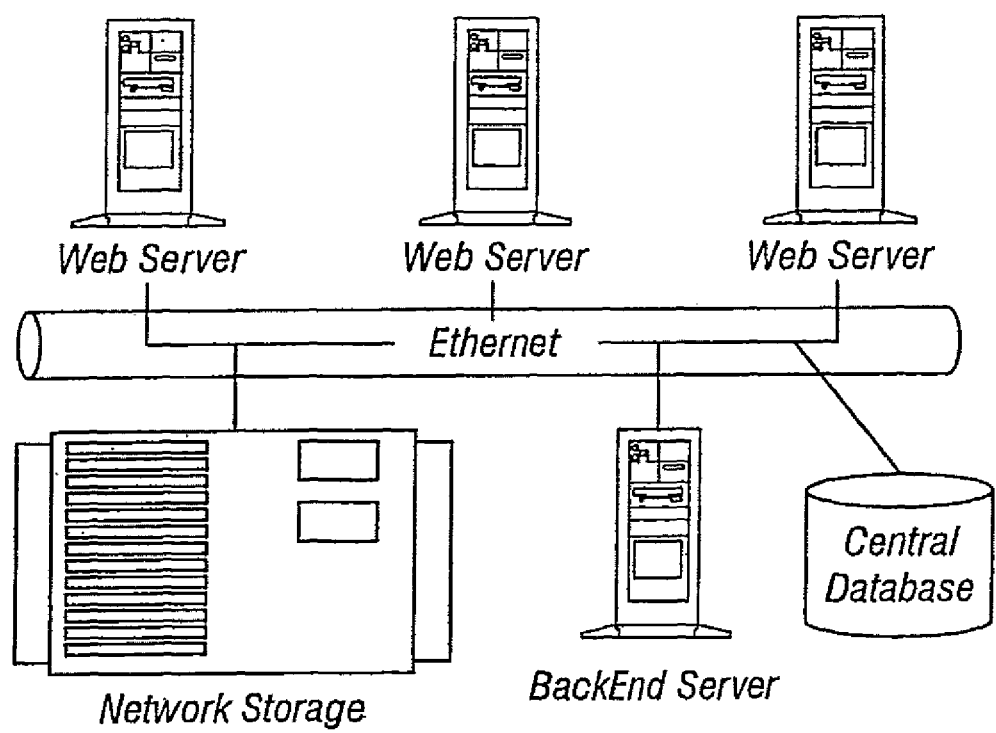
FIG. 5 is a schematic diagram showing connection of elements of the system.

A very large amount of data is stored in the network storage 22, e.g. up to several terabytes depending on the number of customers using the system. The network storage 22 is completely server independent (it includes its own enclosed CPU) and is directly connected to the local area network (a local area network internally operated by the web server host, including the web servers, the backend servers, and the storage devices), making the stored data available-to connected servers, i.e., the web server(s) 18 and the backend printing servers 28. As of the writing of this description, a single NAS system can typically handle from 20 gigabytes to one terabyte of data. Thus, as data space needs increase more disks can be added to the NAS (this operation typically does not require a service shutdown), or, when the limit of each NAS is reached, an additional NAS can be added to the system. As shown in FIG. 5, the web servers, central database, and backend servers are connected to the network storage by an Ethernet.

Central database 20 is a relational database management system (RDBMS) that handles all non-graphical data. This database is designed to handle millions of records. As is customary, the data is organized in tabular form. In one implementation, the database includes the following tables, which include the listed fields. (More, fewer or different tables may be used in other implementations, as needed.)

| Table | Fields |
| --- | --- |
| Products | unique product (item) ID (i.e., the SKU #) and name, product description, list price, weight (for shipping) |
| Print Jobs | unique print job ID and name, XML content of print job, SKU # of item (card, envelope, etc.), creation date, last modification date |
| Templates | unique template ID and name, XML content of template, SKU # of item (card, envelope, etc.), creation date, last modification date, template category |
| Template Categories | unique category ID and name, parent category ID (tree structure), category graphical representation |
| Shoppers | unique shopper ID, shopper name, number of logins, last login date, email address/login ID, password |
| Orders | unique order number, reference to shopper ID, order date, pricing and tax information, status of order, credit card authorization number, shipping method, shipper tracking information, customer shipping and billing information including priority of order |
| Ordered Items | ordered item number, order number (from orders table), SKU # of item, quantity, pricing information, print job ID |
| Shopping Carts | Same fields as Orders, but temporary storage |
| Shopping Cart Items (Layouts) | Same fields as Ordered items, but temporary storage Printer Batches batch ID number, date sent, status, printer ID number and name, quantity of print run, action to be taken when layout is created (none, notify print operator, send layout to printer, notify and send) |
| Printer Batch Items | batch item ID number, ordered item number (from ordered items table), batch ID number (from printer batches table), status of item |

Data stays in the database as long as it is needed by the system. Data is maintained in the Orders table after a customer's order has been completed and shipped, to facilitate reordering. To avoid overloading the database, the web server host may place a time limit on reordering, or charge the customer a nominal fee for keeping his information in the database for an extended period of time.

Each time a layout is created, an entry is created in the Layouts table. Depending on the action to be taken, the print operator may be notified by email, or an extranet query can be set up to query the table, or a process may be running at the printer that checks the table for new layouts.

The following status codes may be used in the "status" field in the Orders table:

| Status Code | Value | Status description |
| --- | --- | --- |
| ST_READY | 0 | The order has been submitted by the customer but at this point has not been processed. |
| ST_PROCESSING | 1 | This order is being processed. |

| Status Code | Value | Status description |
| --- | --- | --- |
| ST_CANCELLED | 2 | This order is being processed. |
| ST_REPEAT | 3 | There was a problem with this order so it has been re-submitted. This code is treated by the system in the same way as an "unprocessed" order. (Re-submitted orders can only be re-submitted a few times before a warning is raised) |
| ST_DISPATCHED | 4 | This order has been dispatched and the tracking information has been updated. |
| ST_COMPLETED | 5 | This customer's credit card has been charged. This order has now been completed. |

Order Queuing, Prepress Aggregation and Data Conversion

Figure 8:
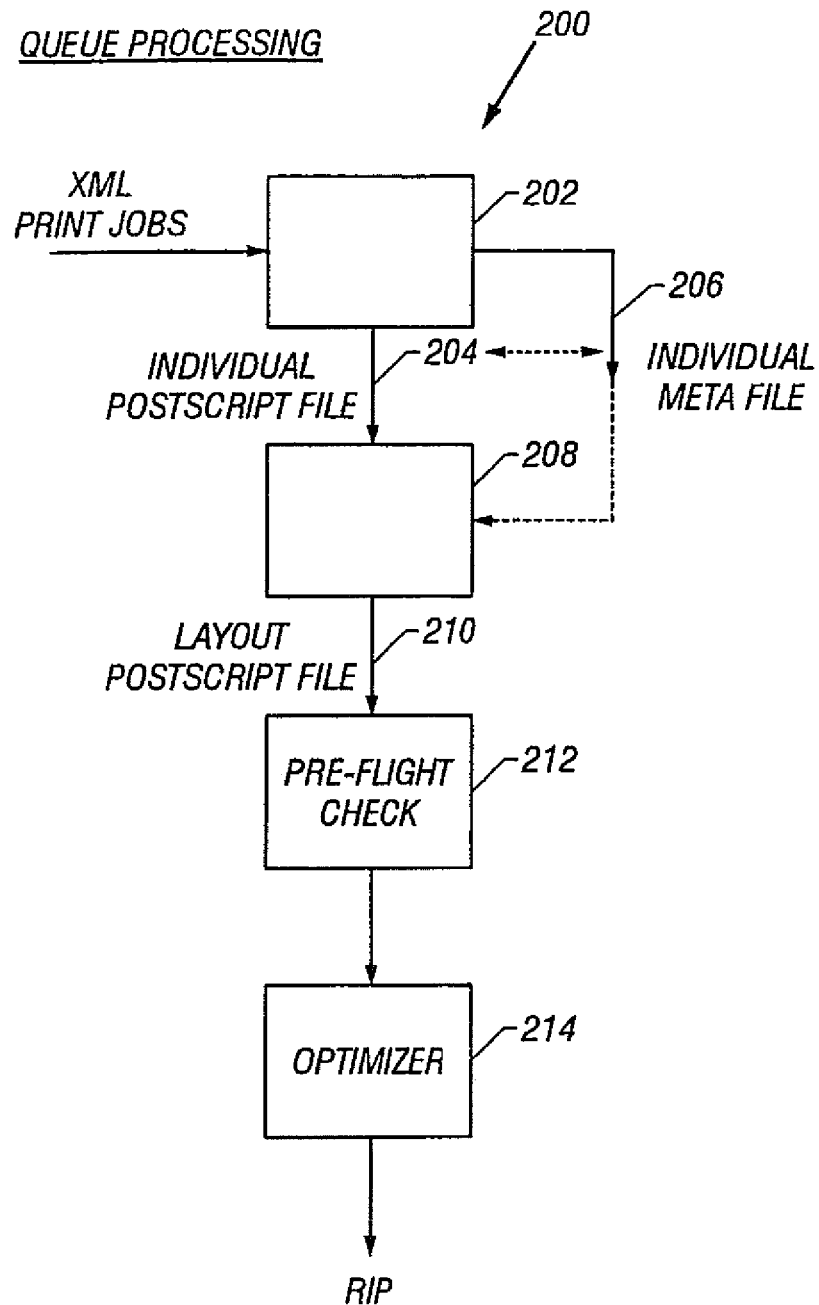
FIG. 8 is a schematic diagram showing a queue processing system.

Prepress aggregation is performed by a prepress aggregation module of the backend printing server, which includes a multi-user PostScript file creator, shown as item 200 in FIG. 8. The file creator collects all of the print jobs that have been received by the web server and queued for printing. The file creator includes four queue-processing components, as follows. The first component 202 creates individual PostScript files 204 for each customer's design, and individual meta files 206, referenced to each customer's PostScript file, that contain job tracking information and other commercial information related to the customer's order. The second component 208 collects these PostScript files, according to aggregation parameters (e.g., job tracking information and size of the printing paper to be used), and aggregates (or "gangs") them to produce a PostScript file 210 that contains "N-up" designs, the value of N being dependent on the design size, the paper size, and the exact layout required due to requirements such as edge bleed. The third component 212 does an automatic "pre-flight check" on each aggregated PostScript file, thus avoiding the need for further manual intervention. The fourth component 214 optimizes production scheduling and routes the final aggregated PostScript file to a Raster Image Processor (RIP) 220 at the printing cell.

The print jobs are arranged spatially on the master, rather than in chronological order. As a result, several types of items can be aggregated and arranged on a single layout, e.g., postcards, invitations and business cards. For example, as shown in FIG. 2B, the layout can include business cards 50, postcards 53 and invitations 55. If any of the aggregated print jobs are to be printed on both sides, the entire layout will be printed on both sides, with blank areas for any print jobs that are printed only on one side. Some items, e.g., envelopes, generally cannot be aggregated with other types of items because of their specific post-press processing requirements.

Aggregation may be performed in accordance with one of a number of standard aggregation templates, as noted above, or can be done "on the fly", in any arrangement that will fit within the bounds of the paper sheet to be printed. The prepress aggregation module, a rules-based program, aggregates print jobs by scanning the Ordered Items table of the central database and searching for items (print jobs) that have the same printing requirements, e.g., the same delivery date, paper grade, and post press processing requirements. Scanning generally continues until enough print jobs have been located to fill a layout of a given size. The XML files corresponding to the selected print jobs are then pulled from the Document Table, converted to PostScript files and aggregated, as discussed above.

Printing is generally performed in a base print run of a standard number of sheets, e.g., 250 sheets. The prepress aggregation module automatically deals with a print quantity that is greater than the number of sheets in the base print run by allocating that print file to one or more extra position(s) on the consolidated sheet (master). For example, if the base print run is 250 sheets and a customer orders a print quantity of 500, the customer's design would occupy two positions on the master, whereas if the customer orders a print quantity of 1000 four positions would be occupied. The prepress aggregation module is also able to differentiate between these different quantity orders, and thus when sufficient order volume is being generated at, e.g., 500 units, the module will create a print file with each order occupying only a single position and increase the base print run to 500 sheets, further reducing unit cost. Also, in the unlikely event that insufficient orders are received over a period of time, one or more position(s) on the master may be left blank.

In some implementations, the prepress aggregation module is configured to provide digital management of queues to allow a customer to choose to have his order expedited for an additional cost. Expedited orders are queued ahead of non-expedited orders, so that non-expedited orders will be printed later, e.g., 5-7 days later, than expedited orders which are printed immediately. As a result, all orders can be shipped immediately after printing, without the need for the printing firm to sort out and hold back non-expedited orders. If there are a few particularly high priority jobs waiting to be printed, the program with aggregate these jobs and send them to be printed immediately, without waiting for enough orders to be received to fill a layout.

The Backend Printing Interface

The backend printing servers do not interact directly with the customers. The backend printing servers do the processing (e.g., print job aggregation and printer preparation and optimization) that occurs after the customers have designed the print job and placed orders. Generally, communications between the backend printing servers and the print subcontractors are handled over dedicated leased lines due to the high volume of real-time data transfer from the backend print servers to the print production floor.

After the print jobs have been aggregated and queued by the prepress aggregation module, as described above, the resulting layout and aggregate meta file are sent by the backend printing servers to designated printing firms. The printing firm to which the data is sent may be selected by an automated bidding process, which will be described below. The digital data is then used to make color-separated offset printing plates in accordance with the layout. The printing plates are generally prepared in advance of the time allotted for the print run, e.g., the layout and meta file are sent at least an hour before the scheduled print run and the plates are formed immediately (plate forming generally takes about 10-15 minutes or less).

Once the printing plates have been formed, the operator of the printing press loads the specified grade and quantity of printing paper for the aggregate print run, e.g., 250 sheets plus "overage" for a 250 sheet run of business cards. For this purpose, the operator refers to a browser-based terminal at his work-station, which displays information from the meta file concerning the print run. The print run is then performed, resulting in the desired number of printed sheets, e.g., a stack of 250 printed sheets for a 250 sheet run. The system can organize multiple aggregate print runs that use the same paper base, thus eliminating the need for paper changes.

Post-Press Processing

Figure 6:
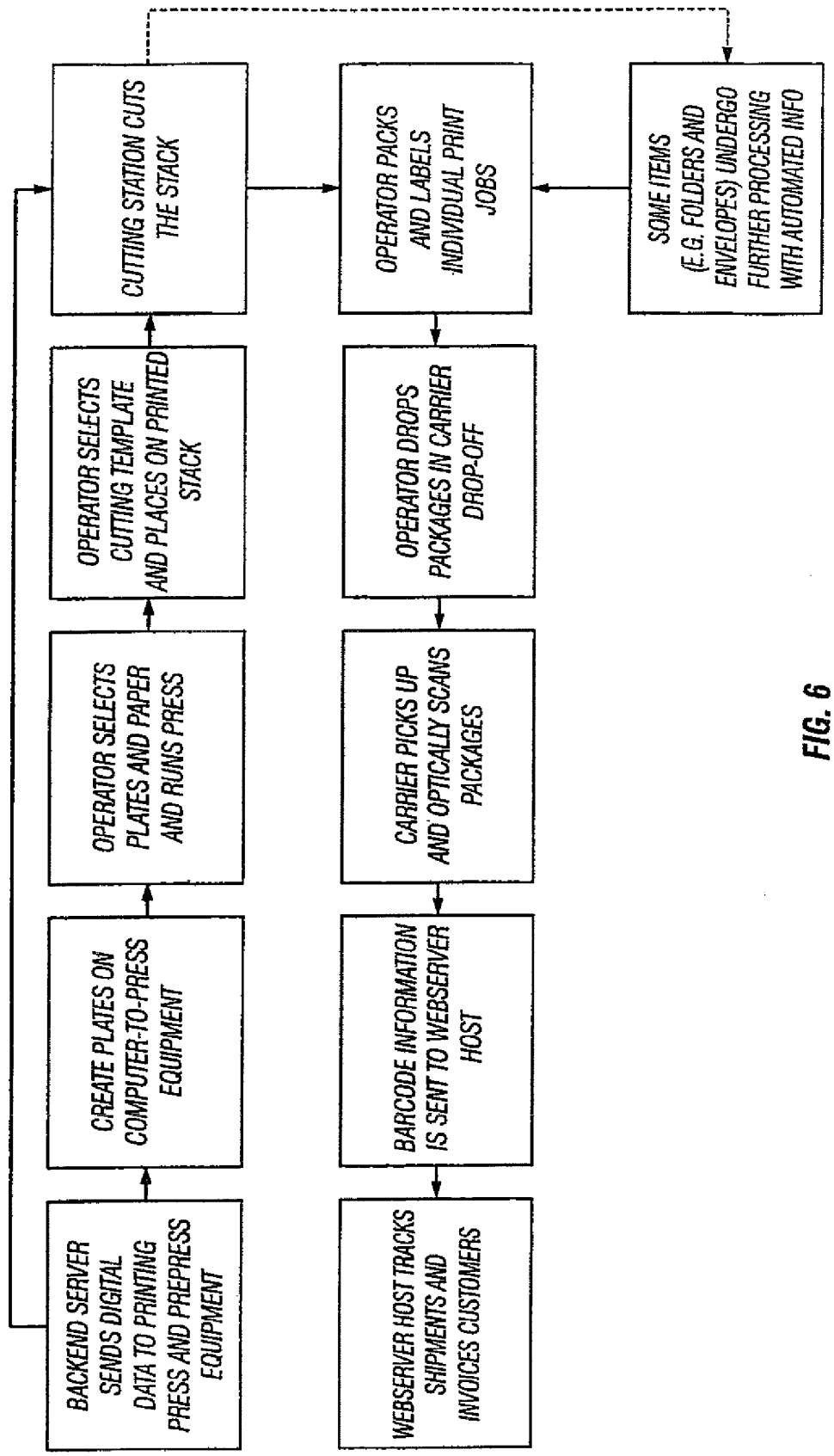
FIG. 6 is a flow diagram of a printing and post-press process.

Referring to FIGS. 1B and 6, there are several steps that take place after a print run. These steps include cutting, post-forming (in some cases), sorting, packing and shipping. These steps are described in detail below.

Print jobs that are part of an order (e.g., letterhead) can be held until other print jobs that are part of the same order (e.g., envelopes) are ready. (In some cases, the different parts of a customer's order may be printed at different printers, in which case they will be shipped separately.) In some cases shipments may also be tracked and customers informed of the location/status of their orders.

Cutting and Forming

To cut the stack of sheets into individual customers' print jobs, the operator selects an appropriate template by again referring to the terminal information, and/or by referring to a batch number (or "template-layout reference number") on the printing plate or printed in the margin area of the printed sheets (e.g., a bar code 51, FIG. 2A). The sheets are moved, as a stack, to a cutting station (e.g., a guillotine cutter), the template is placed on top of the stack of sheets, and the operator enters the template-layout reference number into another terminal to program the guillotine cutter (or the template-layout reference number is automatically downloaded to the terminal). The guillotine cutter then cuts the stack of sheets, forming individual stacks of items (e.g., business cards, postcards, etc.). In high volume applications, the guillotine cutter can be replaced by automatic cutting or blanking equipment such as is used for cutting labels. While a guillotine cutter is used for most items, e.g., business cards, postcards, and other flat items), some items will require other post forming processes. For example, envelopes are formed using standard envelope forming equipment, including a hydraulic die cutter and an envelope folding and gluing machine. Because the folding and gluing machines generally require relatively high volumes (e.g., 150,000 units or more), it is necessary to accumulate the printed sheets from print runs until the necessary unit volume is reached. In order to keep track of individual print jobs, a marker is placed between each print job and the following print job. This can be accomplished, for example, by using a heavy, brightly colored cardboard sheet as the template, resulting in a brightly colored, sturdy marker at the top of each stack of printed items in a given order. The stacks of items can then be stacked and set aside, or transferred directly to the envelope folding and gluing machine and left there until there are a sufficient number of sheets to operate the machine.

Other items that require post-processing, e.g., folders, are processed using appropriate cutting and post-forming techniques, which are well known.

Sorting and Shipping

After cutting is completed, an operator refers to simple instructions displayed by a terminal, indicating how to package the items. The instructions also indicate whether certain stacks of items should be set aside until a subsequent print run has been completed, e.g., if a customer has ordered both business cards and letterhead stationery.

Shipping labels will be printed automatically by a printer attached to one of the browser-based terminals, allowing the operator to easily label the packages for shipping. The labels will generally include a bar code to facilitate shipping using optical-reader based systems, e.g., as used by UPS and FedX carriers, When these carriers are used, the information scanned in by the optical reader can be used by the web server host to track the location of a shipment and, if desired, to inform a customer of the location and/or status of the customer's order. After an order has been packed and labeled, the operator can simply drop it into a carrier's bin (e.g., a UPS bin) on site.

As discussed above, most customers will have pre-paid during ordering, while some corporate customers will have accounts with the web server host, allowing invoicing and later payment. Debiting and invoicing of customers is conducted by the backend server upon receipt of a meta file from the printing facility indicating that orders have been successfully shipped. The printing facility and carrier are paid by an automated accounts payable management system after printing and shipping have been successfully completed.

System Scalability

Figure 7:
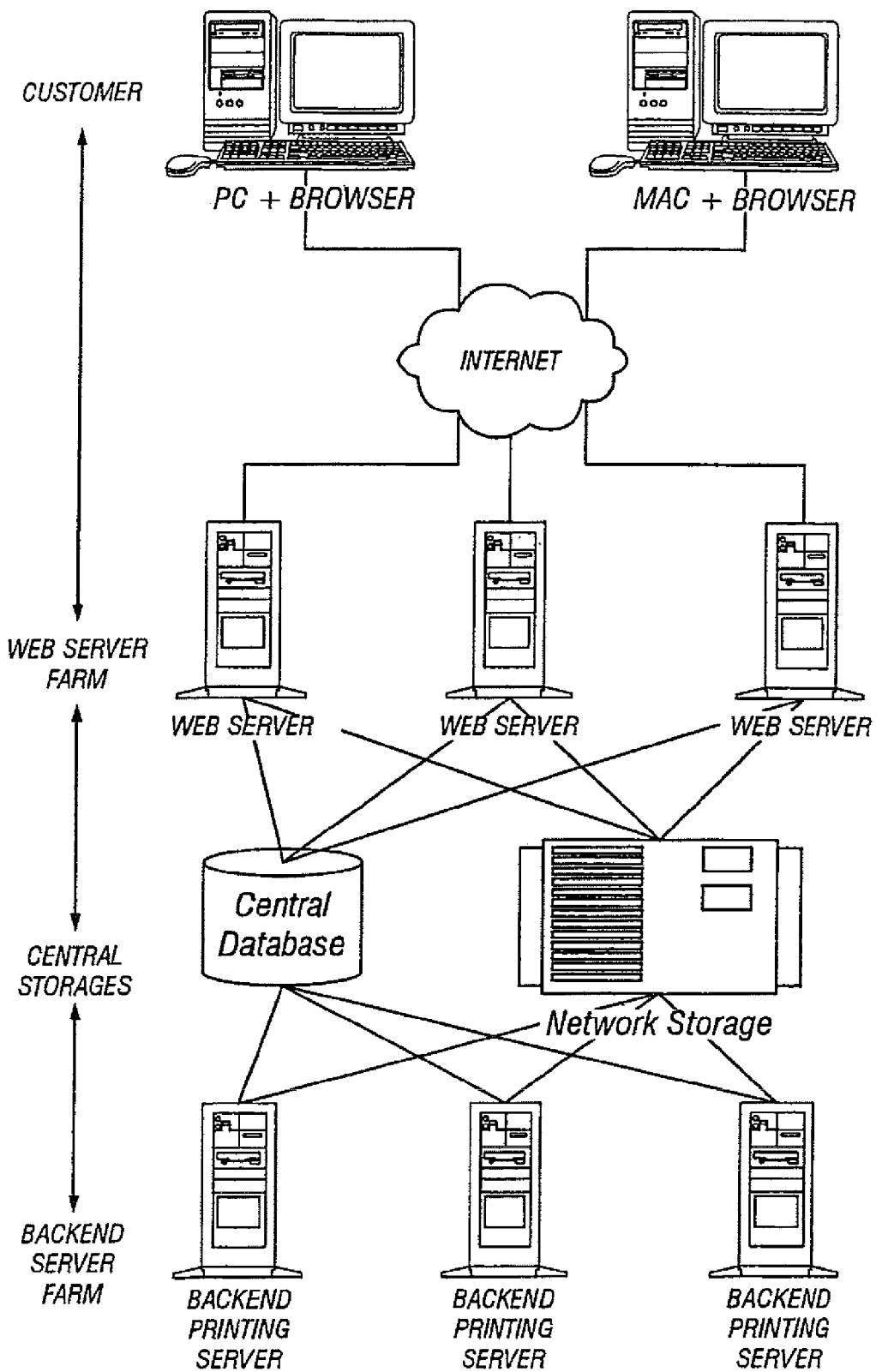
FIG. 7 is a schematic diagram showing the farm configuration of servers in a system according to one implementation.

Referring to FIG. 7, while a single web server is shown in FIG. 1 for clarity, the system will generally include more than one web server to accommodate a very large volume of users. For example, for volumes of up to around 2 million visits a month, the browser-based processing of the system allows for a small, dedicated print-processing server farm of fewer than 5 servers. The system may be scaled to accommodate many times this amount of visits simply by adding more servers.

The servers are arranged in a "web server farm", i.e., all of the servers used are strictly identical, and the system architecture is implemented so that additional customer requests, that cannot be handled by the existing servers, can be handled by simply adding an extra identical server to the farm. The backend printing servers 28 are also arranged in a farm configuration.

In a farm configuration, the load is split between the available servers, so that if more servers are needed either due to overloading of the system or due to a server breaking down the load will continue to be split proportionally among the servers after one is added, removed or replaced.

Automated Bidding Exchange for Printing Services

As shown in FIG. 1, the web server host has supplier relationships with a number of printing firms that are equipped to receive digital data (layouts) and informational data (meta files) from the system servers. The system includes a program that includes a digital database containing the meta files for each layout. The program fills customer orders by purchasing printing services based on automated real time bidding of commodity costs (i.e., paper and ink costs and/or depreciation). The printing firms bid for near-term printing services based on the capacity utilization of the printer at the time the printing services are needed, by accessing certain parts of the program via the Internet. For instance, if a printing firm anticipates a near-term situation of unused capacity, the printing firm will generally price that time period at just above marginal (commodity) cost. The program selects the most attractive bid from among the printing firms and transmits the digital data to that firm. The directing and redirecting of capacity can be done up to the very moment of production release.

The program may be configured to award a printing contract to the printing firm that is the lowest bidder, or to award the contract based on a group of selection criteria, e.g., quality, lead time, price, and history.

The printing firms may enter into the bidding process through a website operated by the web server host, e.g., by posting information regarding one-time availability, by posting information regarding long term availability (e.g., that a certain time slot is available every day or each week), or by responding to information regarding layouts that has been posted by the web server host. In some implementations the web site is configured so that a printer will only see information pertaining to layouts that could be printed by that printer (i.e., the printer will not see information pertaining to layouts that are in a format that is larger than the format the printer's press can accommodate.)

In some cases, the bidding process will be bypassed entirely. For example, if the web server has a layout that is particularly suitable for a specific printing firm, and the web server knows that the printing firm is available to print the layout, the web server may send the layout and meta files to the printing firm without putting the layout up for bidding by other firms.

Implementations of the invention involve a division of the characteristics (and especially the costs) of the printing product into two major groups: the commodity aspects and costs; and the informational (or custom) aspects and costs.

The commodity aspects and costs are those that are deliberately forced to be non-varying among all of the print jobs. These include papers, inks and depreciation. Only a relatively small set of different papers may be permitted which reduces the cost of the paper to a bare minimum. Only standard process inks may be permitted, which similarly reduces ink costs to a bare minimum. Finally, printing equipment costs (including depreciation expense) are also in the nature of a commodity across the many jobs that are to be printed. The goal is to reduce these costs to the bare minimum that would be achieved were the presses to be run at full capacity and with zero setup time. The costs are driven toward this result by using techniques that reduce the setup time to a bare minimum and give the printer equipment owners a medium for easily filling essentially all of their unused capacity.

On the informational (custom) side are such aspects as definition of content of each print job, price, delivery, and other terms, the ability to reduce capacity underutilization, color definition and verification, variations in quantity, the details of delivery and invoicing, the details of change over and setup, and marketing and sales efforts. On this informational side, too, the goal of the implementations is to drive the costs down (in theory to near zero) using information technology, electronic communication, and other techniques.

Other embodiments are within the scope of the claims. For example, while fixed and variable fields are discussed above in the context of customer-defined templates, in some implementations the web server host may provide templates having this feature as part of the website studio.

What is claimed is:

1. A computer-implemented method for creating an electronic product design of a print item to be printed, the method comprising:
   presenting, on a display of a user computer, a plurality of product type images for viewing by the user of the user computer, the product type images representing a plurality of different types of products that can be printed, each product type image having associated therewith a product selection mechanism;
   in response to the user's selection of a product selection mechanism associated with one of the product type images, presenting, on a display of a user computer, a plurality of template images for viewing by the user of the user computer, the template images representing electronic product design templates for the selected product type, each template image having associated therewith a template selection mechanism;
   in response to the user's selection of a template selection mechanism associated with one of the template images, presenting on the user's display an editable product design template associated with the selected template image, the editable product design template being a partially completed electronic product design and comprising one or more user editable elements,
   providing one or more product design software tools, the tools being adapted to allow the user of the user computer to edit the one or more user editable elements of the editable product design template, and
   receiving edits to the editable product design template, the edits entered the user using one or more of the tools to incorporate user content into the one or more user editable elements of the editable product design template to create a custom electronic product design that can be printed to create a print item.

2. The method of claim 1, further comprising:
   receiving a request to print the custom electronic product design; and
   causing the custom electronic product design to be printed to create a print item.

3. A printed item, created according to the method of claim 2.

4. The method of claim 1, wherein the one or more product design software tools are downloaded to the user computer, the tools being configured to execute in the browser of the user computer.

5. The method of claim 4, wherein the editable product design template is downloaded to the user computer for editing using the one or more product design software tools.

6. The method of claim 5, wherein the one or more product design software tools is downloaded to the user computer upon user selection of the editable product design template.

7. The method of claim 1, wherein the one or more product design software tools display the editable product design template and any user edits to the one or more user editable elements incorporated therein to the user in WYSIWYG form.

8. The method of claim 1 further comprising allowing the user to modify at least one feature of the partially completed electronic product design of selected product design template during the one or more product design software tools.

9. A computer-implemented method for creating an electronic product design of a print item to be printed, the method comprising:
   receiving, at a user computer, a plurality of selectable template images for viewing by the user on a display of the user computer, the images representing electronic product design templates of print items that can be printed,
   receiving a selection by the user of one of the template images, presenting on the user's display an editable product design template associated with the selected template image, the editable product design template being a partially completed electronic product design and comprising one or more user editable elements,
   executing one or more product design software tools on the user computer, the tools being adapted to allow the user of the user computer to edit the one or more user editable elements of the editable product design template, and
   receiving edits to the editable product design template, the edits entered the user using one or more of the tools to incorporate user content into the one or more user editable elements of the editable product design template to create a custom electronic product design that can be printed to create a print item; and
   uploading the custom electronic product design to a server to cause the custom electronic product design to be printed.

10. Non-transitory computer readable storage tangibly embodying program instructions which, when executed by a computer, implement a method for creating an electronic product design of a print item to be printed, the method comprising:

presenting, on a display of a user computer, a plurality of product type images for viewing by the user of the user computer, the product type images representing a plurality of different types of products that can be printed, each product type image having associated therewith a product selection mechanism;

in response to the user's selection of a product selection mechanism associated with one of the product type images, presenting, on a display of a user computer, a plurality of template images for viewing by the user of the user computer, the template images representing electronic product design templates for the selected product type, each template image having associated therewith a template selection mechanism;

in response to the user's selection of a template selection mechanism associated with one of the template images, presenting on the user's display an editable product design template associated with the selected template image, the editable product design template being a partially completed electronic product design and comprising one or more user editable elements, providing one or more product design software tools, the tools being adapted to allow the user of the user computer to edit the one or more user editable elements of the editable product design template, and receiving edits to the editable product design template, the edits entered the user using one or more of the tools to incorporate user content into the one or more user editable elements of the editable product design template to create a custom electronic product design that can be printed to create a print item.

11. The computer readable storage of claim 10, the method further comprising:

receiving a request to print the custom electronic product design; and causing the custom electronic product design to be sent to a printing system to print a print item.

12. The computer readable storage of claim 10, wherein the one or more product design software tools display the editable product design template and any user edits to the one or more user editable elements incorporated therein to the user in WYSIWYG form.

13. The computer readable storage of claim 10, the method further comprising allowing the user to modify at least one feature of the partially completed electronic product design of selected product design template using the one or more product design software tools.

14. A system for creating an electronic product design of a print item to be printed, comprising:

one or more processors configured to present, on a display of a user computer, a plurality of product type images for viewing by the user of the user computer, the product type images representing a plurality of different types of products that can be printed, each product type image having associated therewith a product selection mechanism;

one or more processors configured to present, on a display of a user computer and in response to the user's selection of a product selection mechanism associated with one of the product type images, a plurality of template images for viewing by the user of the user computer, the template images representing electronic product design templates for the selected product type, each template image having associated therewith a template selection mechanism;

one or more processors configured to present, on a display of a user computer and in response to the user's selection of a template selection mechanism associated with one of the template images, an editable product design template associated with the selected template image, the editable product design template being a partially completed electronic product design and comprising one or more user editable elements, one or more processors configured to provide one or more product design software tools, the tools being adapted to allow the user of the user computer to edit the one or more user editable elements of the editable product design template, and one or more processors configured to receive edits to the editable product design template, the edits entered the user using one or more of the tools to incorporate user content into the one or more user editable elements of the editable product design template to create a custom electronic product design that can be printed to create a print item.

15. The system of claim 14, further comprising:

one or more processors configured to receive a request to print the custom electronic product design; and one or more processors configured to print the custom electronic product design to create a print item.

16. The system of claim 14, wherein the one or more product design software tools are downloaded to the user computer, the tools being adapted to execute in the browser of the user computer.

17. The system of claim 16, wherein the editable product design template is downloaded to the user computer for editing using the one or more product design software tools.

18. The system of claim 16, wherein the one or more product design software tools is downloaded to the user computer upon user selection of the editable product design template.

19. The system of claim 14, wherein the one or more product design software tools are configured to display the editable product design template and any user edits to the one or more user editable elements incorporated therein to the user in WYSIWYG form.

20. The system of claim 14, further comprising one or more processors configured to allow the user to modify at least one feature of the partially completed electronic product design of selected product design template during the one or more product design software tools.

21. Non-transitory computer readable storage medium tangibly embodying program instructions which, when executed by a computer, implement a method for creating an electronic product design of a print item to be printed, the method comprising:

receiving, at a user computer, a plurality of selectable template images for viewing by the user on a display of the user computer, the images representing electronic product design templates of print items that can be printed, receiving a selection by the user of one of the template images, presenting on the user's display an editable product design template associated with the selected template image, the editable product design template being a partially completed electronic product design and comprising one or more user editable elements, executing one or more product design software tools on the user computer, the tools being adapted to allow the user of the user computer to edit the one or more user editable elements of the editable product design template, and receiving edits to the editable product design template, the edits entered the user using one or more of the tools to incorporate user content into the one or more user editable elements of the editable product design template to create a custom electronic product design that can be printed to create a print item; and uploading the custom electronic product design to a server to be printed.

22. A system for creating an electronic product design of a print item to be printed, comprising:

one or more processors configured to receive, at a user computer, a plurality of selectable template images for viewing by the user on a display of the user computer, each template image having associated therewith a template selection mechanism, the images representing electronic product design templates of print items that can be printed, one or more processors configured to receive a selection by the user of a template selection mechanism associated with one of the template images, one or more processors configured to present on the user's display an editable product design template associated with the selected template image, the editable product design template being a partially completed electronic product design and comprising one or more user editable elements, one or more processors configured to execute one or more product design software tools on the user computer, the tools being adapted to allow the user of the user computer to edit the one or more user editable elements of the editable product design template, and one or more processors configured to receive edits to the editable product design template, the edits entered the user using one or more of the tools to incorporate user content into the one or more user editable elements of the editable product design template to create a custom electronic product design that can be printed to create a print item; and one or more processors configured to upload the custom electronic product design to a server to be printed.

* * * * *